(12) United States Patent
Caunter et al.

(10) Patent No.: US 12,485,611 B2
(45) Date of Patent: Dec. 2, 2025

(54) MANIFOLD AND RELATED METHODS FOR USE WITH A RESERVOIR FOR ADDITIVE MANUFACTURING

(71) Applicant: 3DFORTIFY INC., Boston, MA (US)

(72) Inventors: Andrew J. Caunter, Somerville, MA (US); Scott Goodrich, Malden, MA (US); Adam Afzali, Dorchester, MA (US); Noah Collins, Cambridge, MA (US); Michael Santorella, Walpole, MA (US)

(73) Assignee: 3DFortify Inc., Boston, MA (US)

( * ) Notice: Subject to any disclaimer, the term of this patent is extended or adjusted under 35 U.S.C. 154(b) by 0 days.

(21) Appl. No.: 18/452,720

(22) Filed: Aug. 21, 2023

(65) Prior Publication Data

US 2023/0398737 A1     Dec. 14, 2023

Related U.S. Application Data

(60) Division of application No. 17/966,564, filed on Oct. 14, 2022, now Pat. No. 11,731,359, which is a
(Continued)

(51) Int. Cl.
*B29C 64/255* (2017.01)
*B29C 64/232* (2017.01)
(Continued)

(52) U.S. Cl.
CPC .......... *B29C 64/255* (2017.08); *B29C 64/232* (2017.08); *B29C 64/245* (2017.08);
(Continued)

(58) Field of Classification Search
CPC ..... B29C 64/255; B29C 64/259; B29C 64/30; B29C 64/307; B29C 64/314;
(Continued)

(56) References Cited

U.S. PATENT DOCUMENTS

| 11,731,359 B2 | 8/2023 | Caunter et al. |
| 2017/0028630 A1 | 2/2017 | Ederer et al. |

(Continued)

FOREIGN PATENT DOCUMENTS

| CN | 108705772 A | 10/2018 |
| KR | 20190023013 A | 3/2019 |

(Continued)

OTHER PUBLICATIONS

Supplementary European Search Report for Application No. EP21791706 dated Apr. 22, 2024 (9 pages).
(Continued)

*Primary Examiner* — Jamel M Nelson
(74) *Attorney, Agent, or Firm* — Barnes & Thornburg LLP

(57) ABSTRACT

The presently disclosed embodiments generally relate to reservoir manifold systems suitable for use with an additive manufacturing apparatus. Such manifold systems enable ease of use for making mechanical, electrical, and fluid connections to a reservoir used for additive manufacturing. Conduits formed in the reservoir manifold can allow for a fluid connection to be established with a reservoir to allow fluid flow into and out of the reservoir. The reservoir manifold can include one or more arms that are configured to move independently to couple to the reservoir of the printing apparatus. The reservoir manifold can include a trigger coupled to a latch mechanism for engaging one or more components of the apparatus. In some embodiments, the ability of the manifold to make electrical connections to the reservoir may present advantages to the ease-of-use and reliability of an additive manufacturing apparatus.

9 Claims, 44 Drawing Sheets

Related U.S. Application Data continuation of application No. PCT/US2021/029004, filed on Apr. 23, 2021.

(60) Provisional application No. 63/014,496, filed on Apr. 23, 2020.

(51) Int. Cl.
*B29C 64/245* (2017.01)
*B29C 64/295* (2017.01)
*B29C 64/314* (2017.01)
*B29C 64/321* (2017.01)
*B33Y 30/00* (2015.01)
*B33Y 40/10* (2020.01)

(52) U.S. Cl.
CPC .......... *B29C 64/295* (2017.08); *B29C 64/314* (2017.08); *B29C 64/321* (2017.08); *B33Y 30/00* (2014.12); *B33Y 40/10* (2020.01)

(58) Field of Classification Search
CPC ... B29C 64/321; B29C 64/329; B29C 64/357; B33Y 10/00; B33Y 30/00; B33Y 40/10; B22F 12/22; B22F 12/222; B22F 12/224; B22F 12/38; B22F 12/50
See application file for complete search history.

(56) References Cited

U.S. PATENT DOCUMENTS

| | | |
|---|---|---|
| 2017/0050389 A1 | 2/2017 | Lee |
| 2017/0251713 A1* | 9/2017 | Warner ................. A23P 30/20 |
| 2019/0176394 A1 | 6/2019 | Korten et al. |
| 2019/0263051 A1 | 8/2019 | Sanchez Ribes et al. |
| 2023/0036058 A1 | 2/2023 | Caunter et al. |

FOREIGN PATENT DOCUMENTS

| | | | |
|---|---|---|---|
| WO | WO-2020040976 A1 * | 2/2020 | ............ B29C 35/16 |
| WO | 2020055870 A2 | 3/2020 | |

OTHER PUBLICATIONS

PCT Search Report and Written Opinion prepared for PCT/US2021/029004, dated Sep. 17, 2021.

U.S. Appl. No. 17/966,564, filed Oct. 14, 2022, Manifold and Related Methods for Use With a Reservoir for Additive Manufacturing.

Patent Cooperation Treaty (PCT) Search Report and Written Opinion prepared for PCT/US2021/029004, dated Sep. 17, 2021.

* cited by examiner

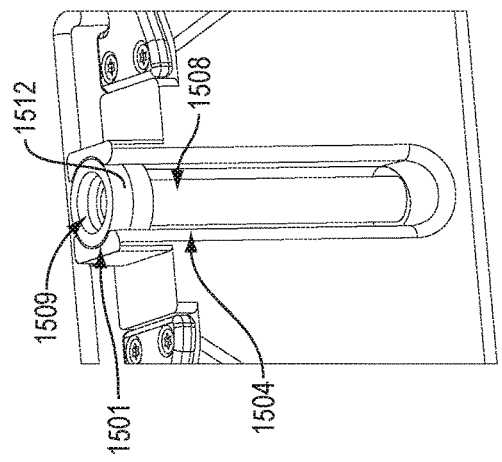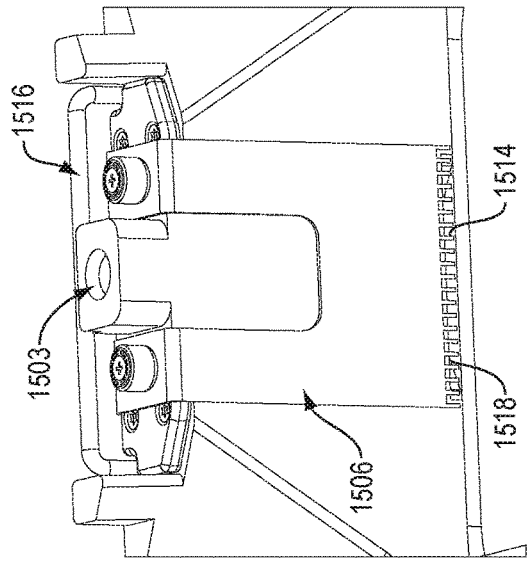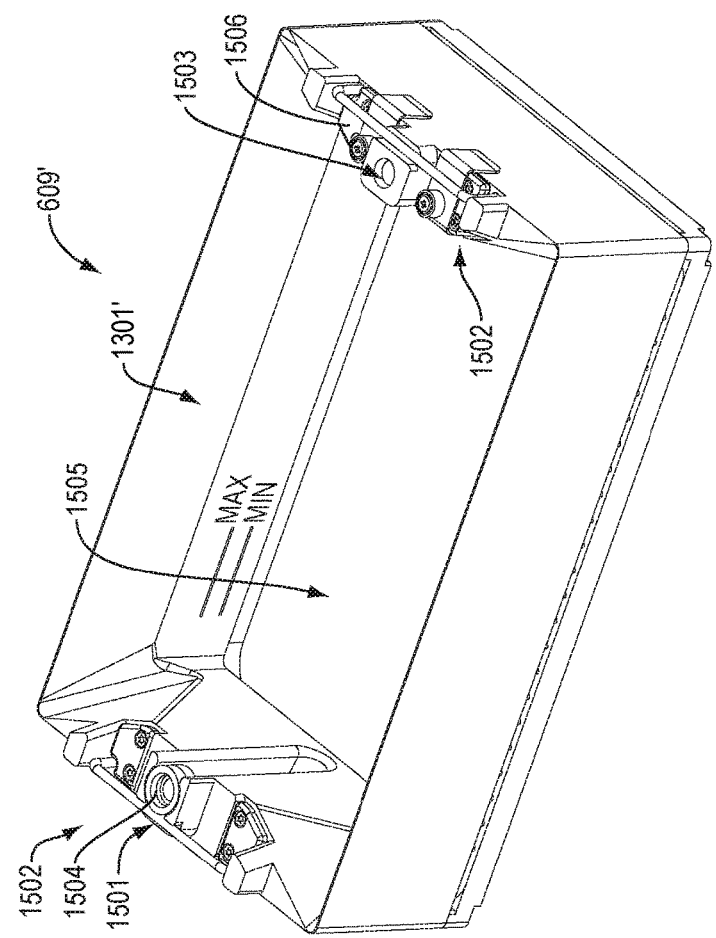

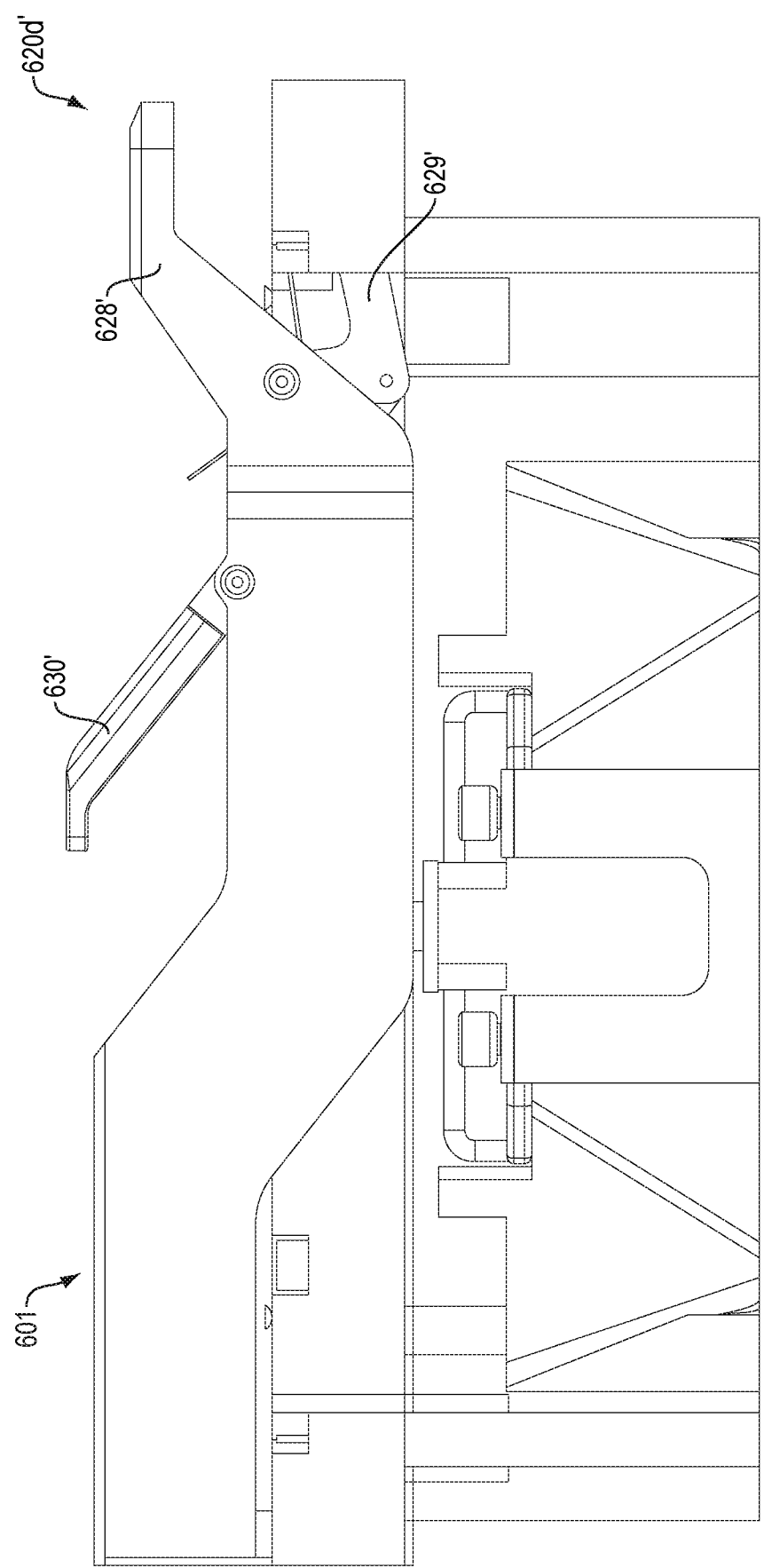

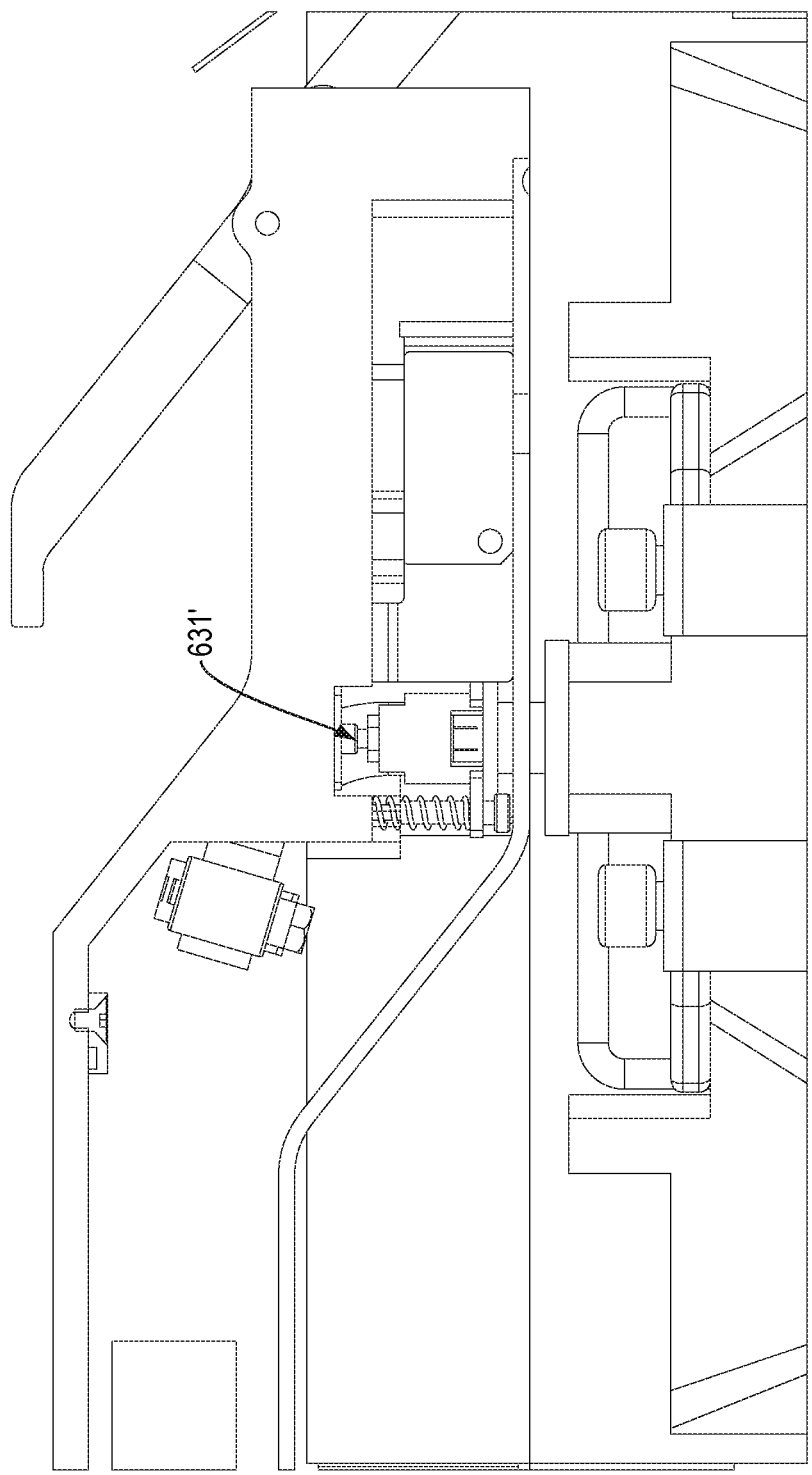

MANIFOLD AND RELATED METHODS FOR USE WITH A RESERVOIR FOR ADDITIVE MANUFACTURING

CROSS REFERENCE TO RELATED APPLICATION

This application is a divisional application of U.S. Non-Provisional application Ser. No. 17/966,564, entitled "Manifold and Related Methods for Use with a Reservoir for Additive Manufacturing," filed on Oct. 14, 2022, which is a continuation of International Patent Application No. PCT/US2021/029004, entitled "Manifold and Related Methods for Use with a Reservoir [for] Additive Manufacturing," filed Apr. 23, 2021, which claims priority to U.S. Provisional Application No. 63/014,496, entitled "Systems and Methods for Use with a Reservoir for Additive Manufacturing," which was filed on Apr. 23, 2020, all of which are incorporated by reference herein in their entireties.

FIELD

The present disclosure generally relates additive manufacturing, and more particularly to systems and methods for making electrical, mechanical, and fluid connections to a reservoir used for additive manufacturing applications.

BACKGROUND

Additive manufacturing, which can be referred to as three-dimensional printing, can be used to fabricate complex three-dimensional structures using materials such as polymers, metals, ceramics. and composites. Material is added to build a part layer-by-layer using a variety of additive manufacturing processes. Additive manufacturing processes often require that the materials used to build each layer are homogeneously mixed and free of gas inclusions. In most cases, materials for additive manufacturing are formulated, mixed, and packaged before being integrated with the printing system. The polymer matrix in some additive processes, such as photo-curable printing (stereolithography) or liquid deposition modeling, is a liquid during the majority of the printing process.

Various mechanical and electrical systems are necessary for handling materials during additive manufacturing. For example, the liquid may be delivered to and from the reservoir to interface with material management processes external to the reservoir, such as an external mixer configured to homogenize the composition of the fluid. Additionally, system variables such as liquid temperature and liquid fill height or level may be measured in the reservoir in order to drive control algorithms for reservoir-based processes. Moreover, a reservoir may require mechanical fixturing to position it in the correct location for the printing process. Such components are typically separate elements that require careful coordination, and that take up valuable space in additive manufacturing systems.

Accordingly, there is a need for systems and methods that more easily allow for parameters associated with a reservoir to be controlled and monitored, as well as systems and methods to allow for the liquid used during the printing process to be maintained in desired states and/or to have particular configurations, parameters associated with it, etc.

SUMMARY

The presently disclosed embodiments generally relate to reservoir manifold systems suitable for use with an additive manufacturing apparatus. Such manifold systems enable ease of use for making mechanical, electrical, and fluid connections to a reservoir used for additive manufacturing. These systems also improve the reliability of critical-to-function control systems in an additive manufacturing process.

In accordance with some embodiments, the ability to automatically make fluid connections to a printing reservoir may present advantages in ease-of-use and reliability of an additive manufacturing apparatus. Also, being able to position electrical sensors above a printing reservoir and to make electrical connections to the printing reservoir may present advantages to the ease-of-use and reliability of an additive manufacturing apparatus.

In an aspect, embodiments relate to an additive manufacturing apparatus including a frame. A reservoir is disposed inside a space defined by the frame and includes (i) a bottom film and (ii) a wall affixed to the bottom film, the wall defining an inlet, an outlet, and a top opening. A reservoir manifold includes at least one rigid beam, with the reservoir manifold (i) being disposed above the reservoir, (ii) being in fluid communication with the reservoir, and (iii) moveably affixed to the frame. A build plate having a build surface is disposed below the reservoir manifold and in parallel alignment with the bottom film of the reservoir.

One or more of the following features may be included. The reservoir manifold may include two, three, or four rigid beams. For example, the reservoir manifold may include two independent beams, each beam being moveably affixed to the frame. Alternatively, the reservoir manifold may include three rigid beams defining a U-shape. As yet another example, the reservoir manifold may include four rigid beams defining a box shape. Moreover, in some embodiments, the reservoir manifold may include a pair of arms that can be configured to move independently of one another.

The reservoir manifold may have an engaged position in which the reservoir manifold clamps the reservoir. The apparatus may include a clamp adapted to maintain the reservoir manifold in the engaged position.

The reservoir manifold may have a disengaged position in which the reservoir is rendered removable from the frame.

A hinge may be coupled to the reservoir manifold, with the reservoir manifold being adapted to rotate about the hinge between an engaged position and a disengaged position.

A reservoir glass may be disposed below the bottom film, the reservoir glass being sized and shaped to support the bottom film.

A focal plane flange may be disposed below the bottom film, defining a recess configured to support the reservoir glass.

An inlet pump may be in fluid communication with a fluidic inlet connection of the reservoir manifold and configured to drive material to the fluidic inlet connection from an external mixer.

A return pump may be in fluid communication with a fluidic outlet connection of the reservoir and configured to drive material from the fluidic outlet connection to an external mixer.

The reservoir manifold may include at least one coupling element configured to exert a downward force on the reservoir when the reservoir manifold is in an engaged position.

The reservoir manifold may include at least one fluid connection configured to mate with at least one of the inlet or the outlet of the reservoir.

A fluid temperature sensor may be positioned in at least one fluid connection.

The reservoir manifold may include an infrared heating element positioned above the reservoir.

The reservoir manifold may include at least one electrical sensor configured to measure a property of a fluid disposed, in use, inside the reservoir. At least one electrical sensor may include a fluid height sensor or a fluid temperature sensor. At least one electrical sensor may be in electrical communication with a control system.

The reservoir manifold may include at least one electrical contact, the reservoir may include at least one electrical contact, and the at least one electrical contact of the reservoir manifold may be configured to connect to the at least one electrical contact of the reservoir.

A mechanical alignment feature may be configured to positions the reservoir manifold relative to the reservoir.

The reservoir manifold may be in fluid communication via a conduit with an active mixer and/or a passive mixer. The reservoir manifold may be in fluid communication via a conduit with a material container.

The reservoir may further include a fluidic channel connecting a port disposed on a surface of the reservoir to an interior region of the reservoir.

A control system may be adapted to adjust at least one of a height or a temperature of a fluid disposed inside the reservoir based on at least one of a fluid height reading or a temperature reading from at least one of a fluid height sensor or a fluid temperature sensor configured to measure the height or temperature of the fluid disposed, in use, in the reservoir.

A reservoir tensioning plate may include a plurality of protruding features configured to tension the bottom film of the reservoir.

In another aspect, embodiments relate to an additive manufacturing apparatus including a frame. A reservoir is disposed in a space defined by the frame and includes (i) a bottom film and (ii) a wall affixed to the bottom film, the wall defining an inlet, an outlet, and a top opening. A heating element is in a closed-loop fluid communication with the reservoir. A build plate having a build surface is disposed in parallel alignment with the bottom film of the reservoir.

One or more of the following features may be included. The closed-loop fluid communication may include a conduit disposed in fluid communication with at least one of the inlet and the outlet of the reservoir. A reservoir manifold including at least one rigid beam may (i) be disposed above the reservoir, (ii) be in fluid communication with the reservoir, and (iii) be moveably affixed to the frame. The closed-loop fluid communication of the heating element with the reservoir may include fluid communication through the reservoir manifold.

In still another aspect, embodiments relate to an additive manufacturing apparatus including a frame. A reservoir is disposed inside a space defined by the frame and includes (i) a bottom film and (ii) a wall affixed to the bottom film, the wall defining an inlet, an outlet, and a top opening. A build plate having a build surface is disposed below the reservoir manifold and in parallel alignment with the bottom film of the reservoir. A reservoir glass is disposed below the bottom film, the reservoir glass being sized and shaped to support the bottom film. A focal plane flange is disposed below the bottom film and defines a recess configured to support the reservoir glass.

One or more of the following features may be included. A plurality of spring plungers may be disposed in a plurality of holes in the focal plane flange. A top surface of the reservoir glass may be coplanar with a topmost surface of the focal plane flange when (i) the spring plungers push the top surface of the reservoir glass towards a bottom surface of the bottom film of the reservoir, and (ii) an outer lip of the focal plane flange contacts a bottom surface of the reservoir wall.

The top surface of the reservoir glass may be disposed above the topmost surface of the focal plane flange when the spring plungers are in retracted positions in the focal plane flange holes.

In still another aspect, embodiments relate to a method for controlling a temperature of a fluid during additive manufacturing. An additive manufacturing apparatus is provided, including a frame. A reservoir is disposed in a space defined by the frame and includes (i) a bottom film and (ii) a wall affixed to the bottom film, the wall defining an inlet, an outlet, and a top opening. A heating element is in a closed-loop fluid communication with the reservoir. A build plate having a build surface is disposed in parallel alignment with the bottom film of the reservoir. A fluid is introduced into the reservoir. The fluid is circulated through the heating element to control a temperature of the fluid.

In an aspect, embodiments relate to an additive manufacturing manifold including a mechanically-actuated body including electrical, mechanical and fluidic interface components. The manifold interacts with a reservoir having a fluidic inlet and an outlet. A reservoir is in fluid communication with the mixer. A build plate is disposed in parallel alignment with the reservoir.

In some embodiments, there may only be one fluidic connection between the manifold and the reservoir.

One or more of the following features may be included. A pump may be configured to drive material out of the outlet of the manifold. A pump may be configured to drive material towards the manifold inlet.

A reservoir may have fluidic openings on its surface that are designed to interface with mating fluidic openings on the manifold.

The manifold may include one or more hinges that allow it to rotate around an axis. This hinge may allow the manifold to rotate between engaged and disengaged positions.

The manifold may include a clamping mechanism that holds the manifold in contact with the reservoir when clamped.

The manifold may include a spring-loaded component that applies a downwards force to the reservoir when clamped in place.

The manifold may be secured in place by mechanical components above and/or below the top surface of the reservoir.

The manifold may include mechanical alignment features that engage with mating alignment features on the reservoir. These alignment features may constrain the features of the manifold to the features on the reservoir.

The manifold may include fluidic connections that seal against corresponding fluidic connections on the reservoir.

Fluidic connections on the manifold may connect to a conduit or hoses. The conduit may be connected to external pumps. The conduit may also be connected to an external mixer.

The manifold may include an ultrasonic sensor. This ultrasonic sensor may be positioned relative to the reservoir so that it can measure the height of fluid inside the reservoir.

The manifold may include a capacitor. This capacitor may be positioned relative to the reservoir so that it can measure the height of fluid inside the reservoir.

The manifold may include infrared temperature sensors. This sensor may be positioned relative to the reservoir so that it can measure the temperature of resin inside the reservoir.

The conduit from the manifold may be in fluid communication with an active mixer. The active mixer may actuate mechanical components to homogenize particles, additives, or polymers within the fluid.

The conduit from the manifold may be in fluid communication with a temperature control system. The temperature control system may be increasing or decreasing the temperature of the fluid.

An exemplary embodiment of an additive manufacturing apparatus includes a reservoir, a reservoir manifold, and a build plate. The reservoir includes a bottom transparent surface and one or more walls coupled to the bottom transparent surface, together defining a volume in which one or more fluids can be disposed. The one or more walls include an inlet and an outlet associated with the wall(s). The reservoir manifold is disposed above the reservoir and is moveable with respect to the reservoir. The reservoir manifold includes an inlet conduit and an outlet conduit formed in the manifold. The inlet conduit provides for fluid communication with the reservoir via the inlet, while the outlet conduit provides for fluid communication with the reservoir via the outlet. The build plate includes a build surface disposed below the reservoir manifold. The build plate is configured to move vertically away from the reservoir in conjunction with manufacturing an object.

In some embodiments the reservoir manifold can include two independent arms. Each arm can be independently moveable. Each arm can include a trigger that can be configured to manipulate a grasping portion of the arm between an open position and a closed position to couple the reservoir manifold to the reservoir. In some such embodiments, an end of the trigger can include a latch that is configured to pivot relative to at least one of the arms. This can be done, to engage a frame when a frame is provided as part of the additive manufacturing apparatus. The latch can be coupled to at least one of the arms to translate substantially in tandem with the at least one of the arms.

In embodiments in which a frame is included, the volume of the reservoir can be at least partially defined by the frame, and the reservoir manifold can be moveably affixed to the frame. In embodiments that include both a frame and two independent arms, each arm can be independently moveably affixed to the frame.

The reservoir manifold can be configured to move between an engaged position and a disengaged position. In the engaged position, the reservoir manifold can be in contact with the reservoir to form an inlet fluid connection between the inlet conduit and the reservoir, and an outlet fluid connection between the reservoir and the outlet conduit. In the disengaged position, at least one of the inlet fluid connection and the outlet fluid connection can be broken.

The additive manufacturing apparatus can include a reservoir glass that can be disposed below the bottom transparent surface. In some such embodiments, at least one of the reservoir or the reservoir glass can be configured to be tilted at an angle relative to the other (e.g., the reservoir glass can be tilted relative to the reservoir) and at least one of the reservoir or the reservoir glass can be moved relative to the other. As a result, excess air can be removed from between the reservoir and the reservoir glass as the movement occurs. For example, the reservoir glass can be configured to be tilted at an angle relative to the reservoir and the reservoir can configured to be moved relative to the reservoir glass such that excess air can be removed from between the reservoir and the reservoir glass as the reservoir is moved towards the reservoir glass.

The additive manufacturing apparatus can include a heating element. The heating element can be in closed-loop fluid communication with the reservoir. In some embodiments, the reservoir manifold can include at least one electrical contact and the reservoir can also include at least one electrical contact. The electrical contact(s) of the reservoir manifold can be configured to connect to the electrical contact(s) of the reservoir.

An inlet pump and/or a return pump can be included as part of the additive manufacturing apparatus. The inlet pump can be in fluid communication with the inlet conduit of the reservoir manifold, and the pump can be configured to drive one or more fluids through the inlet conduit and into the reservoir from at least one of an external mixer (e.g., an active mixer, a passive mixer), a heating element, or a material container. An inlet filter can be disposed within the inlet conduit. The return pump can be in fluid communication with the outlet conduit of the reservoir manifold, and the pump can be configured to drive one or more fluids from reservoir, through the outlet conduit, and towards at least one of an external mixer (e.g., an active mixer, a passive mixer), a heating element, or a material container. An outlet filter can be disposed within the outlet conduit.

A variety of sensors can be used in conjunction with and/or be incorporated into the additive manufacturing apparatus. For example, one or more of a fluid height sensor or a fluid temperature sensor can be configured to measure a height or temperature, respectively, of one or more fluids disposed in the reservoir.

The additive manufacturing apparatus can include at least one of an active mixer, a passive mixer, or a material container. In such embodiments, the fluid communication with the reservoir provided by each of the inlet conduit and the outlet conduit can also be provided with the active mixer, the passive mixer, and/or the material container. In some embodiments, the at least one of an active mixer, a passive mixer, or a material container can be an active mixer and/or a passive mixer.

A controller can be included as part of the additive manufacturing apparatus. The controller can be configured to adjust at least one of a height of one or more fluids disposed in the reservoir or a temperature of one or more fluids disposed in the reservoir. Such adjustment(s) can be based on a signal received by the controller from one or more sensors. The one or more sensors can be associated with at least one of the reservoir manifold or the reservoir.

Another exemplary additive manufacturing apparatus includes a reservoir, at least one of an active mixing system (or mixer), a passive mixing system (or mixer), or a heating element, one or more pumps, a fluid path, and a build plate. The reservoir includes a bottom transparent surface and one or more walls coupled to the bottom transparent surface, together defining a volume in which one or more fluids can be disposed. The one or more walls include an inlet and an outlet associated with the wall(s). The fluid path is formed between the reservoir and the at least one of the active mixing system, the passive mixing system, and/or the heating element such that at least one of the active mixing system, the passive mixing system, and/or the heating element is in closed loop communication with the reservoir. Further, the one or more pumps are configured to flow fluid through the fluid path between the at least one of the active mixing system, the passive mixing system, and/or the heating element and the reservoir. The build plate includes a build surface that is disposed in substantially parallel alignment with the bottom transparent surface of the reservoir. The build plate is configured to move vertically away from the reservoir in conjunction with manufacturing an object.

In some embodiments, the at least one of an active mixing system, a passive mixing system, or a heating element includes the heating element.

A controller can be included as part of the additive manufacturing apparatus. The controller can be configured to adjust at least one of a height of one or more fluids disposed in the reservoir or a temperature of one or more fluids disposed in the reservoir. Such adjustment(s) can be based on a signal received by the controller from one or more sensors.

The additive manufacturing apparatus can include a reservoir manifold. The reservoir manifold can be disposed above the reservoir and can be moveable with respect to the reservoir. The reservoir manifold can include an inlet conduit and an outlet conduit formed in the manifold, with the inlet conduit and the outlet conduit being part of the fluid path. In some such embodiments, the reservoir manifold can be configured to be moved between an engaged position and a disengaged position, with the engaged position being one in which the reservoir manifold is in contact with the reservoir to connect the fluid path, and the disengaged position being one in which the fluid path is disconnected.

An exemplary method of additive manufacturing includes cycling fluid into and out of a reservoir while printing a plurality of layers using a portion of the fluid to form a three-dimensional object. The fluid that cycles out of the reservoir is passed through at least one mixer or mixing system prior to being cycled back into the reservoir.

The method can include moving a reservoir manifold into an engaged position with respect to the reservoir. Doing so can cause an inlet conduit and an outlet conduit of the reservoir manifold to form a fluid connection with the reservoir to allow for the fluid to be cycled through the reservoir manifold and the reservoir. In some embodiments, moving the reservoir manifold can include rotating the reservoir manifold about a pivot point.

The method can include filtering the fluid. This can occur, for example, by filtering the fluid proximate to a location at which the fluid enters into the reservoir and/or filter the fluid proximate to a location at which the fluid exits the reservoir.

In at least some embodiments, the method can include heating the fluid in conjunction with cycling the fluid. The heating can occur outside of the reservoir, for example, by utilizing a heating element disposed in a fluid path and/or as part of the mixing system(s).

Another exemplary method of additive manufacturing includes monitoring a temperature of a fluid used for additive manufacturing and heating the fluid used for additive manufacturing while it is being circulated through a closed loop fluid path. The fluid path includes a reservoir in which at least a portion of the fluid can be disposed prior to being used to produce a three-dimensional object. The fluid path can also include a heating element configured to heat the fluid.

In some embodiments, the fluid path can also include a reservoir manifold. The reservoir manifold can have a plurality of conduits formed in it, or otherwise associated with it. The conduits can form a portion of the closed loop path. In some such embodiments, the method can also include moving the reservoir manifold into an engaged position with respect to the reservoir. As a result, this can allow the plurality of conduits to connect with and form the closed loop fluid path. The method can also include operating a controller, for example to heat the fluid in response to the monitored temperature.

BRIEF DESCRIPTION OF THE DRAWINGS

This disclosure will be more fully understood from the following detailed description, taken in conjunction with the accompanying drawings, in which:

FIG. 15A is a perspective view of another exemplary embodiment of a reservoir, the reservoir having an inlet filter and an outlet filter associated therewith;

FIG. 15B is a magnified front perspective view of the inlet filter disposed within the reservoir of FIG. 15A;

FIG. 15C is a magnified front perspective view of the outlet filter coupled to the reservoir of FIG. 15A;

FIG. 19B is a cross-sectional side view of the arm having a trigger coupled to the frame of the additive manufacturing apparatus taken along line D-D of FIG. 19A;

FIG. 20C is a cross-sectional side view of the arm illustrating a location of a limit switch relative to the reservoir manifold taken along line D-D of FIG. 19A;

DETAILED DESCRIPTION

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure.

To the extent features, sides, objects, arms, beams, sensors, steps, or the like are described as being "first," "second," "third," etc., such numerical ordering is generally arbitrary, and thus such numbering can be interchangeable. Still further, in the present disclosure, like-numbered components of various embodiments generally have similar features when those components are of a similar nature and/or serve a similar purpose, unless otherwise noted or otherwise understood by a person skilled in the art. To the extent the present disclosure includes prototypes, mock-ups, bench models, or the like, a person skilled in the art will recognize how to rely upon the present disclosure to integrate the techniques, systems, devices, and methods into a product, such as a 3D printing apparatus. The present disclosure may use or describe particular components using interchangeable or related terms. By way of non-limiting example, descriptions related to connections, such as fluid connections, can be used in lieu of or in conjunction with use of the term "conduits." Moreover, it will be appreciated that although features may be discussed with respect to one embodiment within the present disclosure, these features can be applied to every embodiment of the present disclosure where such feature would be supported.

Figure 1:
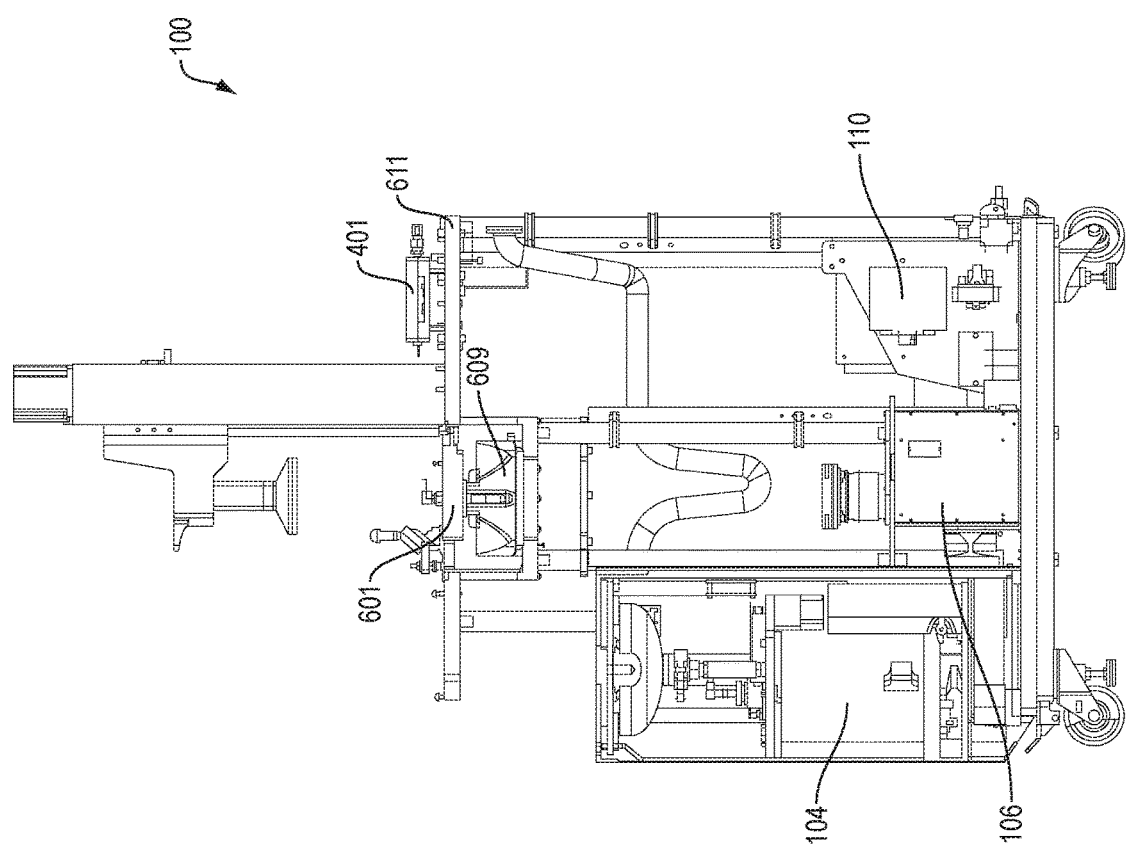
FIG. 1 is a schematic side view of an exemplary embodiment of a printing apparatus used for additive manufacturing, the printing apparatus having a side cover removed to illustrate components disposed inside of the printing apparatus, including a reservoir and a reservoir manifold.

FIG. 1 illustrates an exemplary embodiment of a printing apparatus or system 100 used in additive manufacturing. It will be appreciated that the terms "apparatus" and "system" can be used interchangeably to refer to the printer used for additive manufacturing throughout this disclosure. The system 100 can include a reservoir 609 configured to receive one or more substances therein for additive manufacturing of a composite part. The substance(s) can include a fluid and/or a resin that can be cured to form a printed part or object. The fluid in the system 100 can be cycled through an external mixer 104 before introduction into the reservoir 609. Heating, such as by way of a heating element 401, and mixing, such as by way of the external mixer 104, the fluid can prevent the resin from solidifying prematurely, thereby clogging the piping of the printer and causing printing errors during additive manufacturing, among other benefits. A person skilled in the art will recognize that additive manufacturing can refer to such forms of 3D printing as stereolithography (SLA) and digital light processing (DLP), which is a type of vat polymerization that use a liquid photopolymer resin which is able to cure, e.g., solidify when exposed to a light source. In DLP, the light source can be a specially developed digital light projector screen 106, as shown. The system 100 can be operated by electronics 110 that can be in communication with various system components. It will be appreciated that an external mixer can include one or more of an active mixer, a passive mixer, or any other mixer that can be part of the printing apparatus 100 or associated with a printing apparatus, including those mixers that are located outside of the main printing apparatus. The system 100 can also include a heater block 112 that can be used to heat the fluid of the present embodiments.

The fluid can flow through the mixer 104 prior to flowing through inlets and outlets of the reservoir 609, discussed in greater detail below. The reservoir 609 can be coupled to a frame 611 using a reservoir manifold 601. The manifold 601 can include one or more inlets and/or outlets therein to facilitate the flow of fluid into and out of the reservoir, as well as other features, such as mechanical and/or electrical connections, as described in greater detail below.

In use, the system 100 works by lowering a build plate or build platform 608 into the reservoir 609 with only one layer of height left between the bottom of the reservoir 609 and the build platform. The resin in the reservoir 609 is exposed to the projector screen 106 to cure the resin making a solid layer on the build platform 608. When one layer is complete, the build platform 608 moves up by one layer in height and the process is repeated until the part is complete.

The reservoir manifold 601 can enable ease of use for making mechanical, electrical, and fluid connections to a reservoir used for additive manufacturing. Moreover, the reservoir manifold 601 can improve the reliability of critical-to-function control systems in an additive manufacturing process. Additional features of the manifold 601 will be discussed in greater detail below.

Figure 2A:
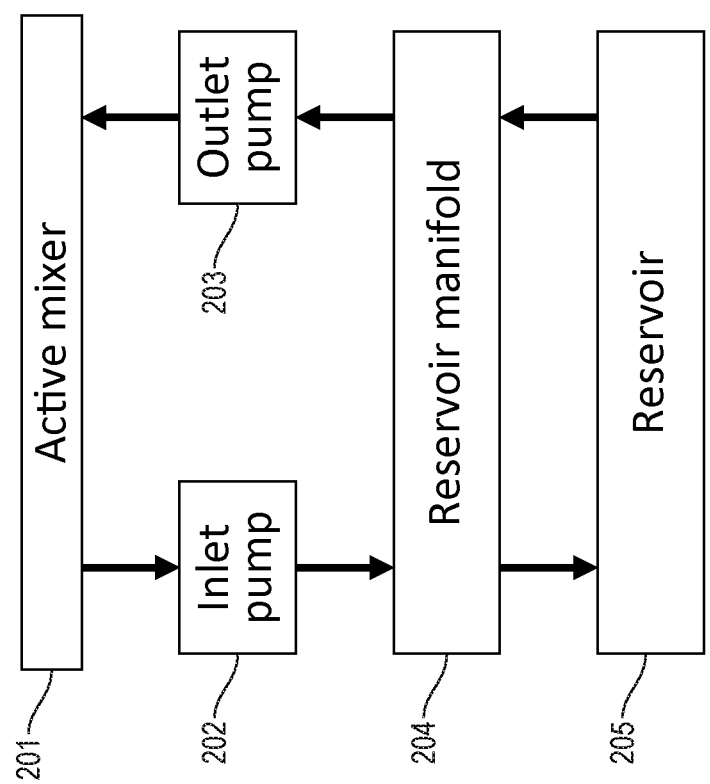
FIG. 2A is a schematic drawing describing fluid communication between a reservoir, a reservoir manifold, and an active mixer.

Referring to FIG. 2A, which schematically illustrates how at least one component of a printing apparatus, as shown an active mixer or active mixing system 201, can interact with a reservoir 205, a reservoir manifold 204 is provided to facilitate such interaction. The active mixer 201 can, for example, use one or more rotating or translating mechanisms which are actuated by an external motor. The reservoir manifold 204 is disposed above the reservoir 205. The reservoir manifold 204 can be in fluid communication with the active mixer 201 by way of an inlet pump 202 and an outlet pump or return pump 203, which in turn allows for fluid communication between the active mixer and the reservoir 205. As illustrated below, for example at least with respect to FIGS. 7 and 8, fluid communication can be established using one or more conduits formed in the reservoir manifold, such as an inlet conduit for fluid communication with the reservoir via the inlet and an outlet conduit for fluid communication with the reservoir via the outlet. In use, fluid can be driven from the active mixer 201, towards and through the reservoir manifold 204, and into the reservoir 205 by the inlet pump 202. Fluid can also be driven out of the reservoir 205, towards and through the reservoir manifold 204, and into the active mixer 201 by the outlet pump or return pump 203.

Figure 2B:
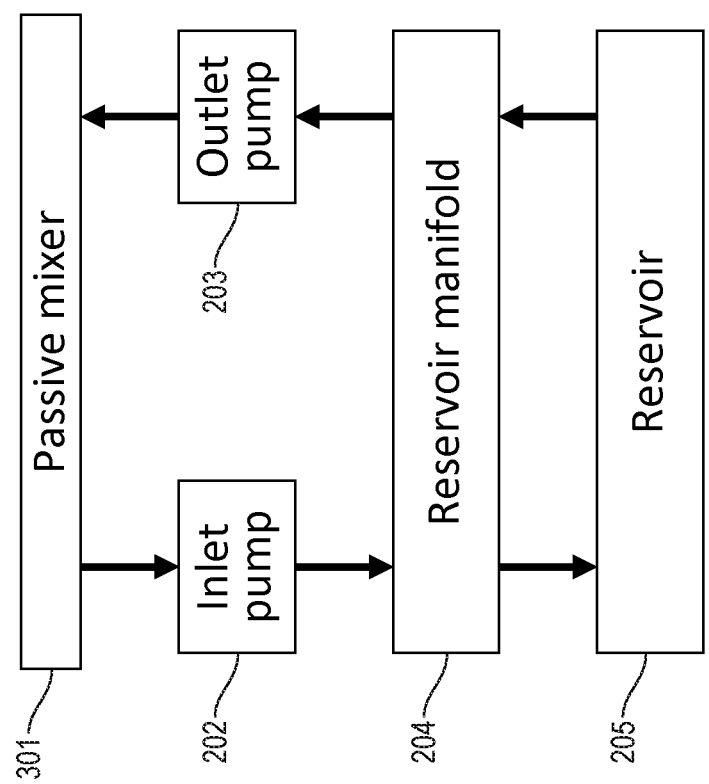
FIG. 2B is a schematic drawing describing fluid communication between a reservoir, a reservoir manifold, and a passive mixer.

FIG. 2B schematically illustrates that other components of a printing apparatus can also use the reservoir manifold 204 to facilitate fluid communication between the component and the reservoir 205 by way of the inlet pump 202 and the outlet pump 203. As shown, the component is a passive mixer or passive mixing system 301, which can, for example, create mixing flow patterns using static elements embedded in the conduit which disturb laminar pipe flow of the fluid. As with the active mixer 201, fluid communication can be established using one or more conduits formed in the reservoir manifold 204. In use, fluid can be moved from the passive mixer 301, towards and through the reservoir manifold 204, and into the reservoir 205 by the inlet pump 201. Likewise, fluid can be driven out of the reservoir 205, towards and through the reservoir manifold 204, and into the passive mixer 301 by the outlet pump 203. It will be appreciated that active mixers, passive mixers, and mixers generally discussed in the present disclosure can be singular components or more intricate systems made of multiple components, parts, and so forth.

Figure 3:
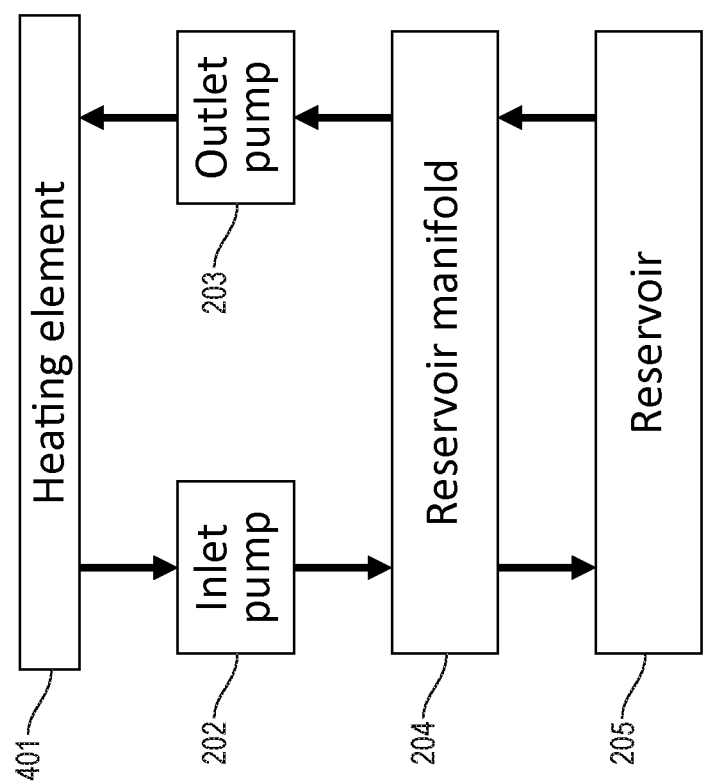
FIG. 3 is a schematic drawing describing fluid communication between a reservoir, a reservoir manifold, and a heating element.

FIG. 3 provides for a further schematic illustration of another component of a printing apparatus that can use the reservoir manifold 204 to facilitate fluid communication between the component and the reservoir 205 by way of the inlet pump 202 and the outlet pump 203. As shown, the component is a heater, heating system, or heating element 401, one exemplary embodiment of which is illustrated and described with respect to FIG. 4. Similar to the active mixer 201 and the passive mixer 301, fluid communication can be established using one or more conduits formed in the reservoir manifold 204. In use, fluid can be moved from the heating element 401, towards and through the reservoir manifold 204, and into the reservoir 205 by the inlet pump 201. Likewise, fluid can be driven out of the reservoir 205, towards and through the reservoir manifold 204, and into the heating element 401 by the outlet pump 203. In some embodiments, the heating element 401 can be in direct fluid communication with the reservoir 205, without requiring that fluid pass through the reservoir manifold 204. Inclusion of a heating element 401 in fluid communication with the reservoir 205, whether directly or through a reservoir manifold 204, can enable, for example, accurate control of the temperature of a fluid during additive manufacturing, thereby facilitating optimization of additive manufacturing processes.

In use, a fluid is introduced into the reservoir 205, and some portion of that fluid can be cycled back out of the reservoir 205, i.e., fluid not used to build a particular layer of a printed part at a particular time, although that fluid can be subsequently used to print a different layer and/or a different part. The fluid may be any material suitable for additive manufacturing. The fluid may be circulated through the heating element to control a temperature of the fluid, thereby facilitating control of the manufacturing process. Other parameters related to the fluid can also be controlled and/or monitored by way of the heating element or other components of a printing apparatus or printing system, including but not limited to a flow rate of the fluid, a viscosity of the fluid, and/or a volume of the fluid inside the reservoir.

Figure 4:
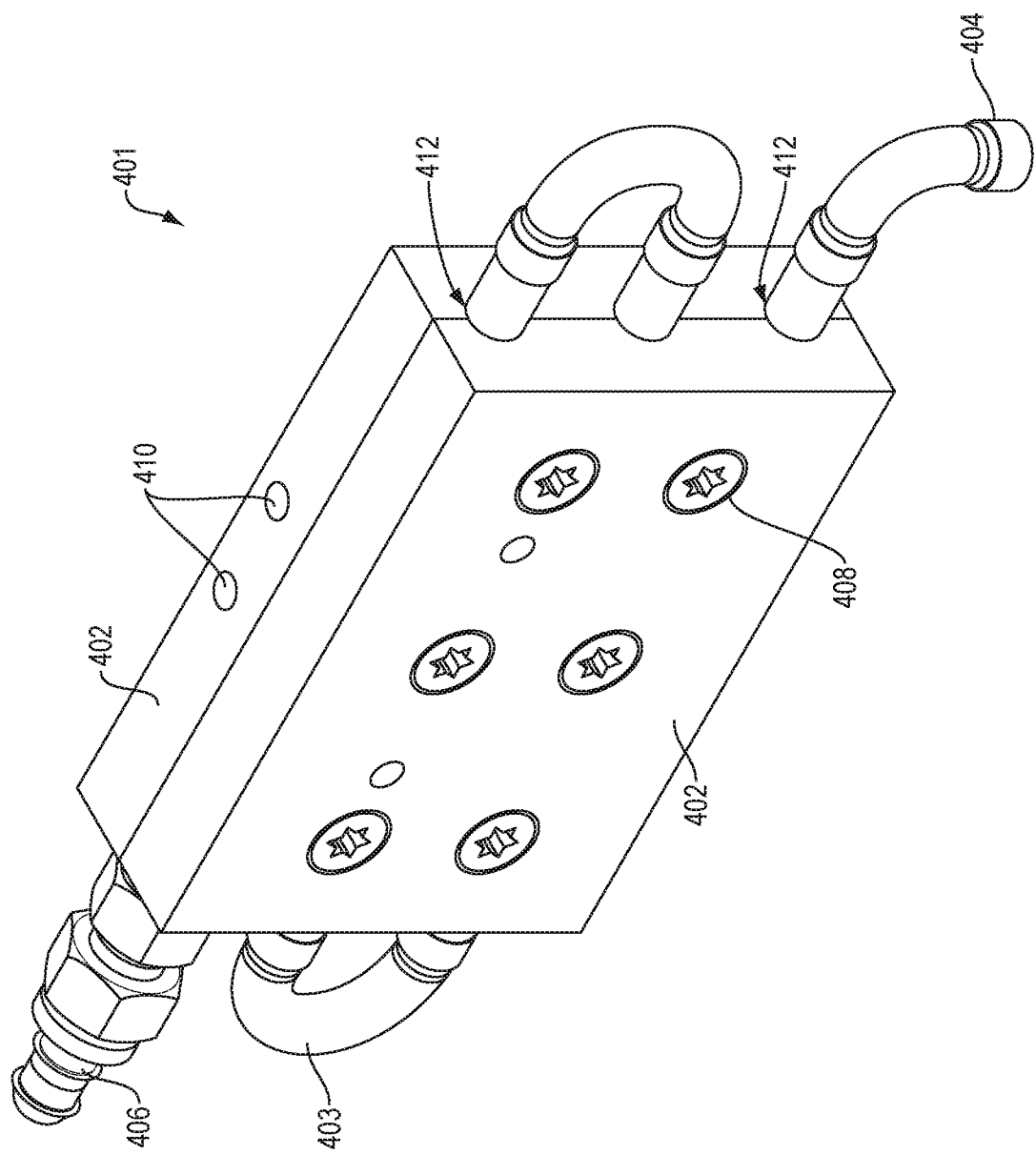
FIG. 4 is a schematic drawing of an embodiment of a heating element suitable for use with the process of FIG. 3.

Referring to FIG. 4, the heating system or element 401 can include two aluminum blocks or plates 402, with each block 402 having three straight sections of quarter-inch half-circles cut through its width. The blocks 402 can be approximately 6 inches wide by approximately 4 inches high by approximately 0.5 inches thick, though, the above dimensions of the block are merely exemplary and are not to be constrained by the above noted size. Tubing or hosing 403 with a 0.25 inch outer diameter may be sandwiched in the channels between the two plates 402. The tubing 403 can have an inlet 404 and outlet 406 that connect to the reservoir manifold through one or more conduits. The tubing 403 inside the heating element 401 may be bent twice by approximately 180-degrees to pass through each half-circle channel of the blocks 402. The blocks 402 can be compressed around the tubing 403 by screws 408. One or more cartridge heaters 410 can be inserted into, or otherwise associated with, the heater blocks 402, and the heat generated can be conducted to the tubing 403 passing through the blocks 402.

Figure 5:
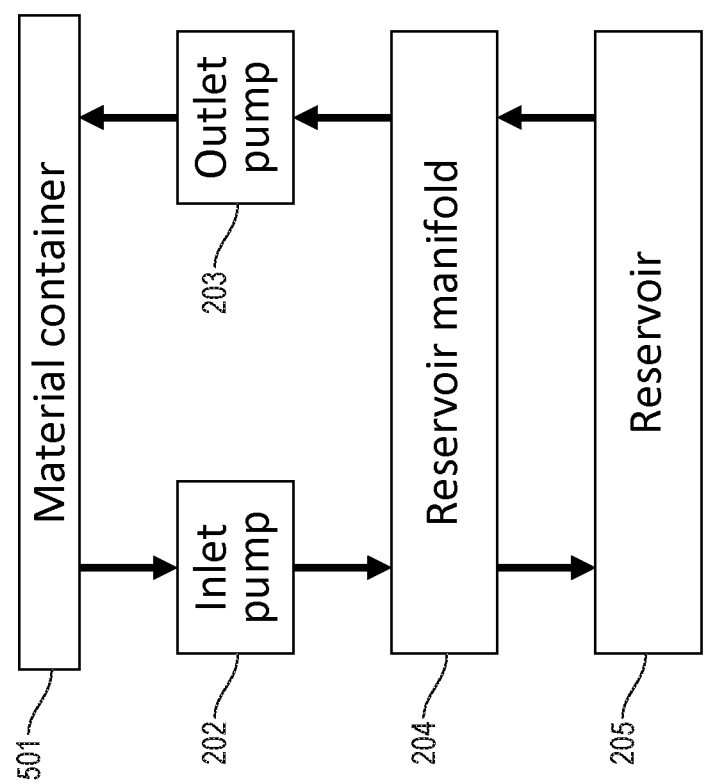
FIG. 5 is a schematic drawing describing fluid communication between a reservoir, a reservoir manifold, and a material container.

FIG. 5 illustrates still a further schematic illustration of another component of a printing apparatus that can use the reservoir manifold 204 to facilitate fluid communication between the component and the reservoir 205 by way of the inlet pump 202 and the outlet pump 203. As shown, the component is a material container or vessel 501. The material container can be used in lieu of, or in conjunction with, mixers or elements akin to the active mixer 201 and the passive mixer 301, as well as in lieu of or in conjunction with heating features, such as the heating element 401. Further, similar to the active mixer 201, the passive mixer 301, and the heating element 401, fluid communication can be established using one or more conduits formed in the reservoir manifold 204. In use, fluid can be moved from the material container 501, towards and through the reservoir manifold 204, and into the reservoir 205 by the inlet pump 201. Likewise, fluid can be driven out of the reservoir 205, towards and through the reservoir manifold 204, and into the material container 501 by the outlet pump 203.

Figure 6A:
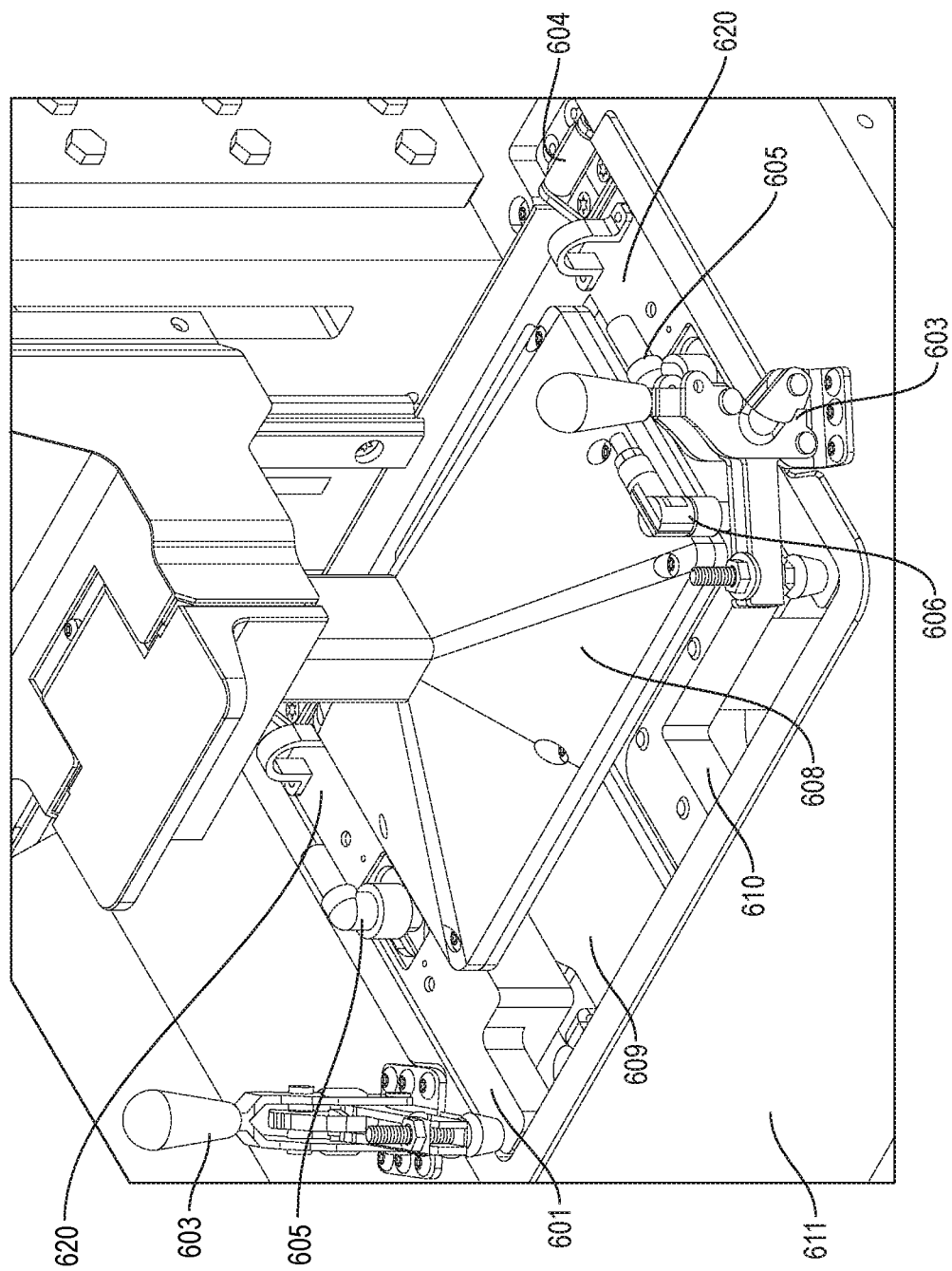
FIG. 6A is a perspective top view of the reservoir manifold for making electrical, mechanical, and fluidic connections to the reservoir inside of the additive manufacturing apparatus of FIG. 1.

FIG. 6A provides more particular details about aspects of the apparatus 100, such as the reservoir manifold 601 and related components. In some embodiments, the reservoir manifold 601 can be constructed from a block of machined aluminum, although other materials are possible without departing from the spirit of the present disclosure. The reservoir manifold 601 can have at have at least one rigid beam 620. For example, the reservoir manifold 601 can have two rigid beams 620, with each beam 620 being movably affixed to a frame of the additive manufacturing apparatus. As illustrated and discussed with respect to FIG. 7 below, in some embodiments, the reservoir manifold 601 can have three rigid beams 620 defining a U-shape, four rigid beams 620 defining a box shape, or five or more beams that define various shapes of the reservoir manifold that is configured to operate with a printing apparatus.

Each beam 620 of the manifold 601 can be about 20 mm to about 60 mm wide, e.g., mm wide. In the illustrated U-shape manifold 601, beams 620 with open ends can be about 200 mm to about 240 mm long, e.g., 220 mm long, and the connecting beam 620 can be about 270 mm to about 330 mm long, e.g., 300 mm long. The appropriate dimensions of the manifold can be determined by the width and depth of the reservoir walls. The manifold needs to be wide enough to connect to the fluid ports that are on top of the reservoir walls.

The reservoir manifold 601 can be movably affixed to the frame 611 of the additive manufacturing system or apparatus 100, which are used interchangeably throughout this disclosure, as mentioned above. The frame 611 may be an aluminum plate as wide and deep as the additive manufacturing system or machine itself. In at least some embodiments, the reservoir manifold 601 rotates about hinges 604 between an engaged position and a disengaged position. In the engaged position, the manifold 601 has one or more, up to all, of the various connections (e.g., mechanical, electrical, and/or fluid) established between the reservoir and one or more other components of the system, while in the disengaged position, one or more, up to all, of the various connections are not established. The hinges 604 can include, by way of non-limiting example, frictional damping elements to hold the reservoir manifold 601 in the disengaged position without it falling. Suitable hinges can include friction hinges, e.g., part number CT102BK from Sierra Pacific. The reservoir manifold 601 can be held in place, by way of non-limiting example, by one or more clamps 603. The clamps 603 can be adapted to maintain the reservoir manifold 601 in the engaged position, i.e., clamped to the reservoir 609 such that the desired connection(s) are established. The clamps 603 can be actuated, for example, by the user (or an automated aspect of the printing system) rotating an arm around a pivot point in a plane parallel to the frame 611. When the arm is rotated into a closed position (i.e., the engaged position), a contact point that is coupled to the arm can come in contact with the manifold 601, creating a clamping force on the manifold 601. After the clamp arm passes a critical point, it can lock into place and, at least in some embodiments, cannot be unlocked unless the user (or an automated aspect of the printing system) rotates the arm into an open position (i.e., the disengaged position). Suitable clamps can include part number 5126A59 from McMaster-Carr.

The reservoir manifold 601 can be affixed to the frame 611 by other methods. By way of non-limiting example, the reservoir manifold 601 can be a linear rail and guide system, with the reservoir manifold 601 being adapted to move linearly along the linear rail between an engaged position and a disengaged position.

Figure 22A:
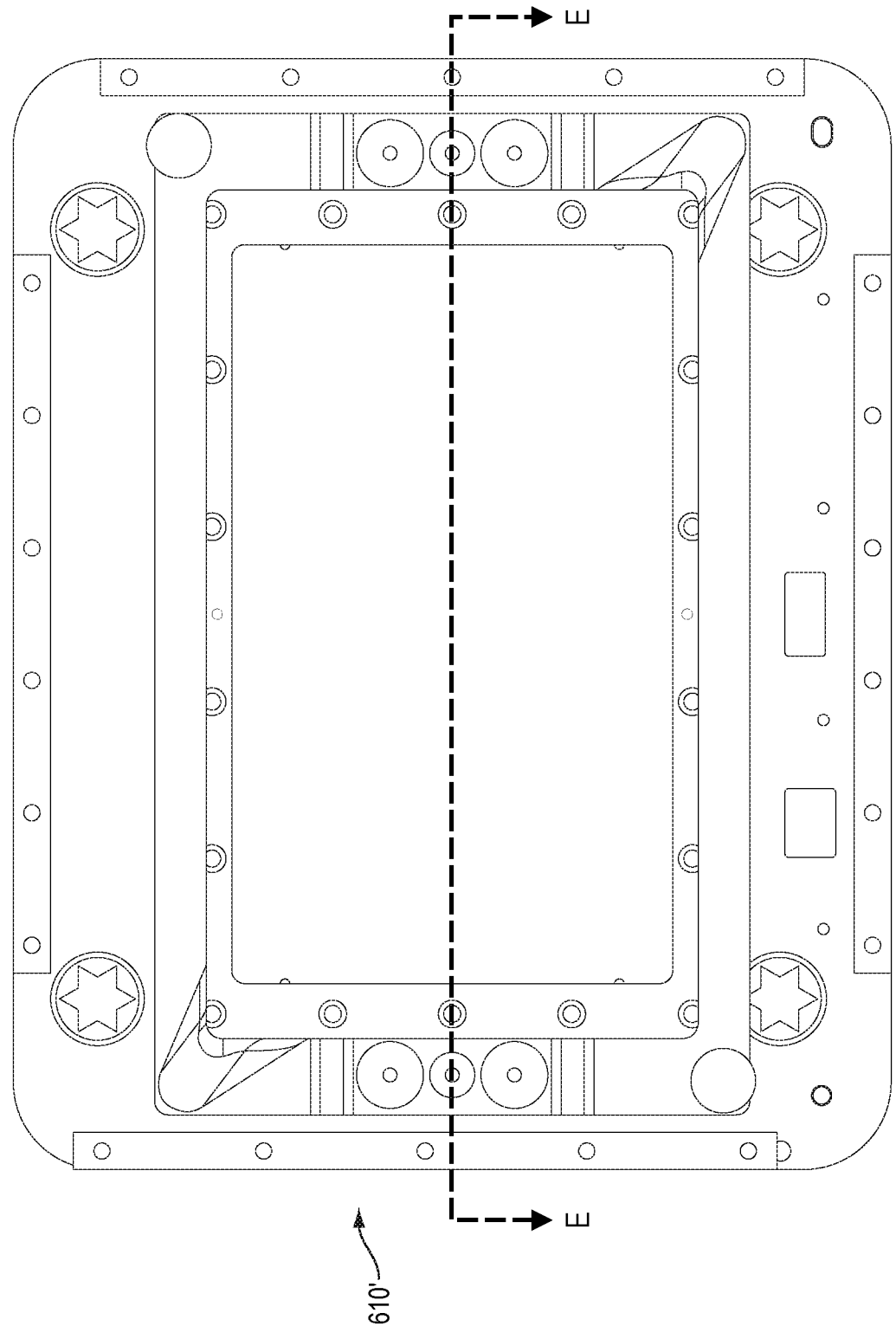
FIG. 22A is a top view of a reservoir glass of the additive manufacturing system of FIG. 1, having a cross-sectional line E-E illustrated.
Figure 22B:
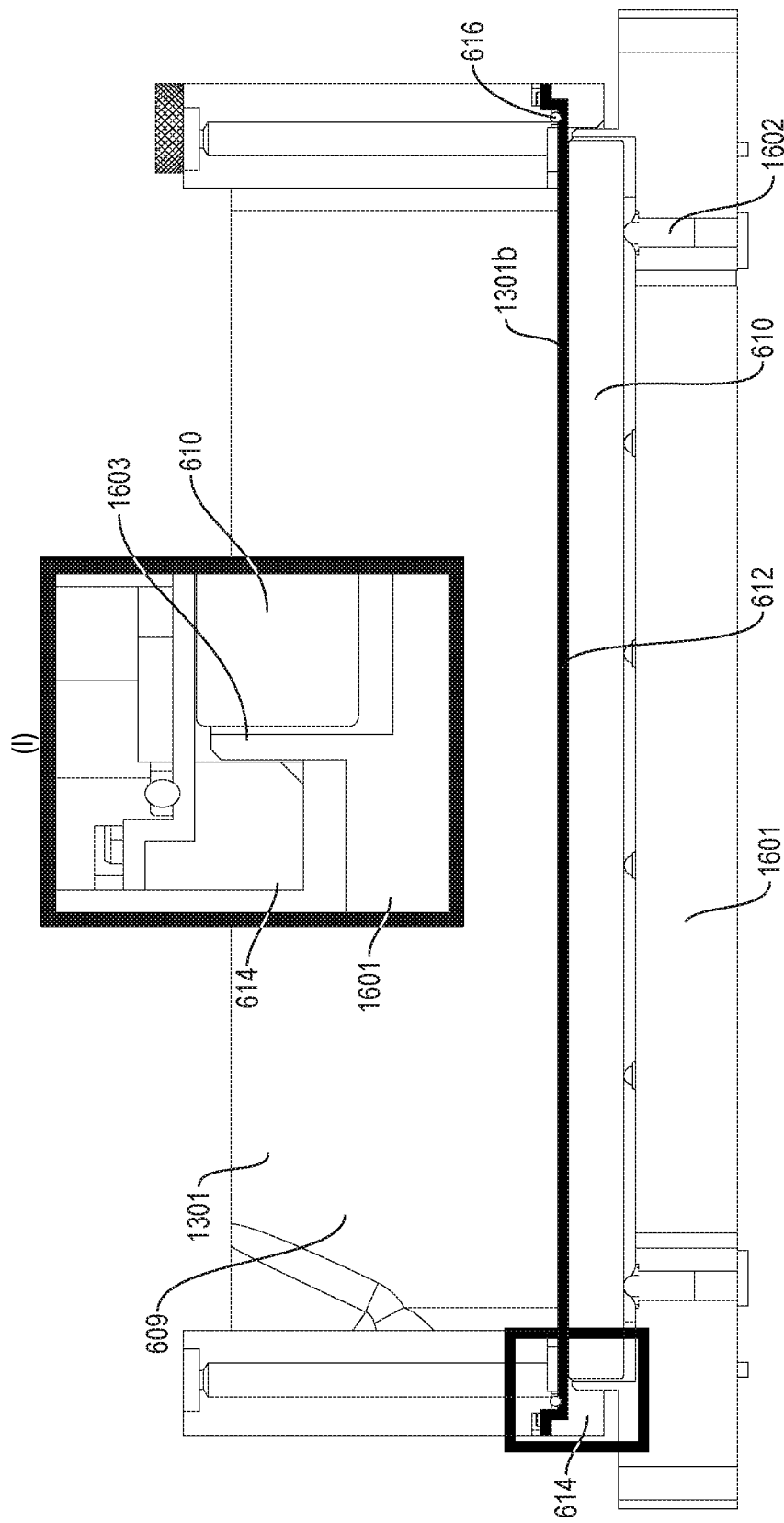
FIG. 22B is a cross-sectional side view of the reservoir glass of FIG. 22A taken along line E-E, the reservoir glass being is positioned above a focal plane flange before the reservoir glass is clamped into position, including an inset (I) illustrating the reservoir bottom film tensioning ring of FIG. 14 in greater detail.
Figure 22C:
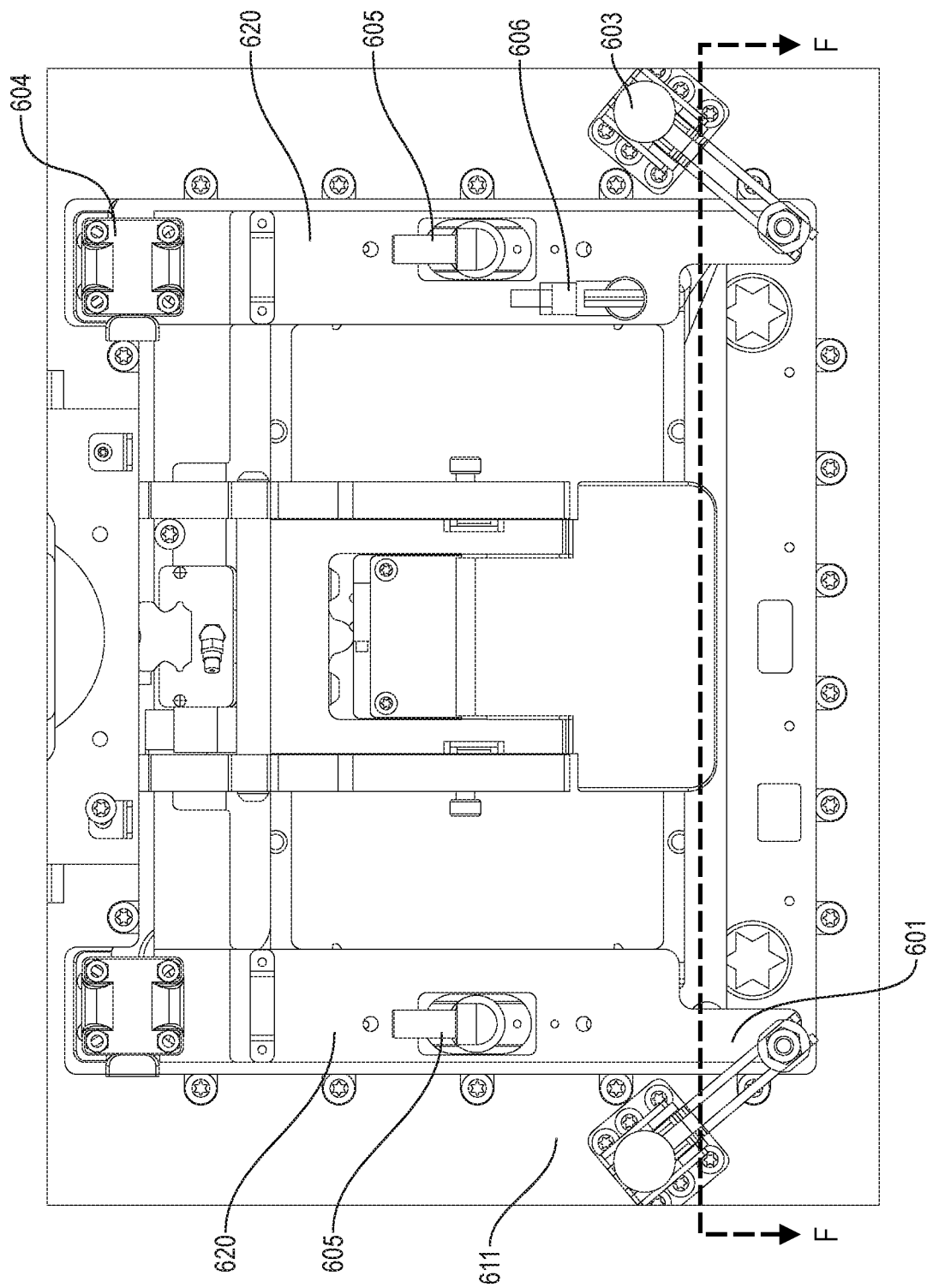
FIG. 22C is a top view of the reservoir glass of FIG. 22A disposed on the reservoir manifold of FIG. 16, having a cross-sectional line F-F illustrated.
Figure 22D:
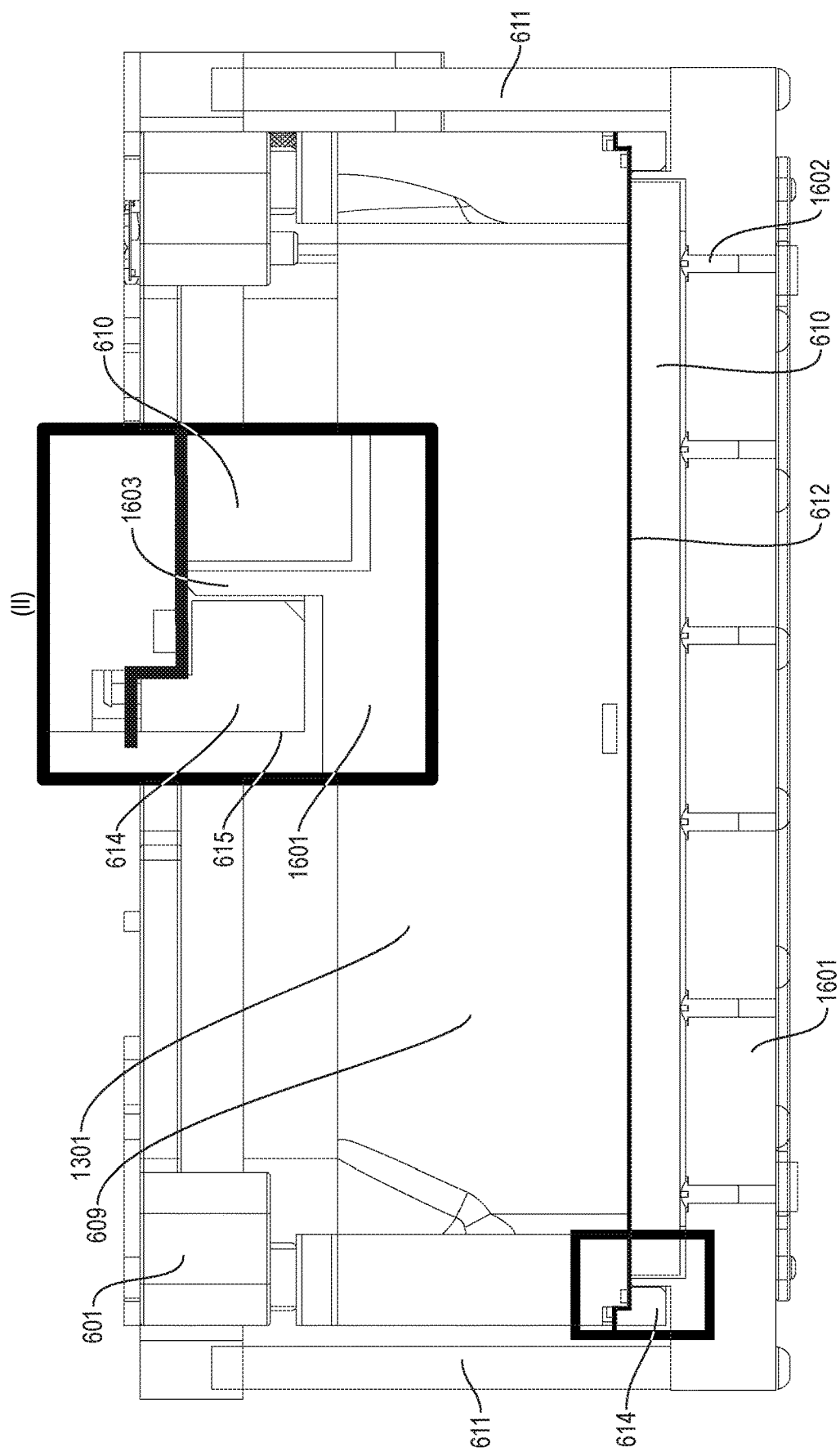
FIG. 22D is a cross-sectional side view of the reservoir glass of FIG. 22C taken along line F-F, with a top surface of the reservoir glass being co-planar with a topmost surface of the focal plane flange after the reservoir glass has been clamped into position by the reservoir and reservoir manifold, including an inset (II) illustrating the reservoir bottom film tensioning ring in greater detail.
Figure 22E:
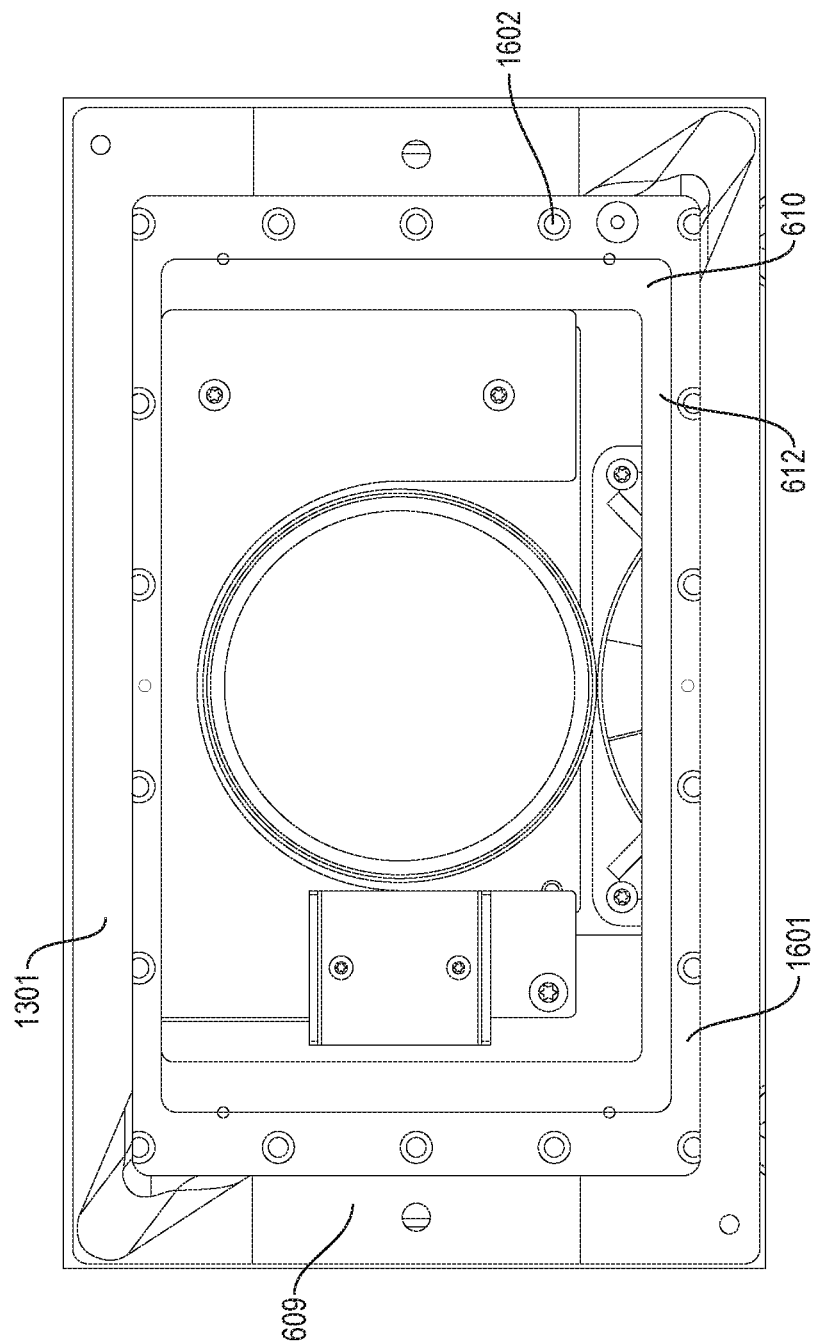
FIG. 22E is a top view of the reservoir glass and focal plane flange of FIG. 22A.

The manifold positions mechanical, electrical, and/or fluid connections relative to the reservoir 609. The reservoir 609 is disposed below the reservoir manifold inside a space defined by the frame 611 and can include (i) a bottom film 612, as discussed in FIGS. 22A-22C, and (ii) a wall 1301 affixed to the bottom film 612, with the wall defining an inlet 1501, an outlet 1503, and a top opening 1505 for receiving the fluid (see FIG. 15A for more details). The wall 1301 can include an inner wall 1303 and an outer wall 1305, with the inner wall 1301 defining a space containing the photopolymer resin(s) that will be additively manufactured. The bottom film 612 is transparent, to allow light to be irradiated from underneath the reservoir into the reservoir, to selectively cure material inside the reservoir during additive manufacturing.

A build plate 608 is positioned inside (and eventually above) the reservoir 609 to enable additive manufacturing of articles or parts. In some embodiments, during a bottom-up additive manufacturing process, a first layer of an article is defined in contact with the build plate 608. Subsequent layers are defined thereunder as the build plate is lifted vertically through the reservoir.

Figure 7:
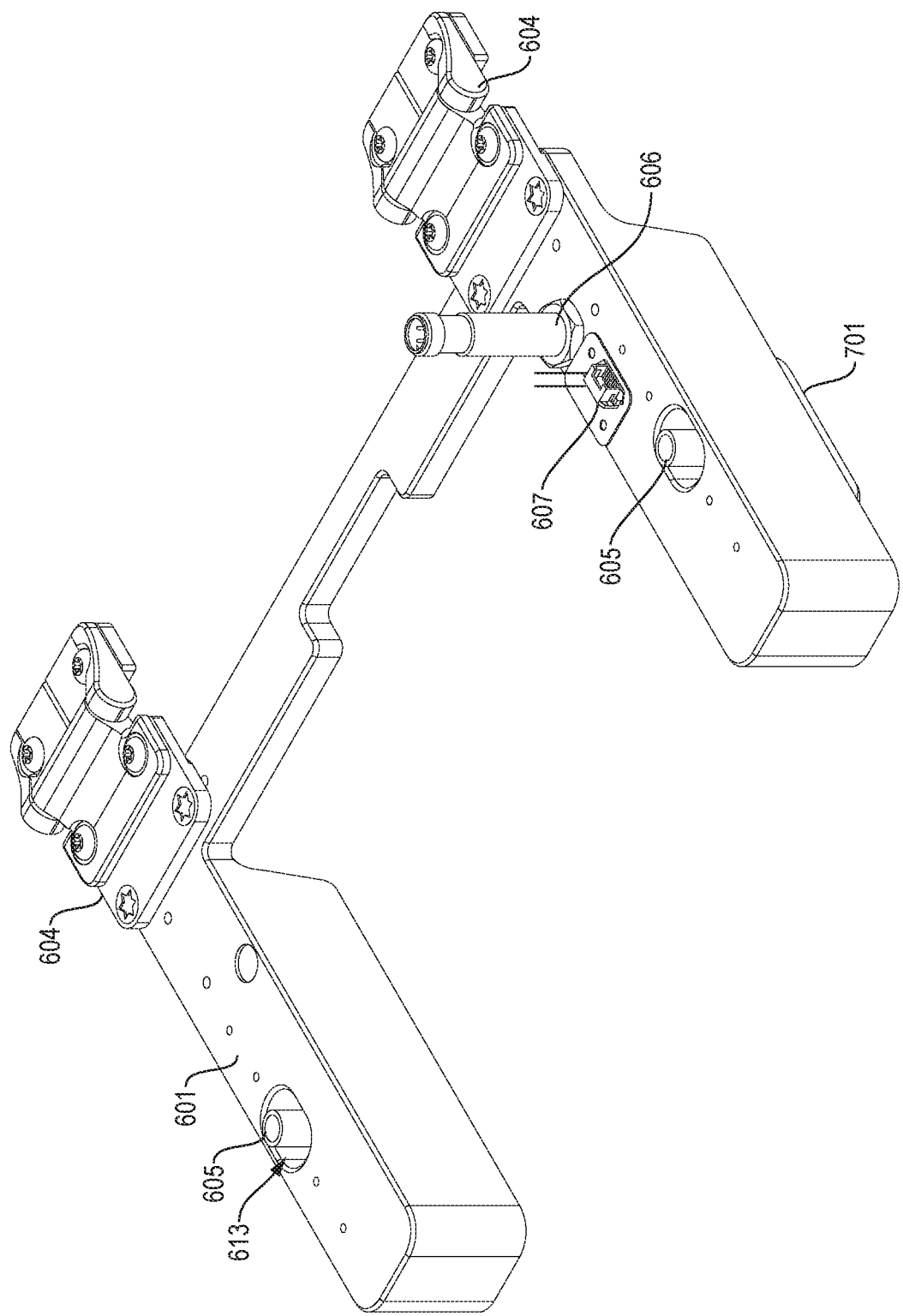
FIG. 7 is a perspective view of the reservoir manifold of FIG. 6A separated from the additive manufacturing apparatus.

The reservoir manifold 601 can position fluid connections 605 in contact with openings or mating connections 1402 on the reservoir 609. The fluid connections can be machined out of aluminum blocks. As shown, the fluid connections 605 are positioned through the conduits 613 formed in the manifold, as shown in FIG. 7. Any number of conduits 613 and connections 605 are possible. The fluid connection can be spring-loaded by, e.g., two springs, such as part number LCD160EE_01_M from Lee Spring.

The manifold fluid connections can be in fluid communication with pumps that drive fluid from a fluid outlet of the manifold, and towards a fluid inlet of the manifold.

The reservoir 609 can be positioned on top of a reservoir glass 610. The reservoir glass 610 is preferably sized and shaped to support the bottom film. It can often be as thin as possible to reduce cost and to conserve space inside the additive manufacturing apparatus while being thick and strong enough to support the mechanical components and materials during the printing process. The reservoir glass may have a thickness from a range of 1 mm to 30 mm, e.g., 13 mm.

The reservoir manifold 601 can position one or more sensors, such as an ultrasonic sensor 606, near the reservoir 609 in a suitable position to measure one or more parameters, such as the height of fluid inside the reservoir 609 with the ultrasonic sensor 606. For example, the ultrasonic sensor 606 may be positioned between the inner and outer walls 1303, 1305 of the reservoir 609, e.g., 12 mm from the inner wall 1303 of the reservoir 609. This sensor 606 can be used to control, and/or inform control by a separate controller(s) or control system(s) of the printing apparatus (not illustrated, but understood by a person skilled in the art for purposes of controlling various operations of a printing apparatus), the rate of fluid flow between the reservoir 609 and, for example, an active mixer, such as the active mixer 201. A suitable ultrasonic sensor 606 can be, e.g., Part Number UNAM 12U9914/S14D from Baumer.

By way of further non-limiting example of one or more sensors that can be used in conjunction with the presently described printing apparatuses and systems, the reservoir manifold 601 can position a time-of-flight optical sensor (not shown), but its use and location would be understood by a person skilled in the art in view of the present disclosures) above the reservoir 609 to measure the height of fluid inside the reservoir 609. This sensor can be used to control, and/or inform control by a separate controller(s) or control system (s) of the printing apparatus (not illustrated, but understood by a person skilled in the art for purposes of controlling various operations of a printing apparatus), the rate of fluid flow between the reservoir 609 and, for example, an active mixer, such as the active mixer 201.

By way of still further non-limiting example of one or more sensors that can be used in conjunction with the presently described printing apparatus and systems, the reservoir manifold 601 can position an infrared temperature sensor 607 near the reservoir 609 in a suitable position to measure the temperature of fluid inside the reservoir 609. For example, the infrared temperature sensor can be positioned between the inner and outer walls 1303, 1305 of the reservoir 609, e.g., 12 mm from the inside edge of the reservoir wall. This information can be used by a controller (s) and/or control system(s) to adjust the rate of fluid flow between the reservoir 609 and, for example, an active mixer, such as the active mixer 201. A suitable infrared temperature sensor can be, e.g., Part Number MLX90614ESF-BCI-000-TU from Melexis.

The reservoir manifold 601, for example by way of the fluid connections 605, can include one or more thermocouples positioned to be embedded in the fluid during use as another non-limiting example of one or more sensors that can be used in conjunction with the presently described printing apparatus and systems. Such thermocouple(s) or thermocouple sensor(s) can be used by a controller(s) and/or control system(s) to adjust the rate of fluid flow between the reservoir 609 and, for example, an active mixer, such as the active mixer 201.

Still further, the reservoir manifold 601, for example by way of the fluid connections 605, can include one or more thermistors positioned to be embedded in the fluid during use as another non-limiting example of one or more sensors that can be used in conjunction with the presently described printing apparatus and systems. Such thermistor(s) or thermistor sensor(s) can be used by a controller(s) and/or control system(s) to adjust the rate of fluid flow between the reservoir 609 and, for example, an active mixer, such as the active mixer 201. The thermistor(s) can be, e.g., part number NTCLE305E4103SB from Vishay.

A fluid adapter, e.g., part number 5449K345 from McMaster-Carr, can be pressed onto one or more of the fluid connections 605 to provide a fitting for a fluid hose. The fluid hose can pass through peristaltic pumps, e.g., part number 25001.000 from Boxer. These pumps can create fluid flow out of the reservoir manifold outlet and into the reservoir manifold inlet.

Still a further example of one or more sensors that can be used in conjunction with the presently described printing apparatus and systems is a radio frequency identification (RFID) emitter (not illustrated). The emitter can be disposed, for example, on the reservoir manifold 601, adapted to assist in positioning the reservoir manifold 601 relative to the reservoir 609. In some embodiments, the RFID emitter can be implemented in the position and form factor of the infrared temperature sensor 607 as shown in FIG. 7.

The reservoir manifold 601 can include electrical connectors configured to connect to mating electrical connectors on the reservoir. For example, in some embodiments, an electrical contact can be associated with one or more of the reservoir manifold 601 or the reservoir 609.

An infrared heating element (not shown) can be positioned, for example, on the reservoir manifold 601 and/or above the reservoir 609 to radiate heat to the fluid in the reservoir 609.

The peristaltic pumps can create fluid flow through an external heater, as discussed above with respect to FIGS. 3 and 4. The external heater 401 can include two heater block halves machined from aluminum blocks or plates 402, though it will be appreciate that the external heater 401 can have any number of blocks or plates and/or such blocks or plates do not have to have the same size and/or shape. The aluminum blocks 402 can have machined D-shaped channels 412, defined by, e.g., a 10 mm ball endmill. The channels in the aluminum blocks can align to each other. Aluminum tubing can be fixtured inside the channels to contain the resin that flows through the heater block 402 during use. The tubing can be pressed into the channels during assembly, for example by M8 screws. Static mixers, such as Part Number HT-40-8.00-12-AC from StaMixCo, can be assembled into the tubing. The heater blocks can be heated by cartridge heaters such as HDC00051 from Tempco.

As discussed above, FIG. 7 illustrates the reservoir manifold 601 having three beams 620 shaped as a "U" around the reservoir area. This geometry can enable the reservoir manifold 601 to rotate about the hinge 604 while avoiding interference with the build plate 608.

The reservoir manifold 601 can include a spring-loaded coupling element 701 that can be configured to make a mechanical connection between the reservoir manifold 601 and the reservoir 609. The coupling element can be machined out of aluminum blocks or other suitable material (s). The coupling element 701 can be, e.g., rectangular and sized to fit on a bottom face 630 of at least one of the beams 620 of the reservoir manifold 601. The coupling element 701 can be spring-loaded by, e.g., two springs, such as part number LC_016BD_10S316 from Lee Spring. Other ways of coupling the manifold 601 to the reservoir 609 are disclosed herein. A person skilled in the art, in view of the present disclosures, will understand ways beyond those disclosed herein that can be used to couple the manifold 601 to the reservoir 609.

The reservoir manifold 601 can be configured to be moved in and out of the reservoir area by a combination of translational and rotational mechanisms, some non-limiting examples of which are provided for herein.

Figure 8:
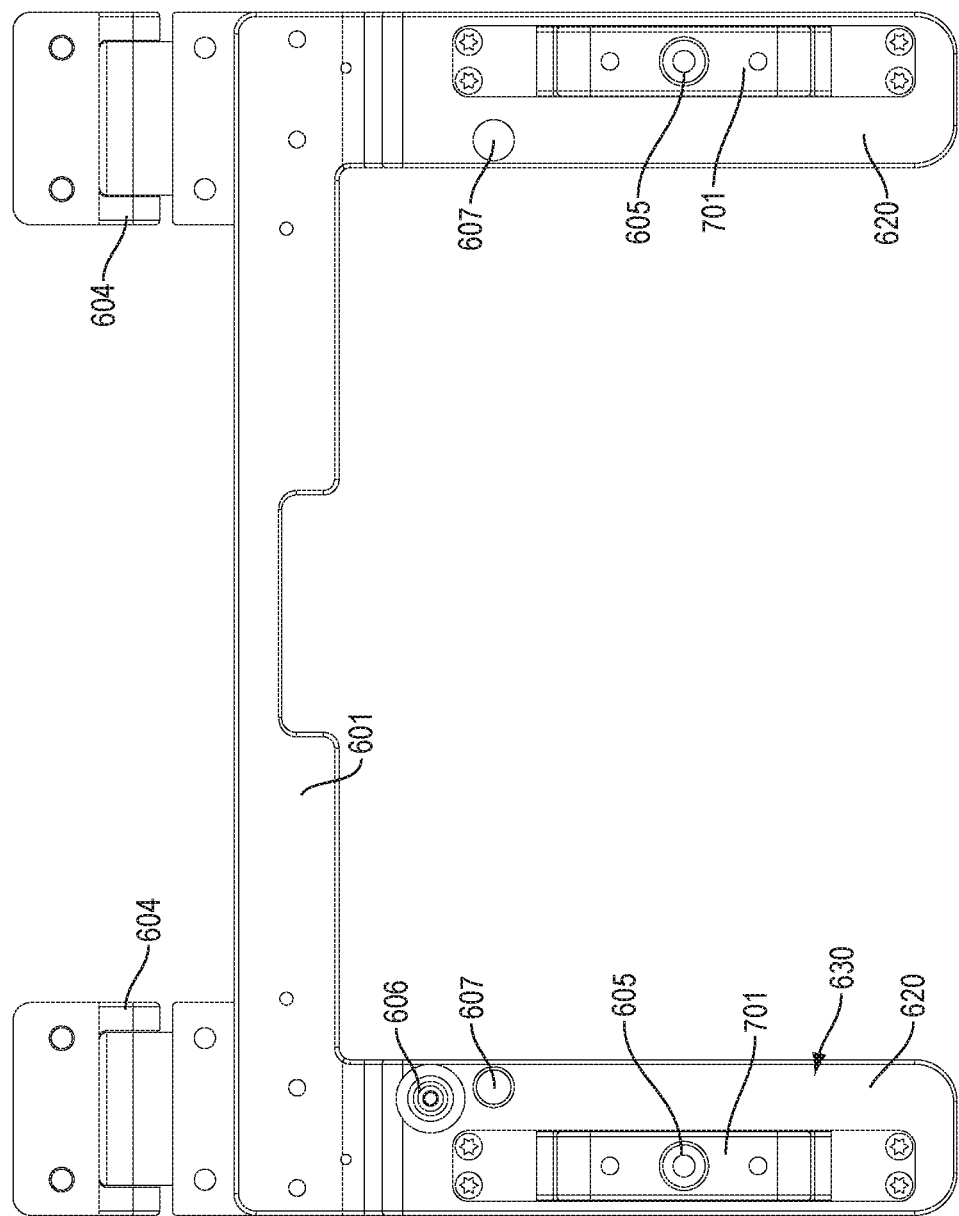
FIG. 8 is a bottom view of the reservoir manifold of FIG. 7.

Referring to FIG. 8, a fluid connection 605 can be positioned within the coupling element 701. The coupling element can maintain a rigid fluid connection between the fluid connection and the mating connection 1402 on the reservoir 609.

Figure 9:
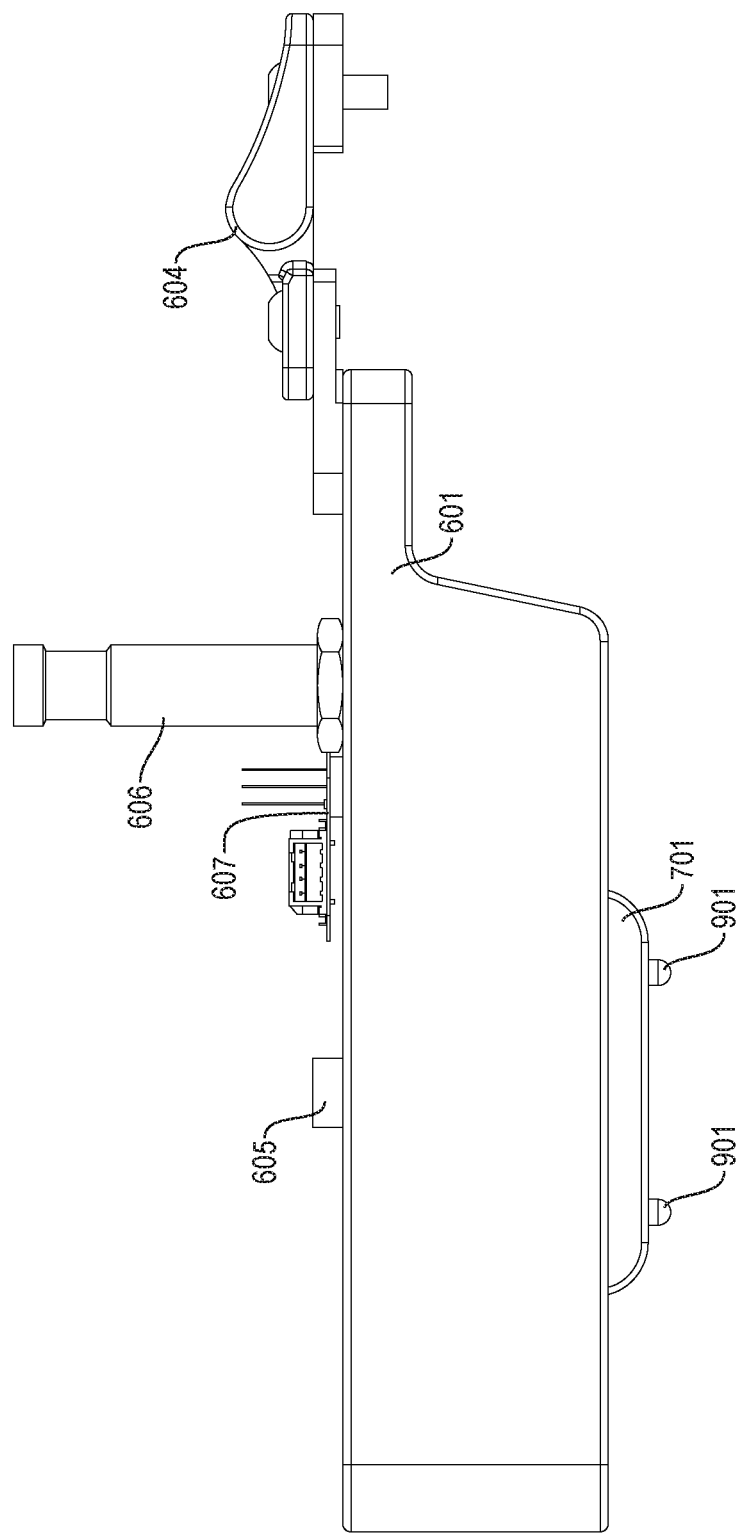
FIG. 9 is a side view of the reservoir manifold of FIG. 7, including electrical, mechanical, and fluid connections.

Referring to FIG. 9, the coupling element 701 can contain one or more alignment features 901 configured to position the fixturing element 701 relative to the reservoir 609 as the reservoir manifold 601 is lowered into position. The alignment feature(s) 901 can be, e.g., posts disposed on the coupling element 701, among a variety of other alignment features that achieve the same alignment purpose, as will be appreciated by those skilled in the art.

Figure 10:
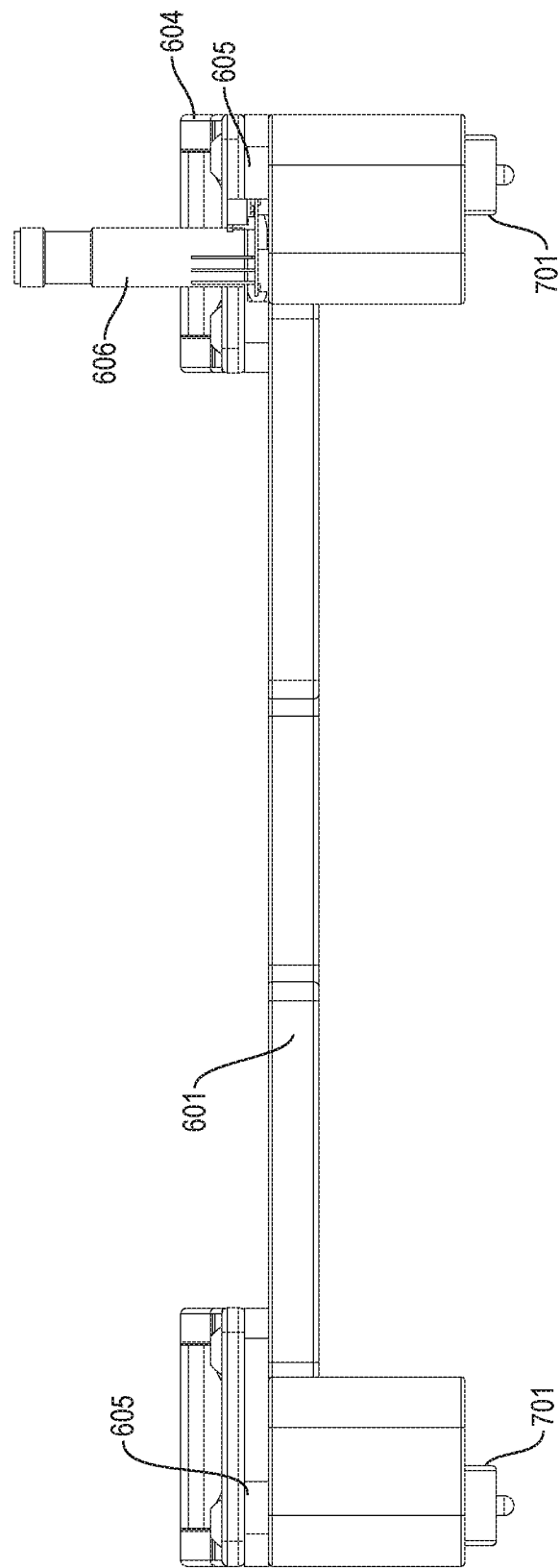
FIG. 10 is a front view of the reservoir manifold of FIG. 7.

Referring to FIG. 10, the coupling element 701 can protrude below the bottom face 830 of the reservoir manifold 601.

Figure 11A:
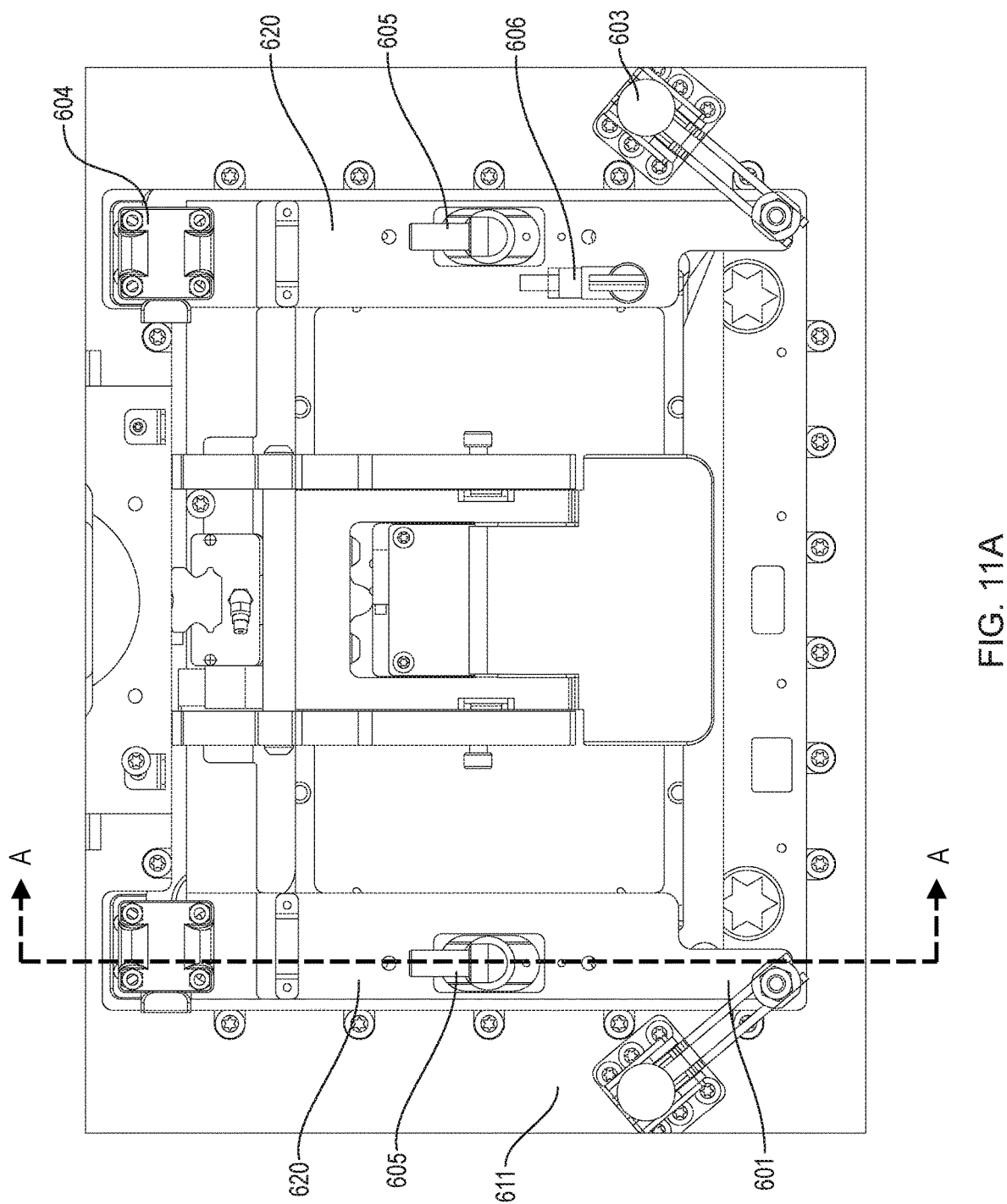
FIG. 11A is a top view of the reservoir manifold of FIG. 7 coupled to a frame of the additive manufacturing apparatus of FIG. 1, having a cross-sectional line A-A illustrated.
Figure 11B:
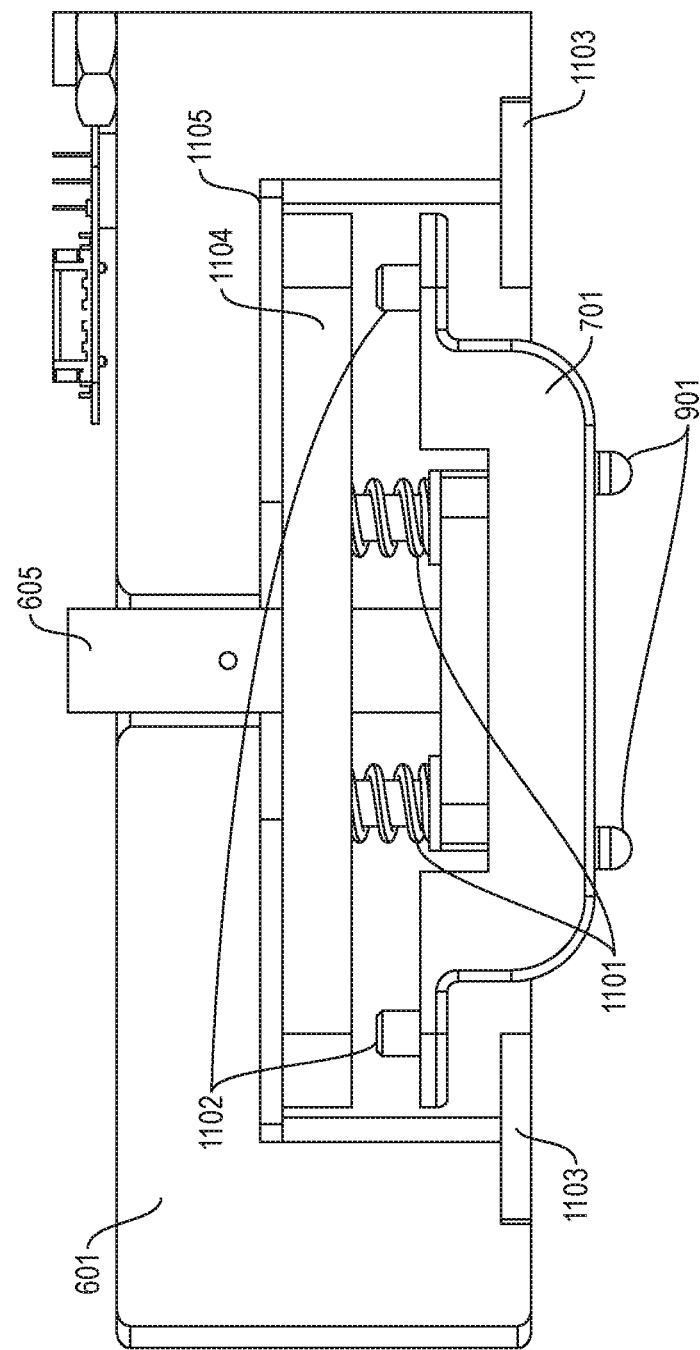
FIG. 11B is a cross-sectional side view of the reservoir manifold and related components of FIG. 11A taken along line A-A, illustrating components that make mechanical connections and electrical connections with the reservoir manifold of FIG. 7.

Referring to FIGS. 11A-11B, which provides for additional components of the printing apparatus 100, the coupling element 701, spring plate 1104, and fluid connection 605 can be coupled together, for example, on a pair of spring-loaded engagement features, i.e., primary springs 1102 and secondary hold-down springs 1101. The primary springs 1102 can be compressed between the spring plate 1104 and the coupling element 701. The spring plate can rest on low-friction pads 1105 that can allow the spring plate to move laterally. Secondary hold-down springs 1101 can be compressed with preload between the spring plate 1104 and the fluid connection 605.

When the reservoir manifold 601 is substantially or completely disengaged from the reservoir 609, the coupling element 701 can be pushed into contact with travel limiters 1103. The travel limiters can be, for example, flat plates connected to the reservoir manifold and can be machined from aluminum blocks, and can be fastened to the reservoir clamp.

As the reservoir manifold 601 is lowered into contact with the reservoir 609, the primary springs 1102 can exert a downward force on the mechanical alignment features 901 to position the coupling element 701 relative to the reservoir 609. This process can align the fluid connection 605 to the mating connection 1402 on the reservoir 609. Once the coupling element 701 has been moved to a height that engages the secondary springs 1101, the force required to translate the reservoir manifold 601 may increase. These springs can have a high enough force that they require a clamp 603 to further rotate the reservoir manifold 601. As the reservoir manifold 601 rotates further towards the reservoir 609, the secondary springs 1101 compress, applying a force between the reservoir 609 and the coupling element 701. The fluid connection 605 can begin to protrude from the lower surface of the coupling element 701, making a fluid seal to the mating connection 1402 on the reservoir 609.

In some embodiments, the fluid connections 605 can be positioned separately from the coupling element 701.

Figure 12A:
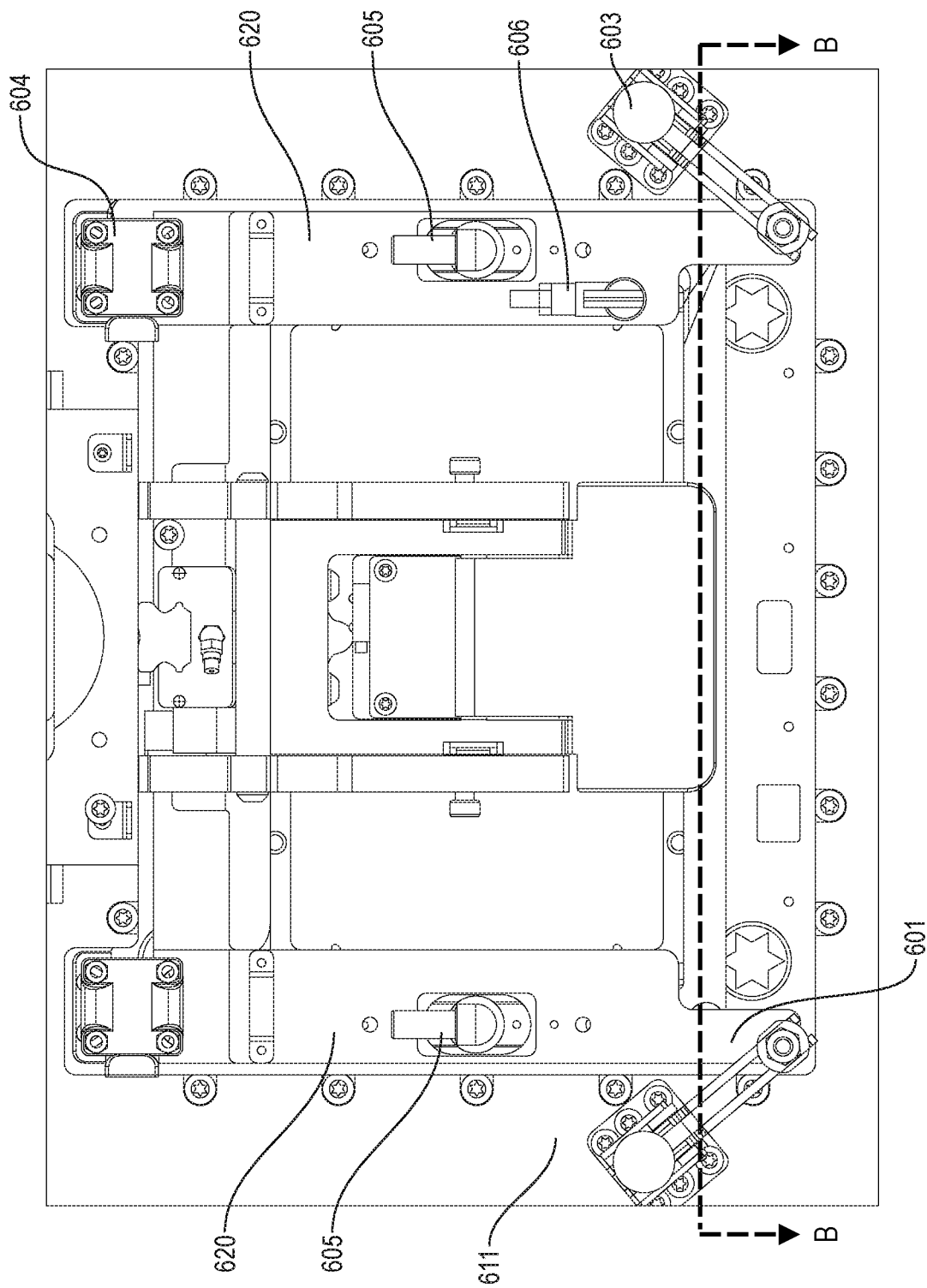
FIG. 12A is the top view illustrated in FIG. 11A, having a cross-sectional line B-B illustrated.
Figure 12B:
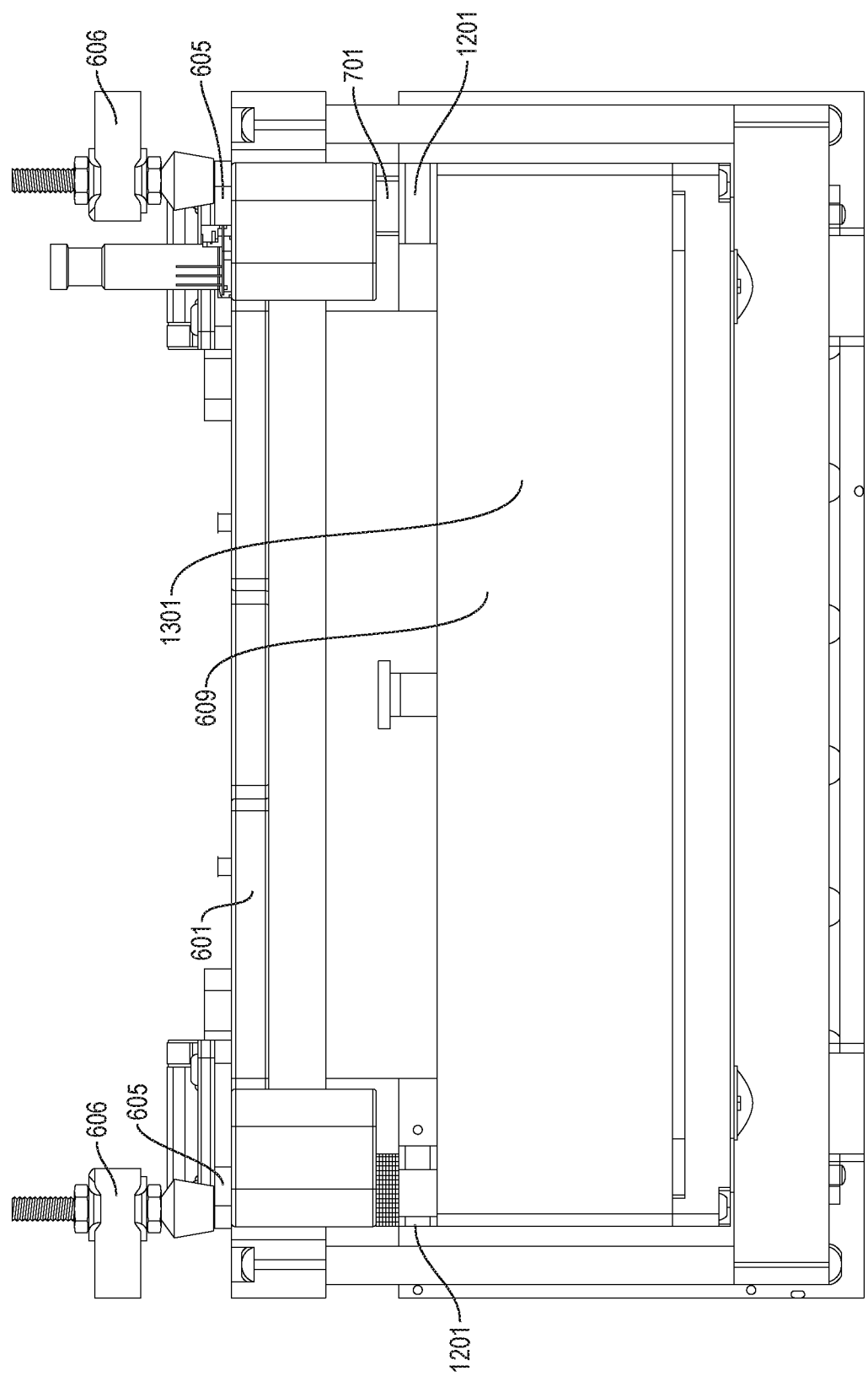
FIG. 12B is a cross sectional side view of the reservoir manifold and related components of FIG. 12A taken along line B-B, illustrating the reservoir manifold clamped in contact with the reservoir.

Referring to FIGS. 12A-12B, the wall 1301 of the reservoir 609 can have an elevated surface 1201 to facilitate making mechanical and fluid connections with the coupling element 701.

Figure 13A:
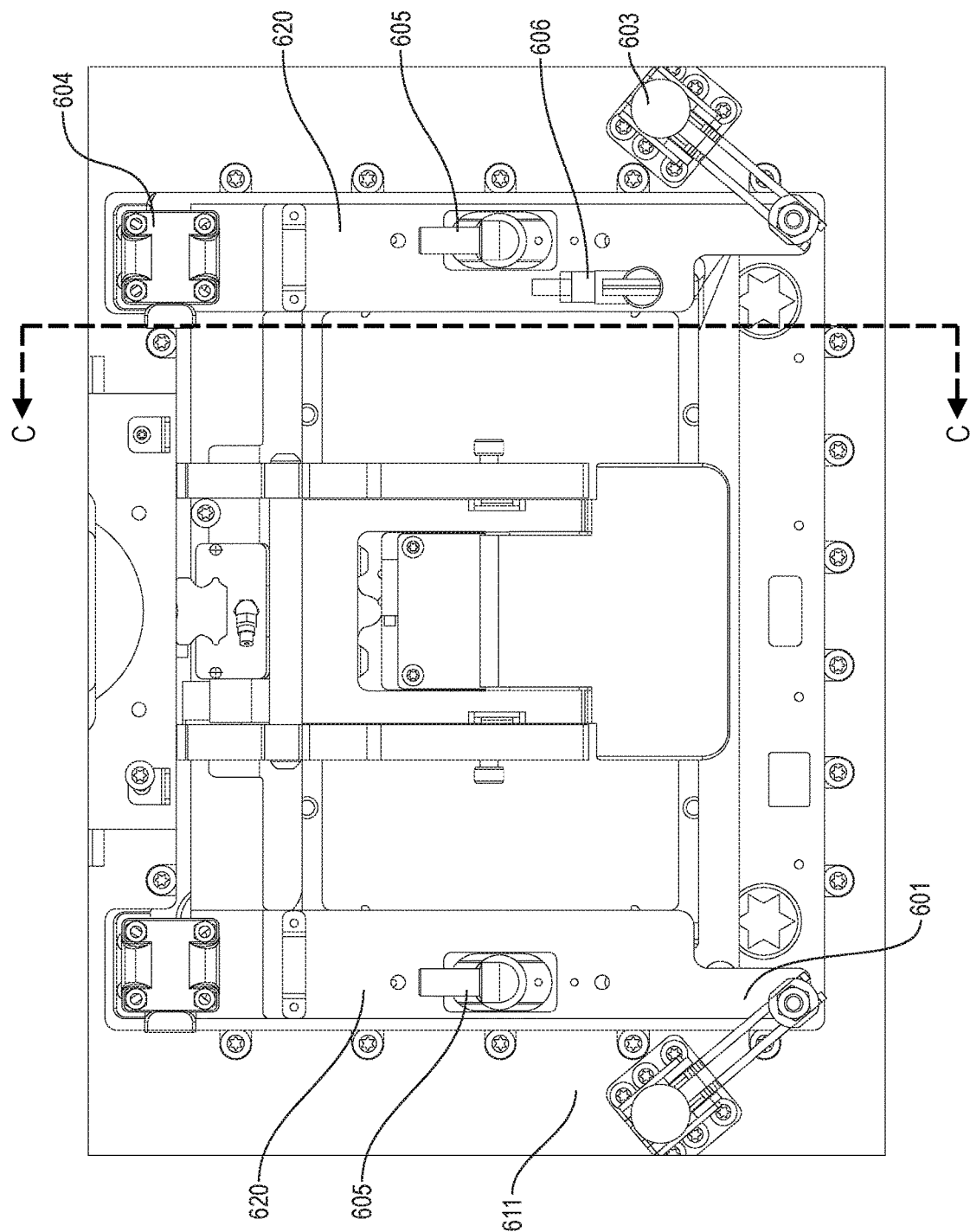
FIG. 13A is the top view illustrated in FIG. 11A, having a cross-sectional line C-C illustrated.
Figure 13B:
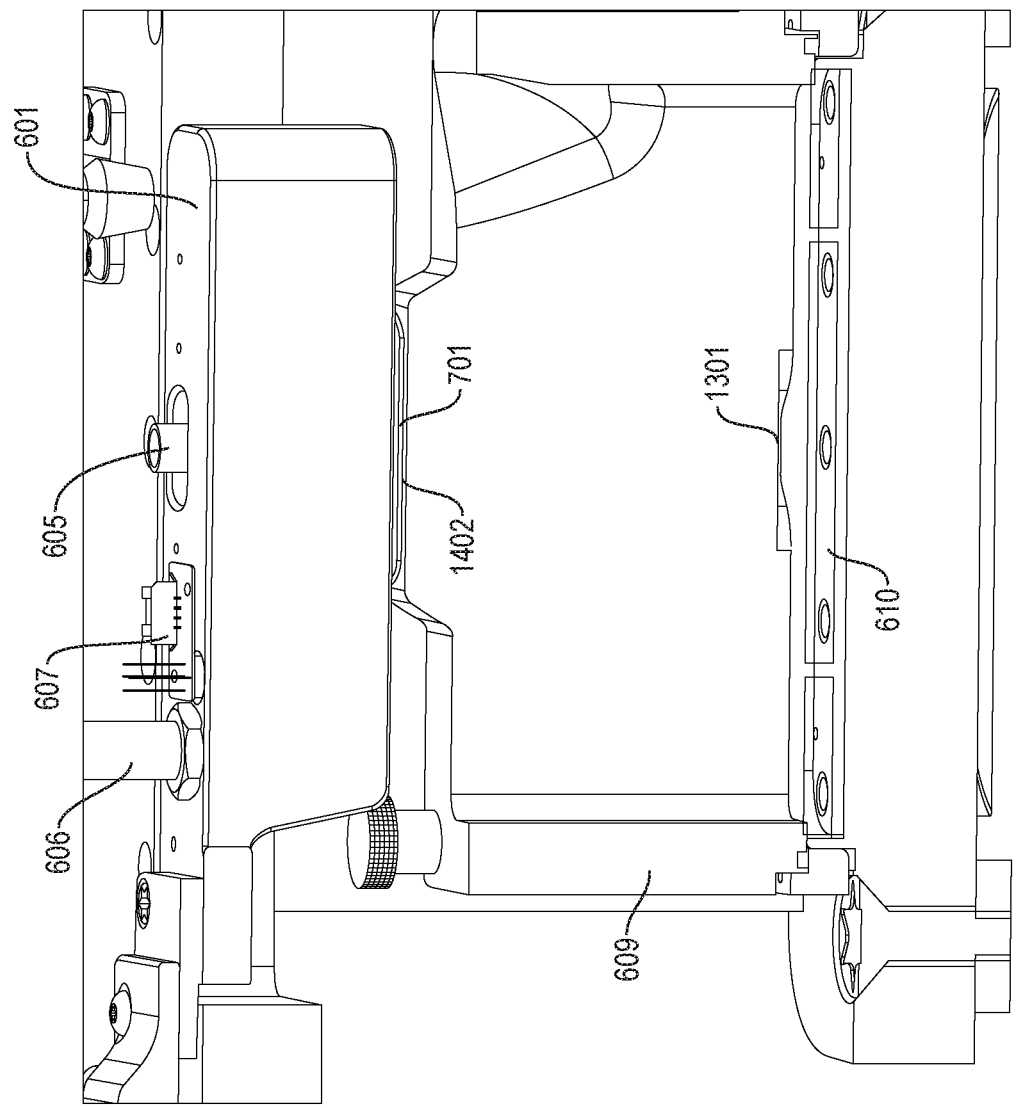
FIG. 13B is a cross-sectional perspective view of the reservoir manifold and related components of FIG. 13A taken along line C-C, illustrating one side of the reservoir manifold clamped in contact with the reservoir.

Referring to FIGS. 13A-13B, the fluid connection 605 in the reservoir manifold can be in fluid communication with the mating connection 1402 in the reservoir wall 1301 to enable fluid flow between the two components.

Figure 14:
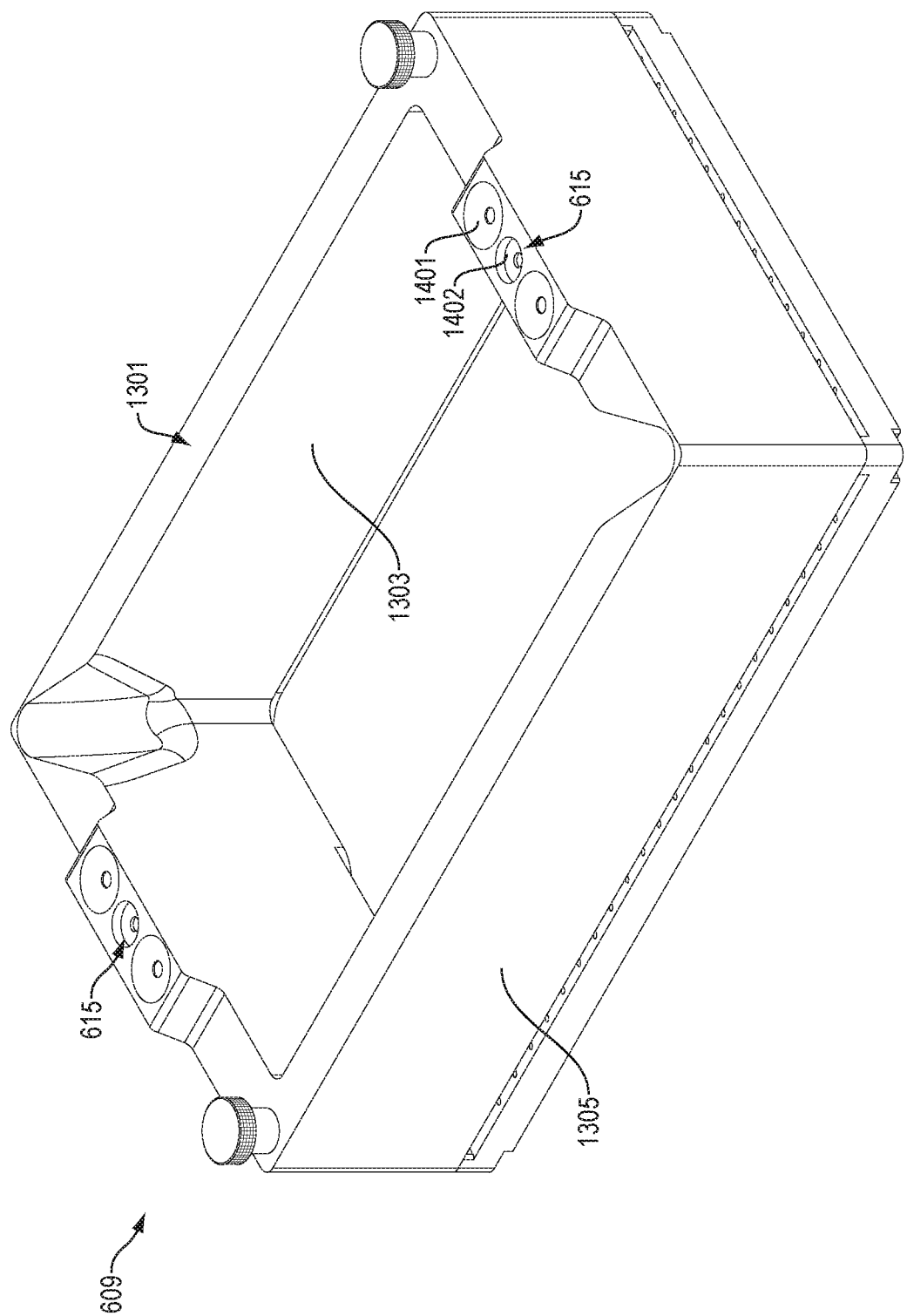
FIG. 14 is a perspective view of the reservoir of FIG. 6A being coupled to a reservoir bottom film tensioning plate, the reservoir having mechanical alignment features and fluid connections on its top surfaces.

Referring to FIG. 14, the reservoir 609 can contain fluid seals (not shown) that are configured to be disposed over the fluid connections 605 of the reservoir manifold 601 to receive the fluid connections 605 therein for example, via the conduit(s) 613. The reservoir 609 can also have tapered mechanical alignment features 615. The reservoir alignment features 615 can have, by way of non-limiting example, a conical profile to mate with the reservoir manifold 609, thus helping reduce misalignment between the reservoir manifold 601 and reservoir 609.

FIGS. 15A-15C illustrate an alternate embodiment of a reservoir 609' having one or more filters 1502 coupled thereto. As shown, the filter(s) 1502 can be disposed within or in lieu of the fluid seals. For example, as shown in FIG. 15A, one or more inlet filters 1504 can be disposed or otherwise attached to the reservoir 609' in proximity to an inlet 1501 thereof and one or more outlet filters 1506 can be disposed or otherwise coupled to the reservoir 609' in proximity to an outlet 1503 thereof. The filter 1504 can be used to filter any debris or other possible undesirable objects or particles from entering the reservoir 609' to reduce the possibility of any printing errors, such as compromised material being used in the print. Likewise, the filter 1506 can be used to filter any debris, cured resin, fiber agglomerations, and/or other possible undesirable objects or particles from leaving the reservoir 609' and entering a fluid path leading toward other components of the printing apparatus (e.g., an active mixer, like the active mixer 201) to reduce the possibility of any printing errors, such as clogging the fluid path within the apparatus.

FIG. 15B shows the inlet filter 1504 within the reservoir 609' in greater detail. As shown, the inlet filter 1504 can be disposed in an opening 1508 formed in a wall 1301' of the reservoir 609', though a person skilled in the art will recognize that the filter can be associated with the reservoir 609' using a variety of techniques known to those skilled in the art for associating a filter with another component, including any known mechanical techniques (e.g., male-female connectors, snap-fit, press-fit, threads, glue, weld, etc.) or otherwise associated with the reservoir 609' to be in fluid communication with any fluid that enters the reservoir. The inlet filter 1504 can be an inline mesh filter, though, in some embodiments, the filter can be a centrifugal filter, a wye strainer or a tee strainer. A size of the mesh is variable and can be changed based on system requirements, such as for materials of higher viscosity to reduce a pressure drop through the filter. In some embodiments, the inlet filter 1504, or a portion thereof (such as a screen of the filter) can be disposable to allow for easy removal and cleaning to ensure particulates are filtered out.

The inlet filter 1504 can include a proximal surface having an opening 1509 formed therein for establishing the fluid communication between the manifold (not shown, but the reservoir 601 is one such example) and the reservoir 609'. As compared to previous embodiments in which the inlet feeds fluid into the reservoir through or proximate to a bottom of the reservoir, the inlet of the present embodiment feeds fluid into the reservoir 609' through the opening 1509 located proximate to a top surface of the reservoir 609'. A person skilled in the art will recognize that the term "proximate" can refer to being at or near the stated location. An O-ring 1512 can be provided in conjunction with the opening 1509 to help insure a fluid-tight connection, The fluid can enter through the opening 1509 and run down the wall 1301', towards a base of the reservoir 609' (e.g., a reservoir glass, not illustrated, but akin to the glass 610). Pushing the fluid to enter through the top of the reservoir 609', or top-feeding, can prevent the formation of a dead zone in the reservoir 609' in which resin settles at the bottom of the reservoir 609', can form clumps therein, and thus preventing additional fluid from flowing into the reservoir 609'.

In some embodiments, the heater block plates 402 can be disposed at the top of the reservoir. Disposing the heater block at the top of the reservoir 609' for top-feeding heat into the system can allow proper draining of the heat from the system and easier feeding of the heat into the reservoir 609' to facilitate printing. In some embodiments the heater block plates 402 can be disposed at a position below the reservoir. As noted above, the heater block plates 402 can include two halves or any number of plates that make up the heater block, having a variety of shapes and sizes.

In use, the system can drive fluid through the inlet filter 1504 with the driving pressure of the circulation pumps (e.g., the pumps 202, 203, although not shown in this embodiment). In embodiments that include a closed-loop fluid line between the inlet 1501 and the outlet 1503, with the closed loop indicating that the only exposure to atmospheric pressure is at the inlet 1501 and at the outlet 1503, the inlet filter 1504 can allow the system to switch flow direction and pull fluid away from the inlet 1501. Pulling fluid away from the inlet 1501 draws air through the inlet filter 1504 and into the inlet nozzle, draining the fluid loop into the reservoir 609' through the reservoir outlet 1503, which would not be possible if the reservoir inlet 1501 introduced material to the reservoir 609' from below the active level of the fluid resin, as in the embodiment of FIG. 6A. It will be appreciated that one or more of the inlet filter 1504 and the outlet filter 1506 are optional, with the printer being configured to function with one or more of the filters being installed.

FIG. 15C illustrates the outlet filter 1506 of the reservoir 609' in greater detail. As shown, the outlet filter 1506 can include a coarse grate sifter 1514, though in some embodiments, a mesh filter such as in FIG. 15B or tee strainer. The outlet filter 1506 can include a proximal coupling portion 1516 for coupling to the mating connection 1402 formed in the reservoir and extends downward to cover the outlet with one or more prongs 1518 of the grate sifter 1514 blocking a portion of the outlet of the reservoir 609'. The prongs 1518 can filter macro contaminants, such as debris, partially cured resin, fiber agglomerations, and/or other possible undesirable objects or particles, like broken pieces of the part actively being printed, thus preventing them from entering the fluid path that drives fluid back to one or more components of the printing apparatus (e.g., the active mixer 201, the passive mixer 301, the heating element 401, the material container 501). Prevention of the macro-contaminants from entering the circulation loop can avoid a circulation system clog and failure as the fluid flows through the system. In some embodiments, the system can include an alarm or another form of communication, signal, etc. to warn users of an existing clog. Once the fluid is filtered it exits through the outlet 1503 and passes through a manifold to the remainder of the system as discussed in greater detail herein.

In some embodiments, driving fluid through the inlet filter 1504 into the reservoir 609' and cycling the fluid out of the reservoir 609' can occur substantially continuously and/or simultaneously such that the fluid is flowing through the inlet 1501 and the outlet 1503 substantially at the same time. A person skilled in the art will recognize that substantially simultaneous operation includes flow through the inlet and the outlet that occurs within approximately 0.01 seconds of one another, though in some embodiments, substantially simultaneous operation can include from approximately 0.05 seconds to approximately 5 seconds. Moreover, heating the fluid can occur in conjunction with cycling the fluid such that the fluid is heated while, at substantially the same time, it is being driven through the system 100. Additionally, the fluid can be heated when disposed or inside another component of the system 100, e.g., the heating element 401, or being treated, such as in the filters 1502, and the like, independent of whether the fluid is being cycled or is substantially stationary within the system 100.

Figure 15D:
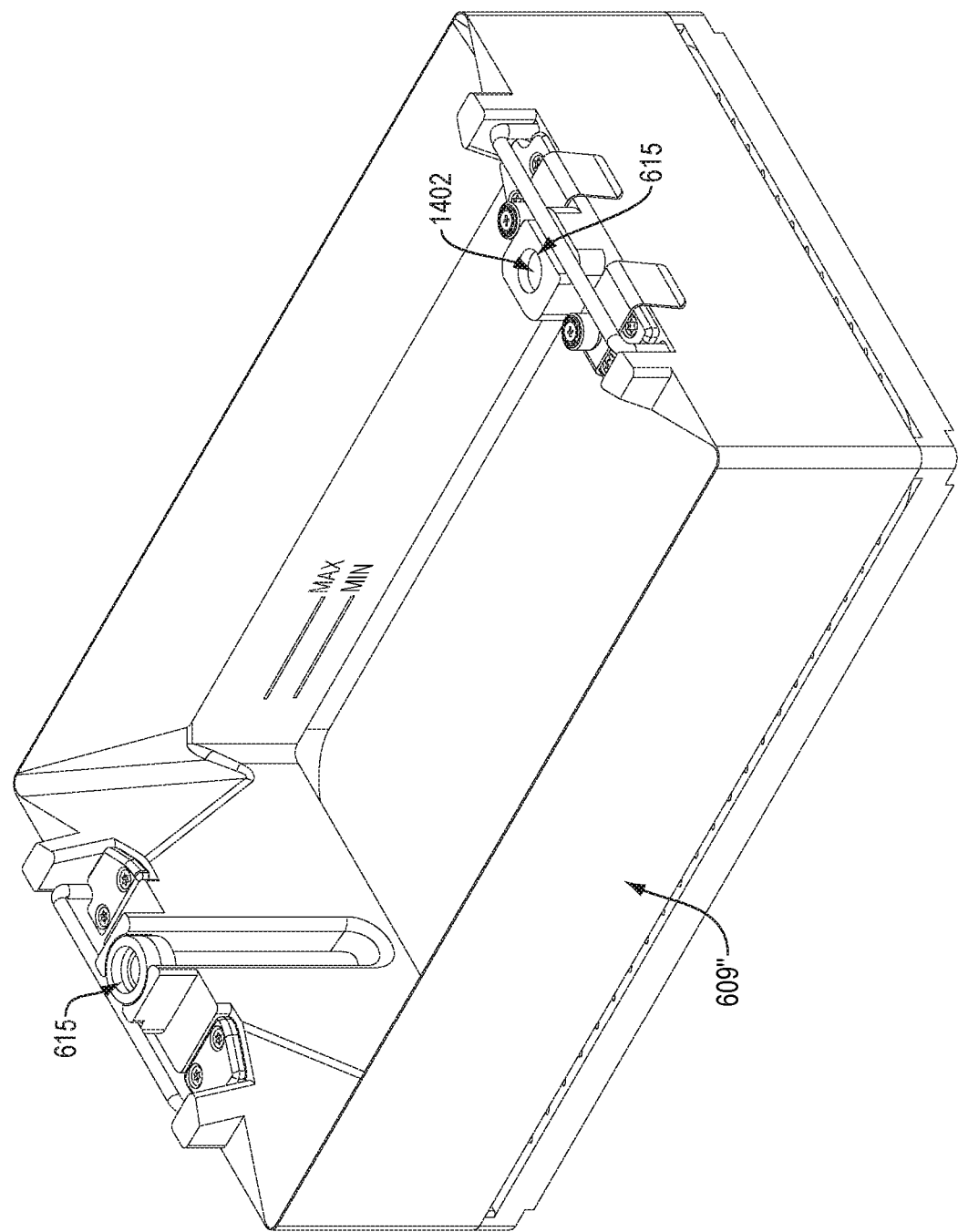
FIG. 15D is a perspective view of another exemplary embodiment of a reservoir, the reservoir not including fluid seals associated therewith.

In some embodiments, the fluid seals can travel with the manifold and/or fluid connections, thus the reservoir 609" does not include fluid seals 1404 as shown. FIG. 15D illustrates an embodiment of a reservoir 609" in which the fluid seals are not disposed in the reservoir 609". The mechanical alignment features 615 are disposed in the mating connection 1402 of the reservoir 609", with the mechanical alignment features being discussed in greater detail below.

Figure 16:
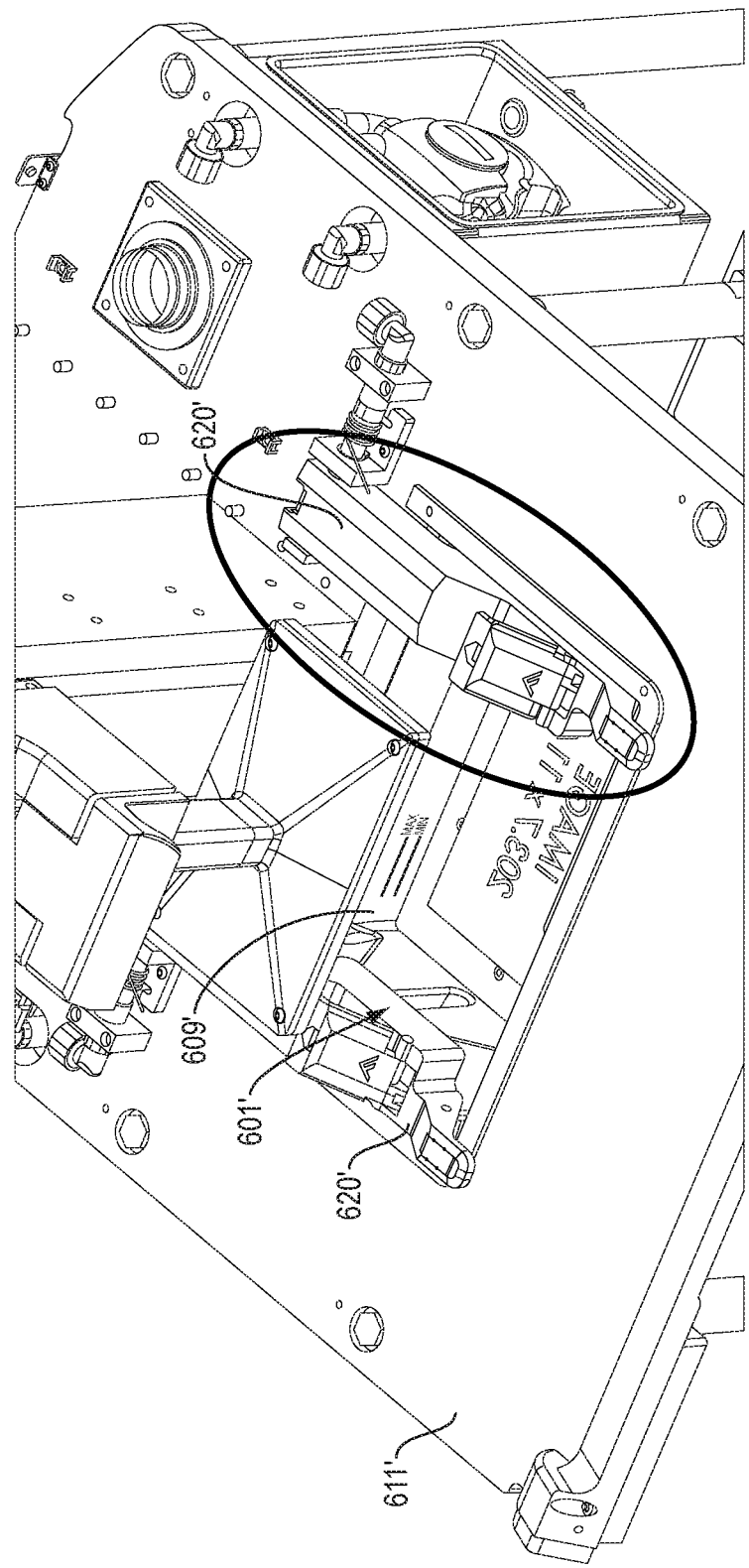
FIG. 16 is a top perspective view of another embodiment of a reservoir manifold for making electrical, mechanical, and fluid connections to a reservoir inside of an additive manufacturing apparatus.

FIG. 16 illustrates an alternate embodiment of a system having a reservoir manifold 601' having separate beams or arms 620' in lieu of the U-shape manifold discussed above. The arms 620' are formed as separate pieces that are independently movable, which provides a spatially economical design that removes a portion of the manifold 601' that covers the reservoir in the previous design. The absence of any manifold material between the arms 620' of the manifold 601' covering the reservoir 609' decreases the cost of production of the manifold 601' as less material is used to create the manifold, which also lowers the eventual price of the system to the user. Moreover, the absence of any connection between the arms 620' prevents occlusion of the reservoir 609', enabling a user to have greater access to add and/or remove substances from the reservoir 609' and greater visibility into the contents of the reservoir.

Figure 17:
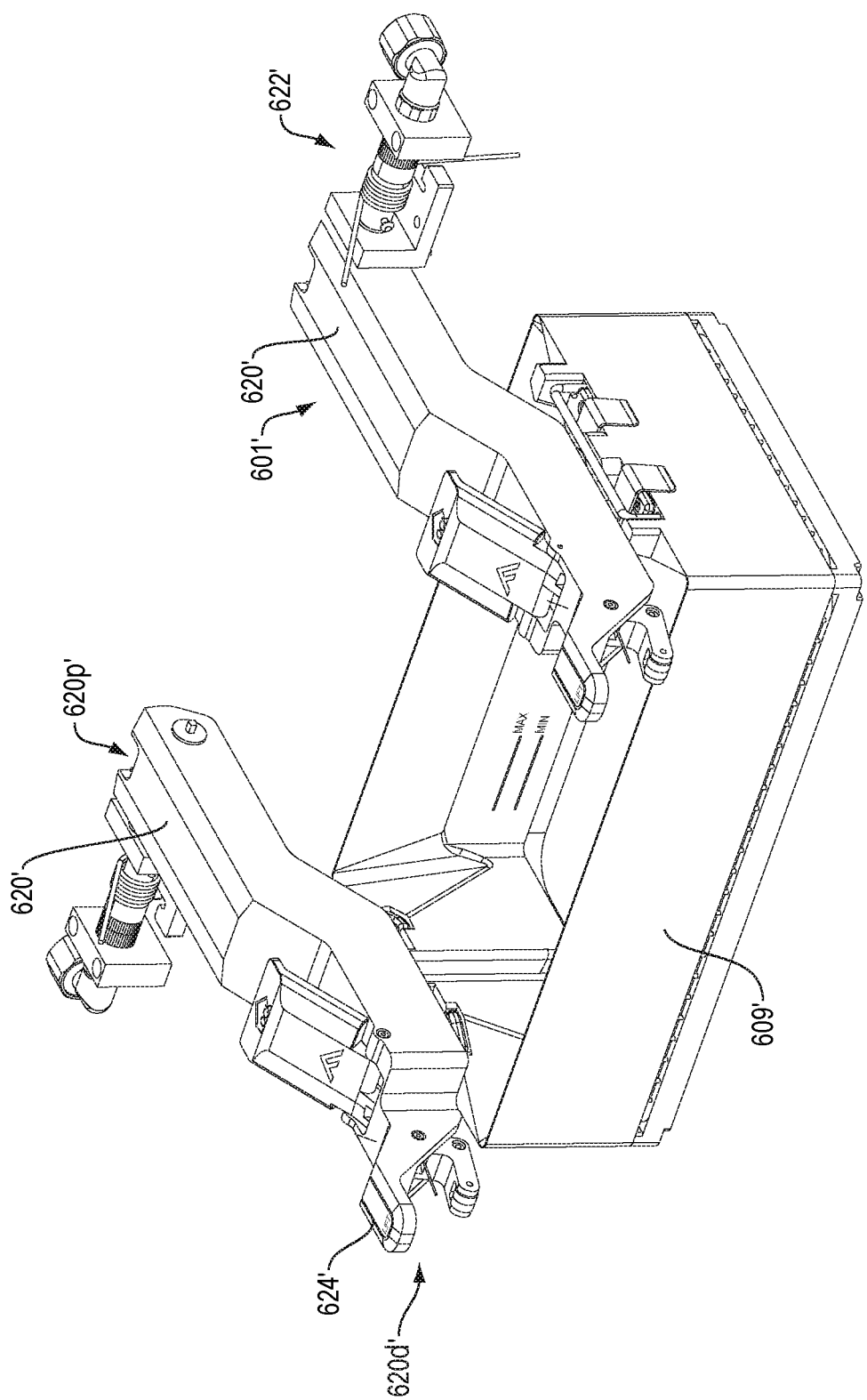
FIG. 17 is a top perspective view of the reservoir manifold of FIG. 16 and the reservoir of FIG. 15A.

The reservoir manifold 601' and the reservoir 609' are shown in greater detail in FIG. 17. As mentioned above, the reservoir manifold 601' includes a plurality of arms 620' that can move independent to one another and/or in tandem to secure the manifold 601' to the frame 611'. The arms 620' can extend from a distal end $620d'$ to a proximal end $620p'$. The distal end $620d'$ can include a grasping portion 624' thereon for grasping to the frame 611'. The grasping portion 624' can include a pair of extensions that are configured to pivot with respect to one another to secure one or more objects therebetween to couple the arm 620' to said objects, as discussed further below.

Figure 18:
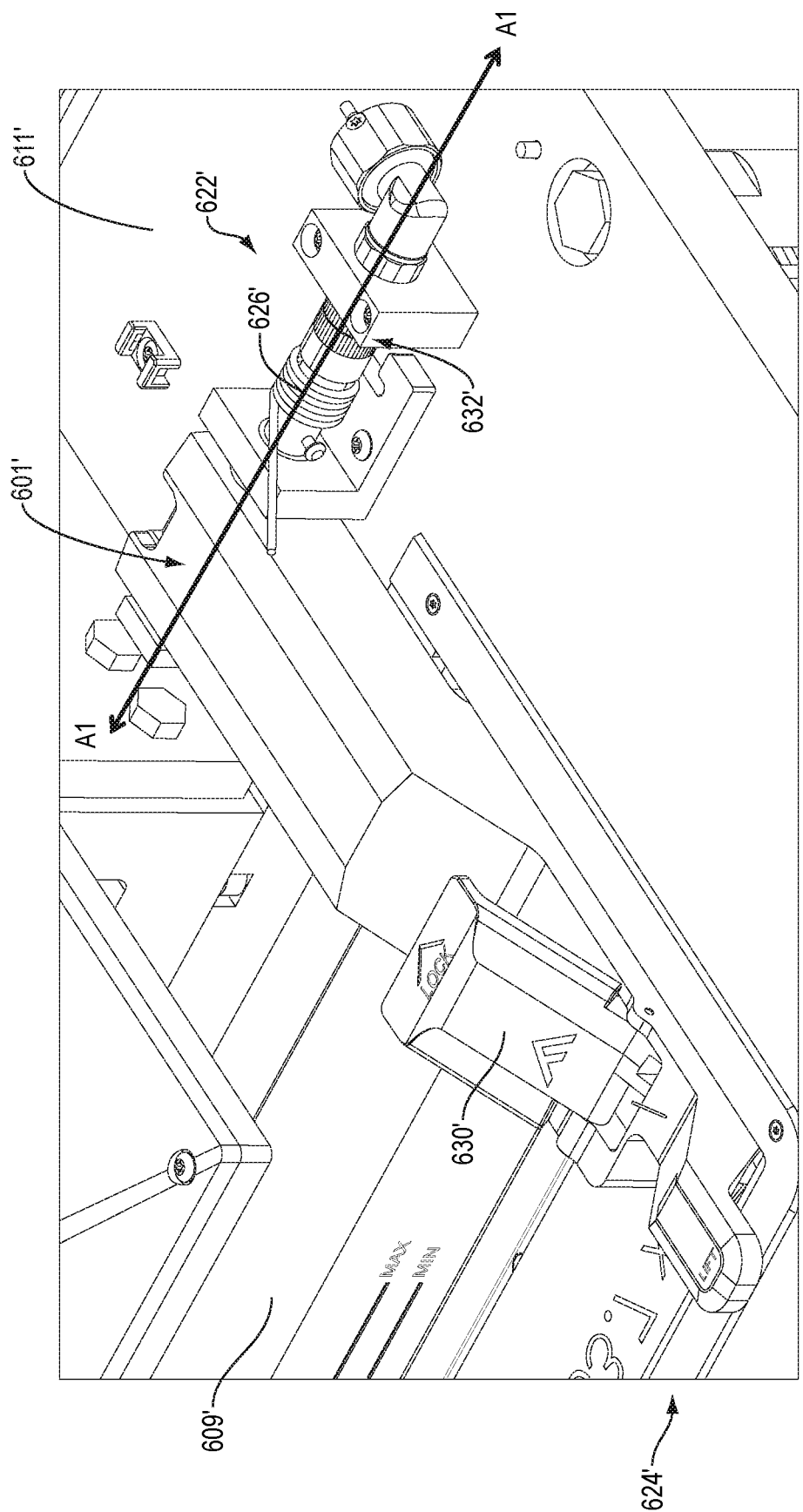
FIG. 18 is a magnified top perspective view of an arm of the reservoir manifold disposed on a frame of the additive manufacturing apparatus of FIG. 16.

FIG. 18 illustrates the coupling of the manifold 609' to the frame 611' in greater detail. As shown, the proximal end 620p' of each arm 620' can pivot around a pivot point 622'. When the arm 620' is rotated into the closed position around the pivot point 622', a contact point that is coupled to the arm can come in contact with the manifold 601', creating a clamping force on the manifold 601'. After the arm 620' passes a critical point, it can lock into place and cannot be unlocked unless the user (or an automated aspect of the printing system) rotates the arm into the open position.

In some embodiments, the proximal end 620p' can include a torsion spring 626' thereon. The torsion spring 626' can be coupled to the frame 611' to create the pivot point 622' about which the arm 620' moves. When the torsion spring 626' is unlatched, the spring can release to allow the arm 620' to automatically disengage from the frame 611' and pivot about the pivot point 622'. The proximal end 620p' can further include a damper that is used to automatically open the manifold 609' when the latch is released. Releasing the latch can spread the grasping portion 624' apart to decouple the arms 620' from the frame 611'. The torque exerted by the torsion spring 626' also ensures that the arm 620' is placed fully into the open position, which can be a few degrees past vertical, to prevent any dripping from the fluid nozzle.

In some embodiments, a friction hinge (not shown) can be used in lieu of the torsion spring and damper. The friction hinge can provide torque about an axis of rotation to hold the arm 620' in a plurality of static positions to await application of a force by a user. Use of a friction hinge in lieu of the torsion spring can provide a user with increased control as the arm 620' is prevented from rotating automatically. A person skilled in the art will appreciate other connections and/or fittings that can be used to achieve similar purposes without departing from the spirit of the present disclosure.

As shown, a rotational fluid fitting 632' can be installed at the proximal end 620p'. The rotational fluid fitting 632' can be installed in-line with a fluid flow path and with the axis of rotation of the arm 620'. The fitting 632' can be oriented as an angle that is substantially perpendicular to that of the arm 620' and can serve as the junction between the arm 620' and the fluid pathways that extend through the system. The rotational fitting can allow the manifold 601' to rotate about an axis A1 of the fitting 632' without changing the internal volume of the fluid path within the arm 620', thereby preventing dripping from the manifold nozzle that conventionally occurs when hoses compress during manifold rotation, which can decrease the internal volume of the fluid pathway and displace resin out of the fluid nozzle. It will be appreciated that the fitting 632' can be sealed with chemically compatible materials for extended resistance to wear and tear.

Figure 19A:
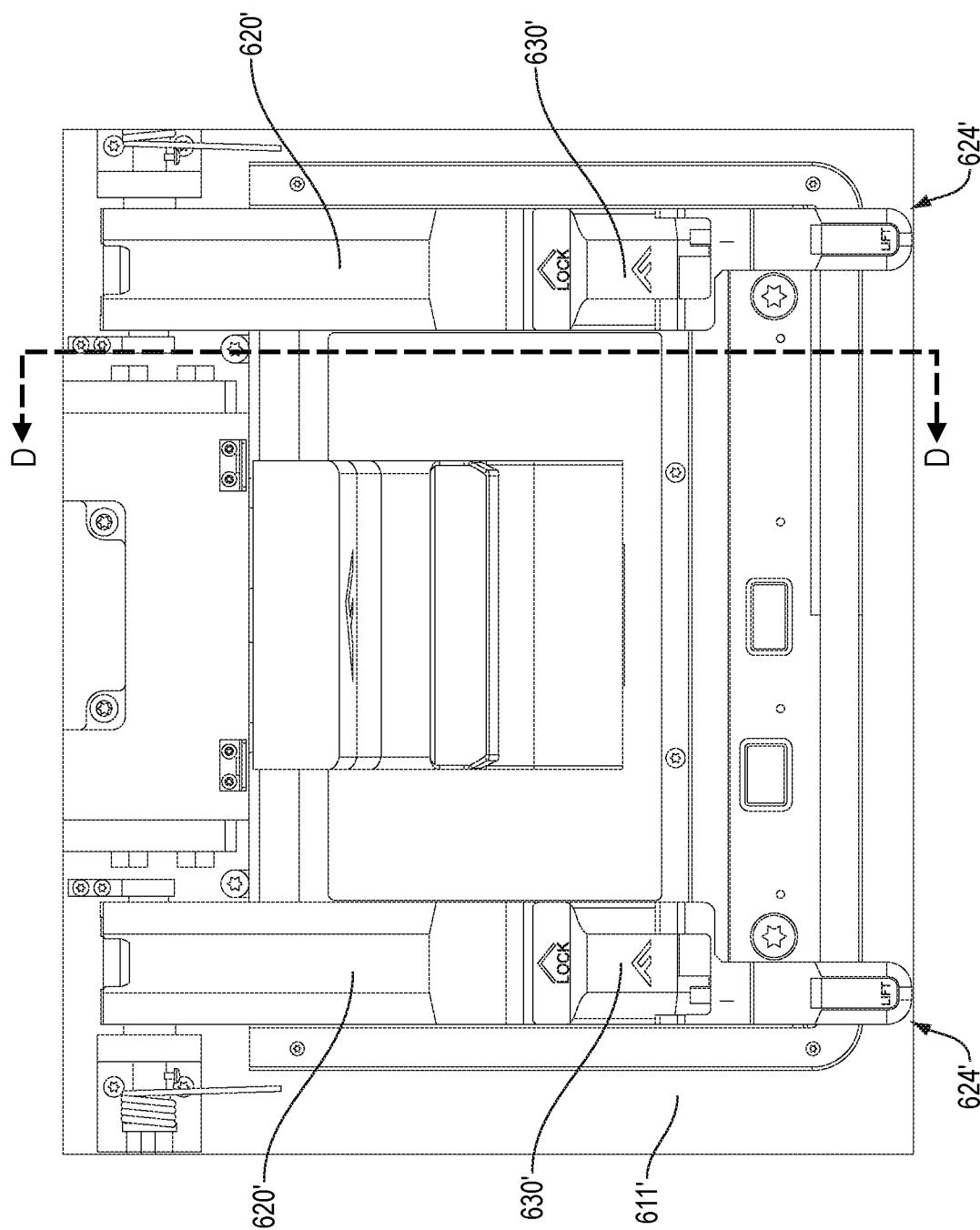
FIG. 19A is a top view of the reservoir manifold and additive manufacturing apparatus of FIG. 16, having a cross-sectional line D-D illustrated.

As shown, the distal end 620d' of the arm 620' can include a trigger 630' thereon. The trigger 630' allows all latching components to travel with the manifold arm into the open position (vertical) of the arm. The trigger 630' can be a single-action, over-center latch that engages on the underside of the Z stage, as discussed in greater detail below, to manipulate the grasping portion 624'. The trigger 630' allows the user to move the manifold arm 620' from the open position to the closed position and latch it into place all in one fluid motion. FIGS. 19A-19B illustrates the relationship between the trigger 630' and the grasping portion 624'. As shown, the grasping portion 624' can be formed between an extension 624' on the distal end 620d' of the arm 620' and a latch 629'. Unlike the reservoir manifold 601, which is illustrated as being held in place by one or more clamps 603 that are mounted to the frame 611 in FIG. 6A, the reservoir manifold 601' of the present embodiments can be secured by the latch 629' once actuated by the trigger 630'. As shown, the latch 629' can be formed on a distal end of the trigger 630' to pivot as part of the grasping portion 624'. When the trigger 630' is depressed, e.g., rotated, towards the arm 620', the latch 629' can rotate towards the extension 628' of the arm 620' to secure the manifold 601' to the frame 611'. As mentioned above, the trigger 630' can be configured to lock into place to prevent separation of the manifold 601' from the frame 611'.

Figure 20A:
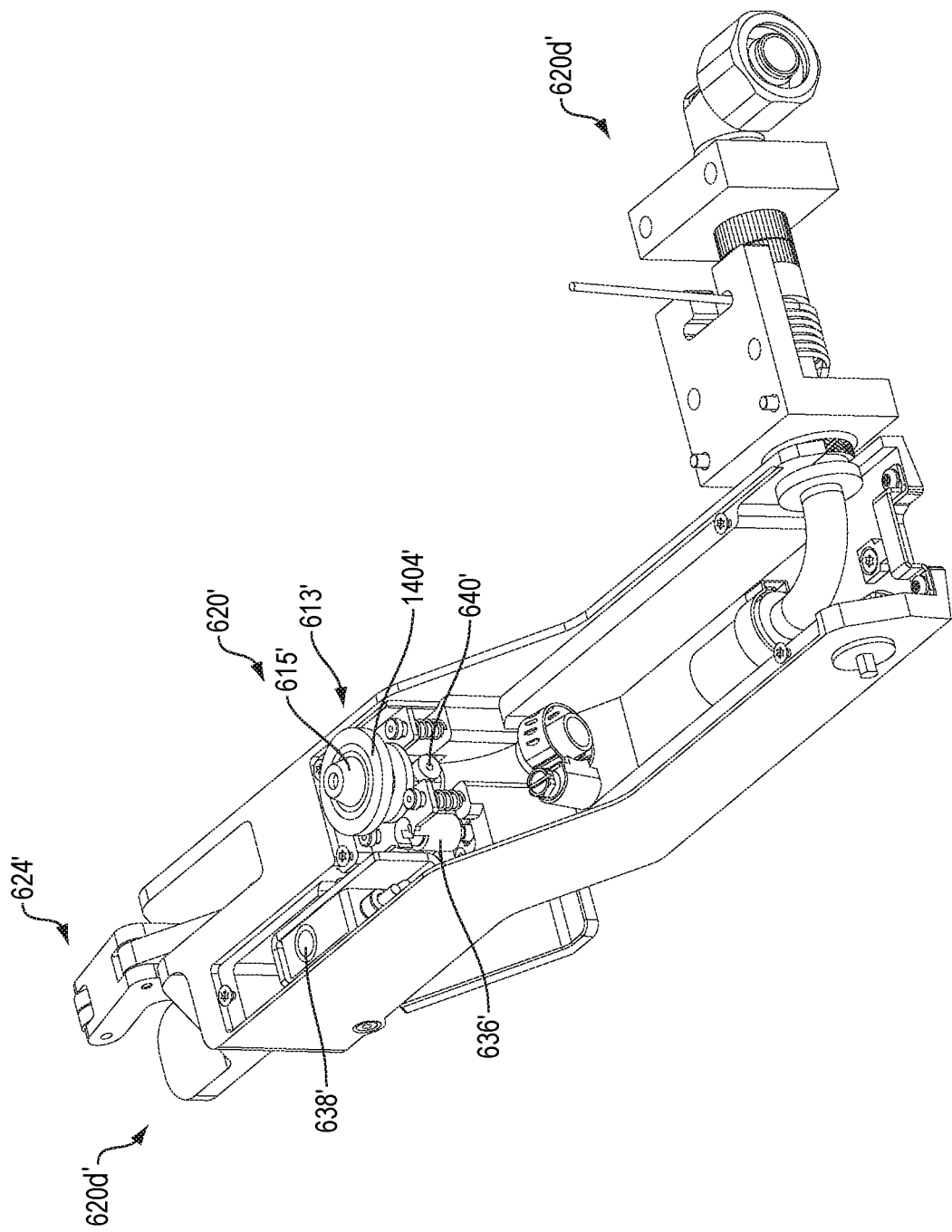
FIG. 20A is a top perspective view of components of the arm of the reservoir manifold of FIG. 18.
Figure 20B:
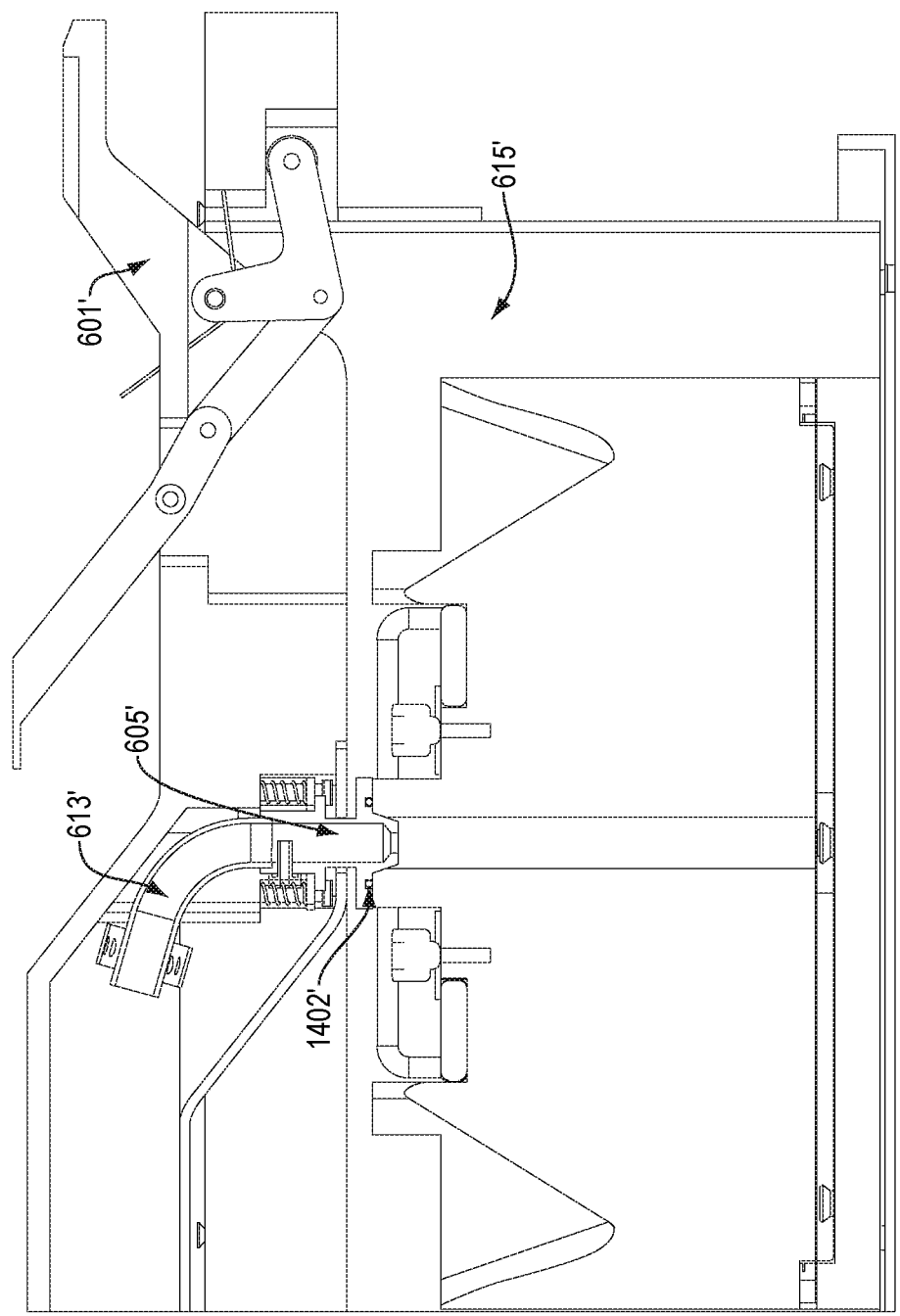
FIG. 20B is a cross-sectional side view of the arm illustrating the mechanical and fluid connections of the arm and the reservoir of the additive manufacturing apparatus taken along line D-D of FIG. 19A.

FIGS. 20A-20B illustrate the arm 620' of the manifold 601' in greater detail. As shown, the arm 620' can include a manifold nozzle or conduit 613' and a button 636' therein. The manifold nozzle 613' can include the mechanical mating connection 615' and a seal 1404' disposed around the mechanical mating connection 615' that can make a fluid seal with the reservoir 609' once the mechanical mating connection is made. The button 636' can be coupled to an actuation portion of the manifold nozzle 613' such that when the manifold 601' is brought down into contact with the reservoir 609' and the latch is engaged, a fluid connection is made between the nozzle 613' and the wall 1301' of the reservoir 609'. This connection can apply a load to the flat face of the nozzle 613', which can compress a compliant spring mechanism inside the manifold arm 620' that carries the button 636', and the displacement of the spring mechanism can press the "clamp-engaged" button 636'. This indicates to a printer controller or controller board and firmware that the manifold 601' has established a secure connection with the reservoir 609'. A person skilled in the art will recognize that the nozzle 613' can be set up such that it cannot be compressed if there is no reservoir present, and thus, the manifold 601' does not signal proper engagement without the proper installation of the reservoir and a good fluid connection. Moreover, in some embodiments, a tubing, a connection, or another object can pass through, or otherwise be associated with, the conduit 613' to flow the fluid therethrough. Whether the fluid passes through said object to enter the inlet of the reservoir 609' without contacting the conduit, or flows through the conduit 613' without any object being disposed therein, one skilled in the art will recognized that either configuration results in the fluid flowing through the conduit 613'.

FIG. 20B illustrates the mechanical and fluid connections of the arm 620' and the reservoir 609' of the additive manufacturing apparatus. As shown, the fluid connection 605' can extend through the nozzle 613' to be disposed within the mating connection 1402' of the reservoir 609'. The nozzle 613' can extend proximal to the reservoir to allow flow of fluid therethrough, and through the interface of the fluid connection 605' and the mating connection 1402' into the reservoir. It will be appreciated that the outlet 1503' of the reservoir can have a similar configuration formed therein with the arm 620'.

FIG. 20C illustrates a limit switch 631' disposed on or otherwise associated with the fluid connection 605' to indicate whether the manifold 601' is in the engaged position. For example, one or more limit switches 631' can be disposed on the fluid connections 605' at the inlet and outlet 1501', 1503' of the reservoir 609' to indicate that a fluid connection with the manifold has been established. Such an indication can send a signal to the controller that circulation of fluid can begin. In some embodiments in which such a signal is lacking, fluid will not circulate until the limit switch 631' is triggered. It will be appreciated that, in some embodiments, the limit switch(es) 631' can be positioned on the nozzle 613', on the mating connection 1402', on the reservoir 609', and/or along another component of the system.

The arm 620' can contain additional sensors therein. For example, as shown, the arm can include a reservoir resin height sensor or fluid height sensor 638' (sometimes referred to as a fluid level sensor) to monitor a content or amount of the resin in the reservoir. Moreover, a resin circulation temperature probe 640' can be used to measure a temperature of the resin contained in the system. In some embodiments, a check valve can be included in the arm 620' to measure pressure drop at various locations of the arm 620' to facilitate regulation of fluid flow throughout the system. Some of the other sensors described elsewhere in the present disclosure, or otherwise known to those skilled in the art, can be incorporated into the manifold 601' and related components.

Figure 21:
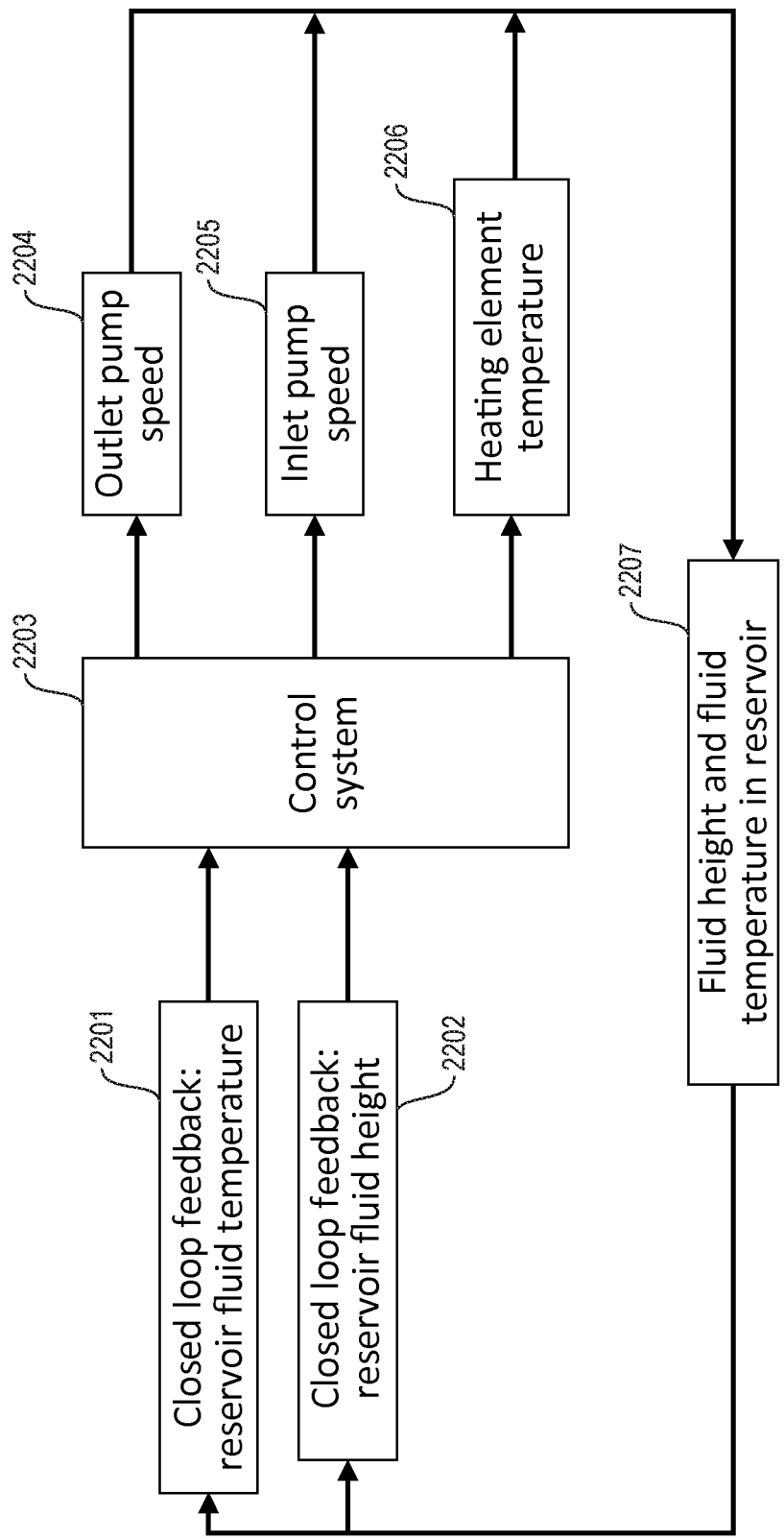
FIG. 21 is a schematic drawing illustrating a control system to affect reservoir fluid behavior using sensors and functionalities enabled by a reservoir manifold.

Referring to FIG. 21, a control schematic is shown. Closed loop feedback about reservoir fluid temperature 2201 can be gathered from infrared temperature sensors 607 or thermistors inside the fluid connection 605. Closed loop feedback about the reservoir fluid height 222 can be collected from an ultrasonic sensor 606. This feedback can be sent to a controller(s) and/or control system(s) 2203, as discussed in greater detail below. This control system(s) can use an algorithm to adjust the outlet pump speed 2204, inlet pump speed 2205, or heating element temperature 2206. These adjustments can alter one or more parameters associated with the system, such as adjusting the fluid height and/or fluid temperature in the reservoir 2207. When the fluid height and fluid temperature in the reservoir change, those changes can be measured by the aforementioned sensors.

Figure 6B:
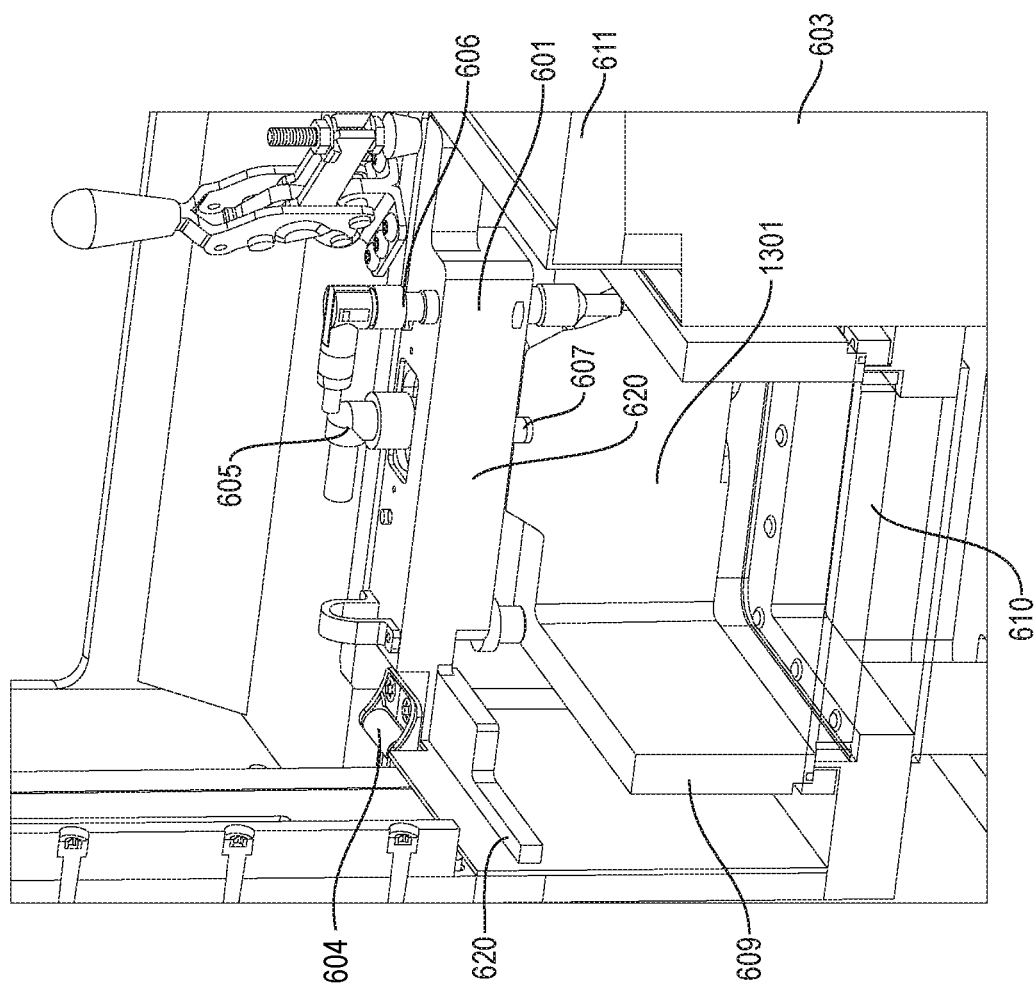
FIG. 6B is a perspective view of the reservoir manifold and reservoir of FIG. 6A.

Referring to FIGS. 22A-22E, and returning to the initial illustration of components of a printing apparatus 100 in FIG. 1 and reservoir 609 in FIG. 6B, a reservoir glass 610 can be disposed in a recess in a focal plane flange 1601. The reservoir glass 610 can be disposed below the bottom film 612 of the reservoir, the reservoir glass 610 being sized and shaped to support the bottom film 612. The top surface of the reservoir glass 610 can be in contact with the bottom film of the reservoir 609. In some embodiments, the reservoir glass can be tightly tolerance to fit to the build platform.

The focal plane flange 1601 can be affixed to the frame 611 of an additive manufacturing apparatus by, e.g., screwing the flange wall into mounting posts on the frame. The focal plane flange 1601 can be fabricated by machining an aluminum block. The focal plane flange 1601 can have a raised rectangular section in its center with rounded corners. The inside of that raised section can be machined away to create clearance for the reservoir glass to be inserted. The center of the focal plane flange can be machined completely away to allow for a projected image to pass through its center, towards the glass.

An array of spring plungers 1602 can be pressed into holes in the reservoir flange 1601. These spring plungers 1602 can serve to push the reservoir glass 610 upwards towards the reservoir when the reservoir is pushed downwards by the reservoir manifold. Suitable spring-loaded plungers are, e.g., McMaster-Carr Part Number 84895A22.

The reservoir 609 can be most any shape, but as shown it is rectangular shaped, with the reservoir wall 1301 being about 60 mm thick, and including the inner 1303 and the outer wall 1305. The inner wall can have a height and a width of about 240 mm×about 140 mm, and the outer wall can be about 290 mm×about 170 mm. The wall dimensions can be determined, for example, by the size of the projected image inside the reservoir. Sufficient space should be allowed around the projected image to account for the build platform, and clearance between the build platform and reservoir wall. A height of an outer surface of the flange may be, e.g., about 20 mm, with a lip height of about 10 mm. A depth of the recess defined by the flange to hold the reservoir glass, i.e., a depth of a flange pocket, can be greater than a glass thickness and a height of a spring plunger; accordingly, the recess can be about 15 mm if the reservoir glass thickness is about 13 mm and the spring plungers are about 2 mm tall when compressed in one non-limiting embodiment.

In use, the reservoir glass 610 has a top surface that can be pushed above the height of a topmost feature of the reservoir flange 1601, i.e., a lip 1603 disposed on an outer perimeter of the focal plane flange 1601, by the array of spring-loaded plungers 1602 disposed in holes in the flange.

The reservoir glass 610 can be pushed downwards against the spring-loaded plungers by the reservoir 609, which in turn can be pushed down by a spring force from the coupling element 701 until a bottom surface 1301b of the wall of the reservoir contacts a topmost portion of the focal plane flange 1601, i.e., the lip 1603. Once the reservoir wall 1301 contacts the lip 1603 of the focal plane flange, the downward spring force from the coupling element 701 can increase without changing the position of the reservoir 609 or the reservoir glass 610.

A focal plane flange 1601 can provide multiple advantages to the system. The flange 1601 can serve as a location feature to help position a reservoir that is assembled into the system when the reservoir manifold is open, i.e., in a disengaged position. The focal plane flange 1601 can also serve to constrain the location of printing to a fixed location. For example, printing can occur on a top surface of the bottom film 612 of the reservoir 609, and the configuration of the focal plane flange 1601 and spring plungers 1602 can ensure that the bottom film 612 is a fixed distance from the flange 1601 and a light projector 106 disposed thereunder. The focal plane flange 1601 can also serve to constrain, i.e., position the reservoir 609 so that the reservoir interfaces with coupling element(s) on the reservoir clamp 603. Accordingly, the described configuration of the reservoir glass 610, focal plane flange 1601, and spring plungers 1602 can reduce or eliminate any variations due to, e.g., glass thickness variability, from a distance between a projector and the printing plane.

The primary springs 1102 and secondary springs 1101 can have different spring constants on each side of the reservoir manifold. These different springs can create a clamping force between the coupling element 701 and the reservoir 609 stronger on one side than the other. This force difference can cause the reservoir 609 to lift up on one side while the other side does not lift, or lifts a different amount in comparison to the one side, in the case where an upwards vertical force is applied to the reservoir 609. This can cause an additive manufacturing reservoir glass 610 to lift out of its clamped position and tilt out of parallel alignment relative to the build plate 608 during the peeling process of additive manufacturing. This lifting/tilting of the reservoir glass can be reduced or prevented by the reservoir bottom film 612. In some embodiments, the reservoir glass 610 can be tilted at an angle relative to the build plate 608 and as the reservoir 609 is gradually moved (e.g., lowered) relative to the reservoir glass 610, the reservoir 609 can be applied substantially evenly relative to the reservoir glass 610 and excess air can be removed by virtue of being squeezed out by this angled approach. The reservoir glass 610 can subsequently lie flat, substantially perpendicular to a ground plane. In other embodiments, one or both of the reservoir glass 610 or the reservoir 609 can be tilted and one or both of the reservoir glass 610 or the reservoir 609 can be moved relative to the other, allowing for excess air to be removed by virtue of being squeezed out by an angled approach.

Figure 23A:
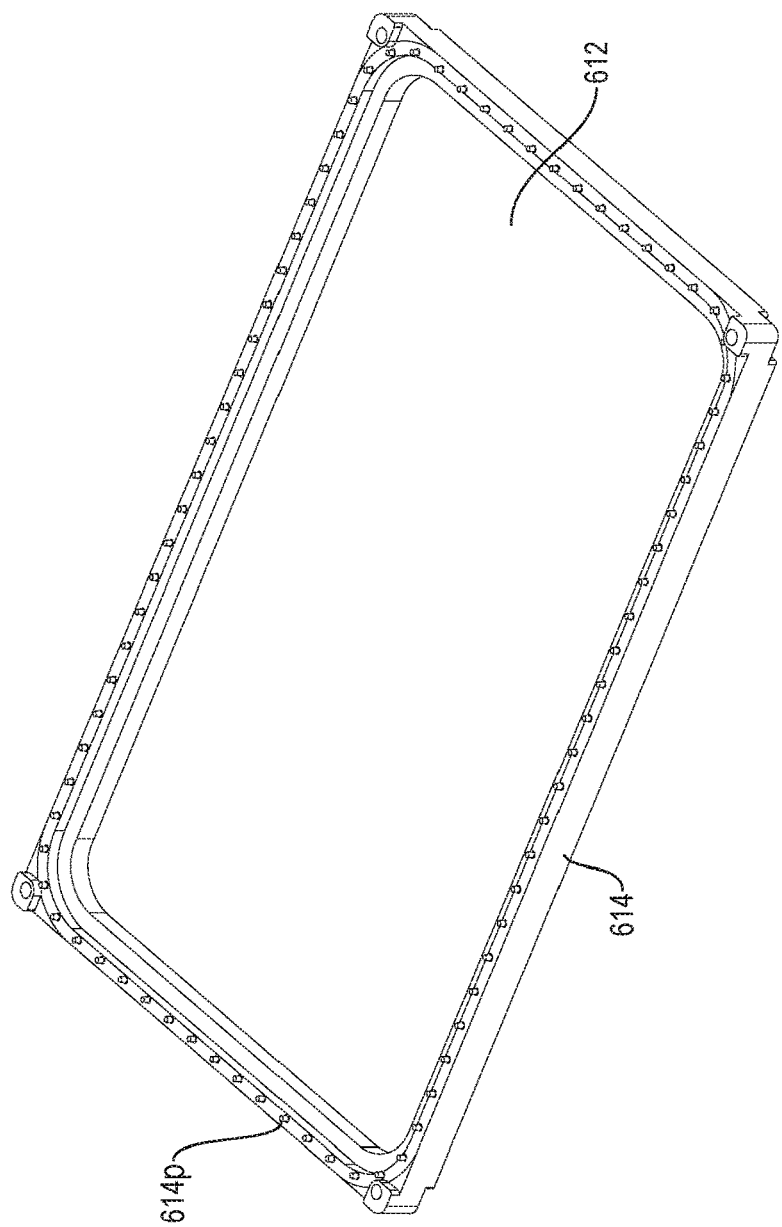
FIG. 23A is a perspective view of the reservoir bottom film tensioning plate of FIG. 14.
Figure 23B:
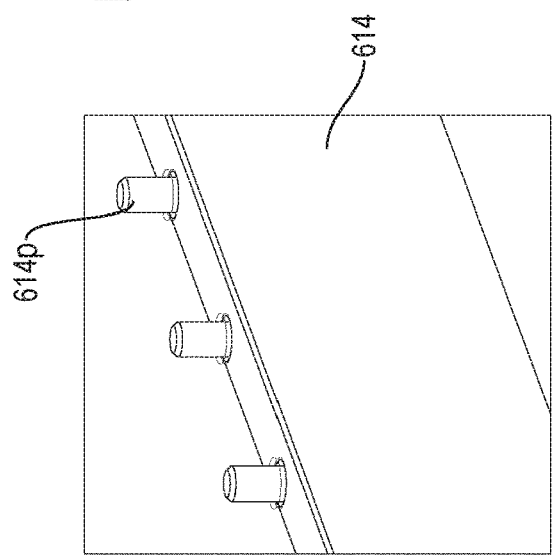
FIG. 23B is a magnified perspective view of the reservoir bottom film tensioning plate of FIG. 23A.

As shown, the reservoir 609 can include a reservoir bottom film tensioning ring 614 that can have protruding features 614p around its rim, as shown more clearly in FIGS. 23A and 23B. The tensioning ring 614 can be machined from a block of aluminum. The protruding features can be, by way of non-limiting example, dowel pins made from acetal, press-fit into holes in the tensioning ring. These protruding features can be inserted into holes in a film. The film can be die cut from a sheet of rigid transparent material, e.g., transparent TEFLON, among other ways of manufacturing it. The tensioning ring can be secured to the reservoir 609 with mechanical fasteners or other attachment mechanisms known to those skilled in the art.

The tensioning ring 614 can be made out of a polymer material. The positive features of the tensioning ring 614 can be heat-staked with a heating element to retain the film after it is assembled to the tensioning ring.

A number of embodiments provided for herein describe blocks, tubing, and/or other components as being made from aluminum. A person skilled in the art will recognize other materials are possible, in lieu of or in combination with aluminum, without departing from the spirit of the present disclosure. Some non-limiting examples of other materials that can be used in some of these embodiments include stainless steel, glass-filled nylon, glass-filled polypropylene, polypropylene, and EPDM. An O-ring or gasket 616 can be compressed between the top of the reservoir bottom film 612 and the surface of the reservoir wall 1301 to make a fluid seal between the bottom of the reservoir wall 1301 and the film 612.

The reservoir glass 610 can be secured directly to the reservoir 609 with mechanical fasteners or other attachment mechanisms known to those skilled in the art. The O-ring or gasket 616 can be compressed between the top of the glass 610 and the bottom of the reservoir 609.

Figure 24A:
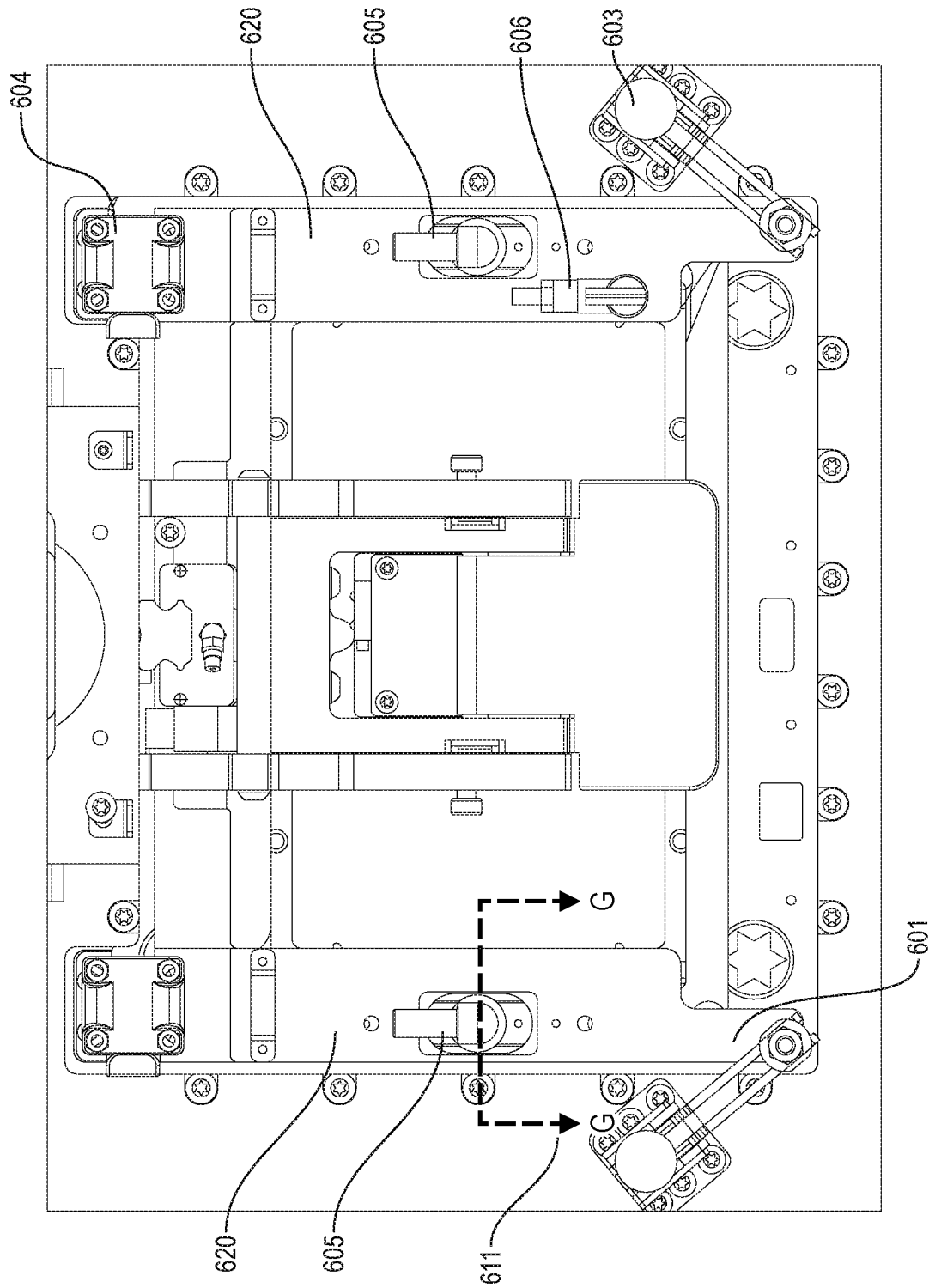
FIG. 24A is a top view of the reservoir manifold and additive manufacturing apparatus of FIG. 16, having a cross-sectional line G-G illustrated.
Figure 24C:
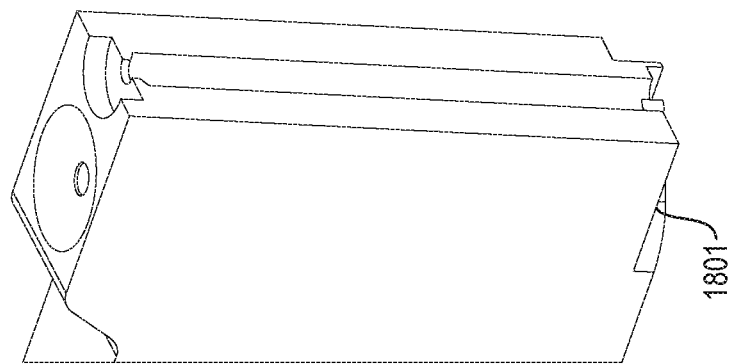
FIG. 24C is a magnified perspective view of the fluid channel of FIG. 24B in the reservoir wall with a fluid opening to the reservoir.
Figure 24B:
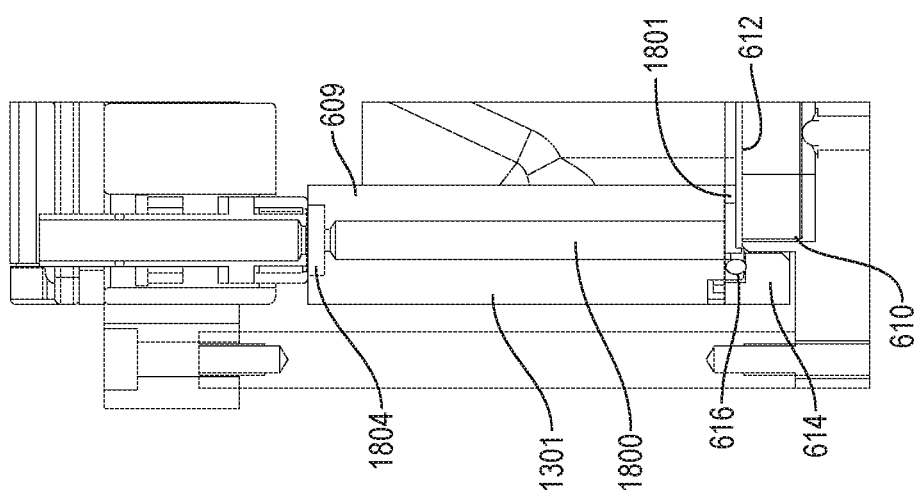
FIG. 24B is a cross-sectional side view of a fluid channel inside a reservoir wall taken along line G-G of FIG. 24A, the fluid channel connecting to the top surface of the reservoir.

Referring to FIGS. 24A-24C, the reservoir walls 1301 can contain one or more fluid pathways 1800. The fluid pathways 1800 can create one or more fluid openings, conduits, or channels 1801 to the reservoir 609 through the reservoir walls 1301. The fluid pathways 1800 can create a sealed channel 1801 from the top surface and/or the bottom surface of the reservoir 609 to the top opening 1505, as shown, for example, in FIG. 15A, inside a sealed perimeter interface between the bottom film 612 and the reservoir 609.

Figure 25A:
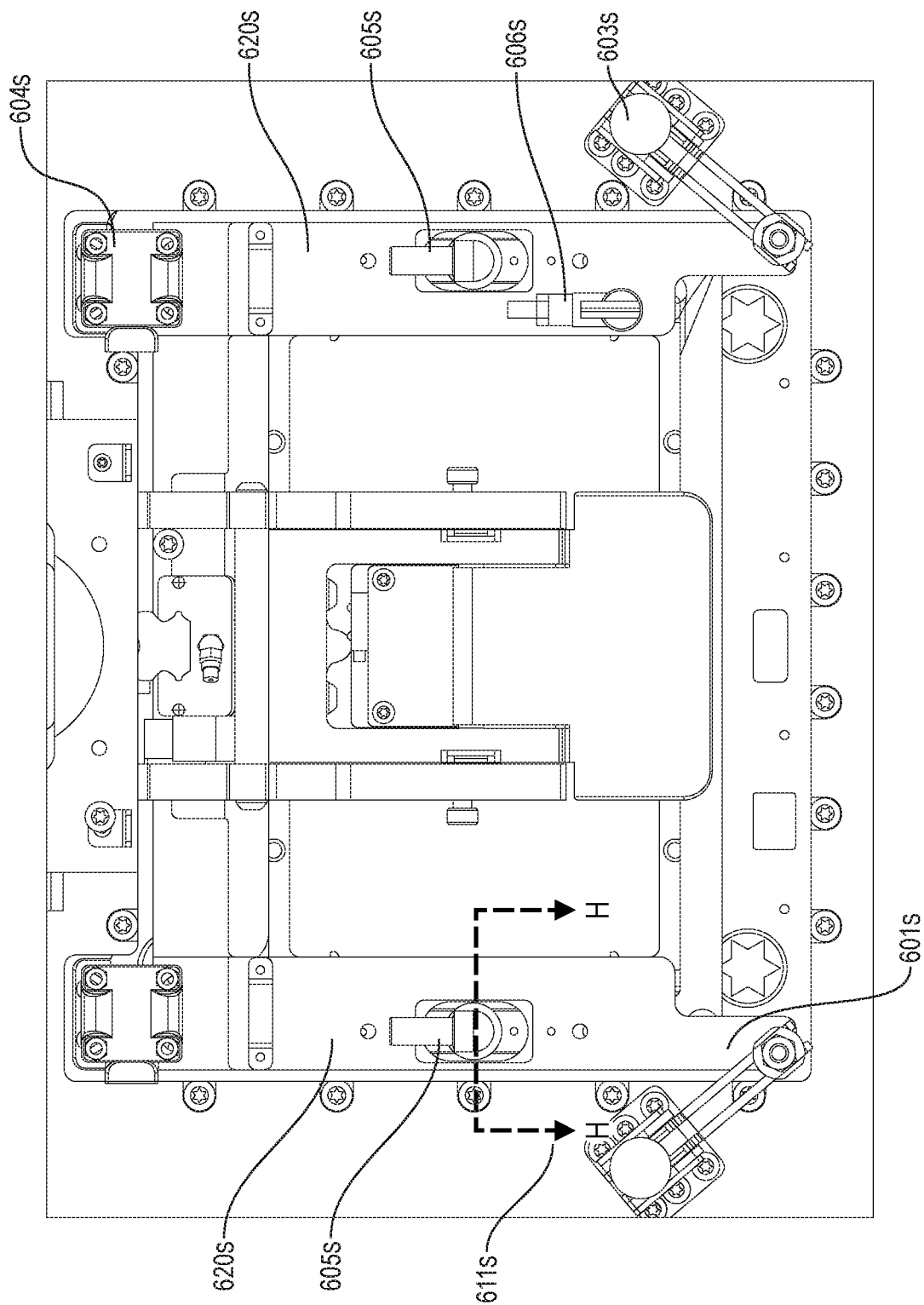
FIG. 25A is a top view of the reservoir manifold and additive manufacturing apparatus of FIG. 16, having a cross-sectional line H-H illustrated to show a representative location of components being discussed with respect to FIG. 25B.
Figure 25B:
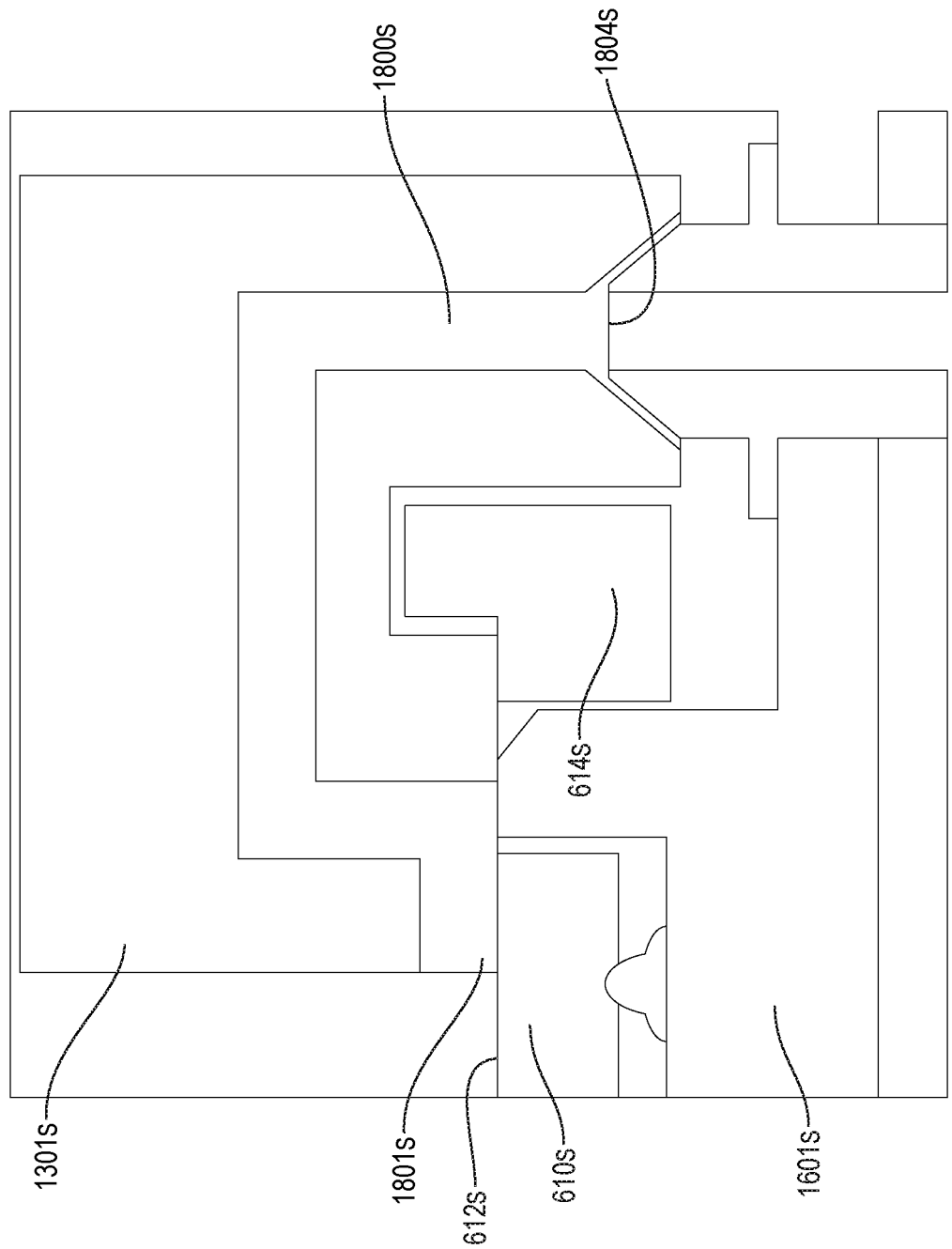
FIG. 25B is a cross-sectional schematic side view of a fluid channel inside of a reservoir wall, the cross-sectional view being based on the line H-H of FIG. 25A, the channel connecting to a bottom surface of the reservoir.

FIGS. 25A-25B are used to show an instance in which a channel connects to a bottom surface of a reservoir. This can be possible with the fluid pathway 1800 of FIGS. 24A-24C, but because the drawing of FIG. 25B is schematic in nature, the illustrated components all include an "s" to denote the parts as drawn are technically different than the parts of FIGS. 24A-24C. As noted elsewhere in the present application, similar numbered components have similar features, which is the case in this instance, except where the illustrated embodiment depicts otherwise.

Figure 26A:
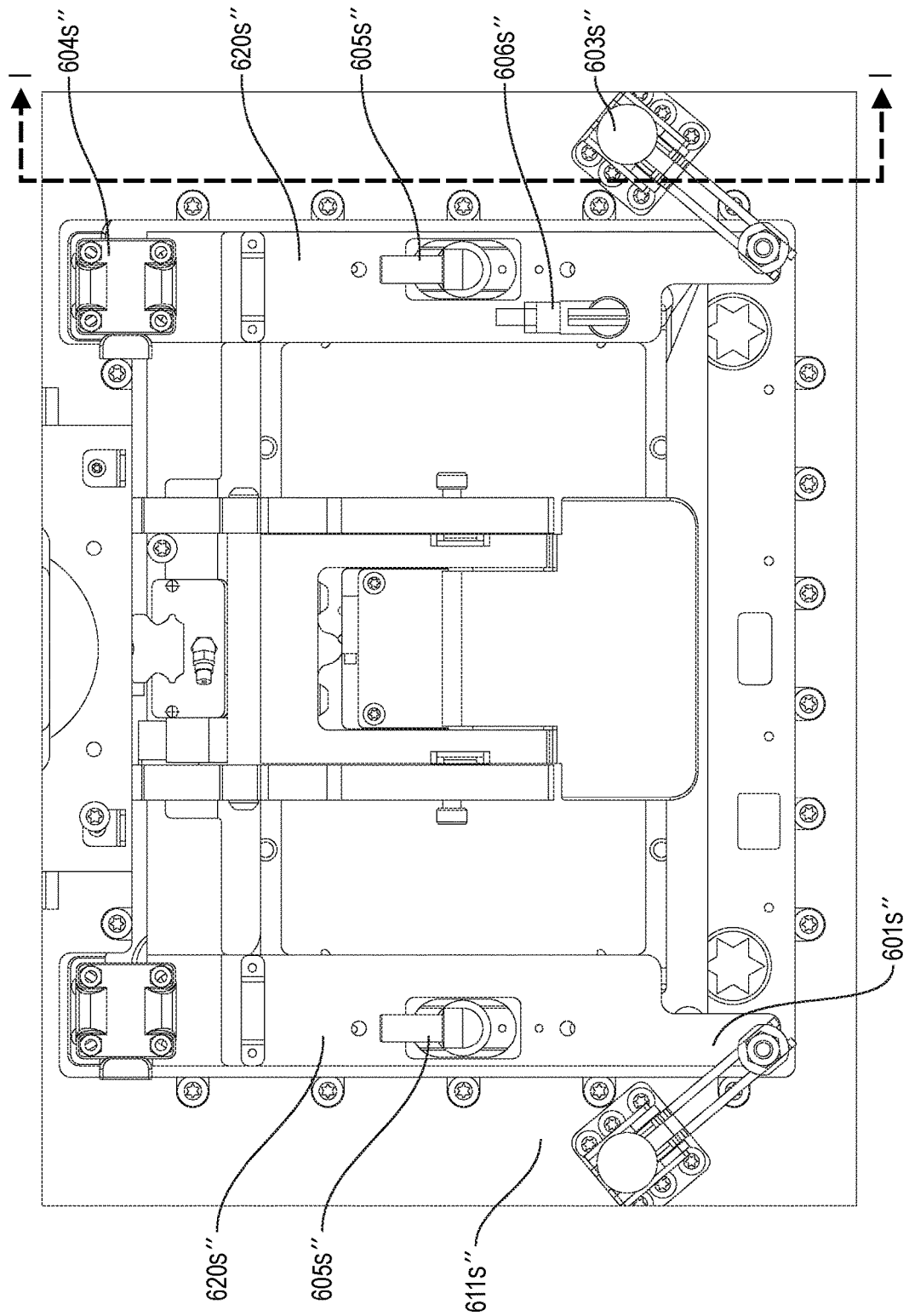
FIG. 26A is a top view of the reservoir manifold and additive manufacturing apparatus of FIG. 16, having a cross-sectional line I-I illustrated to show a representative location of components being discussed with respect to FIG. 26B.
Figure 26B:
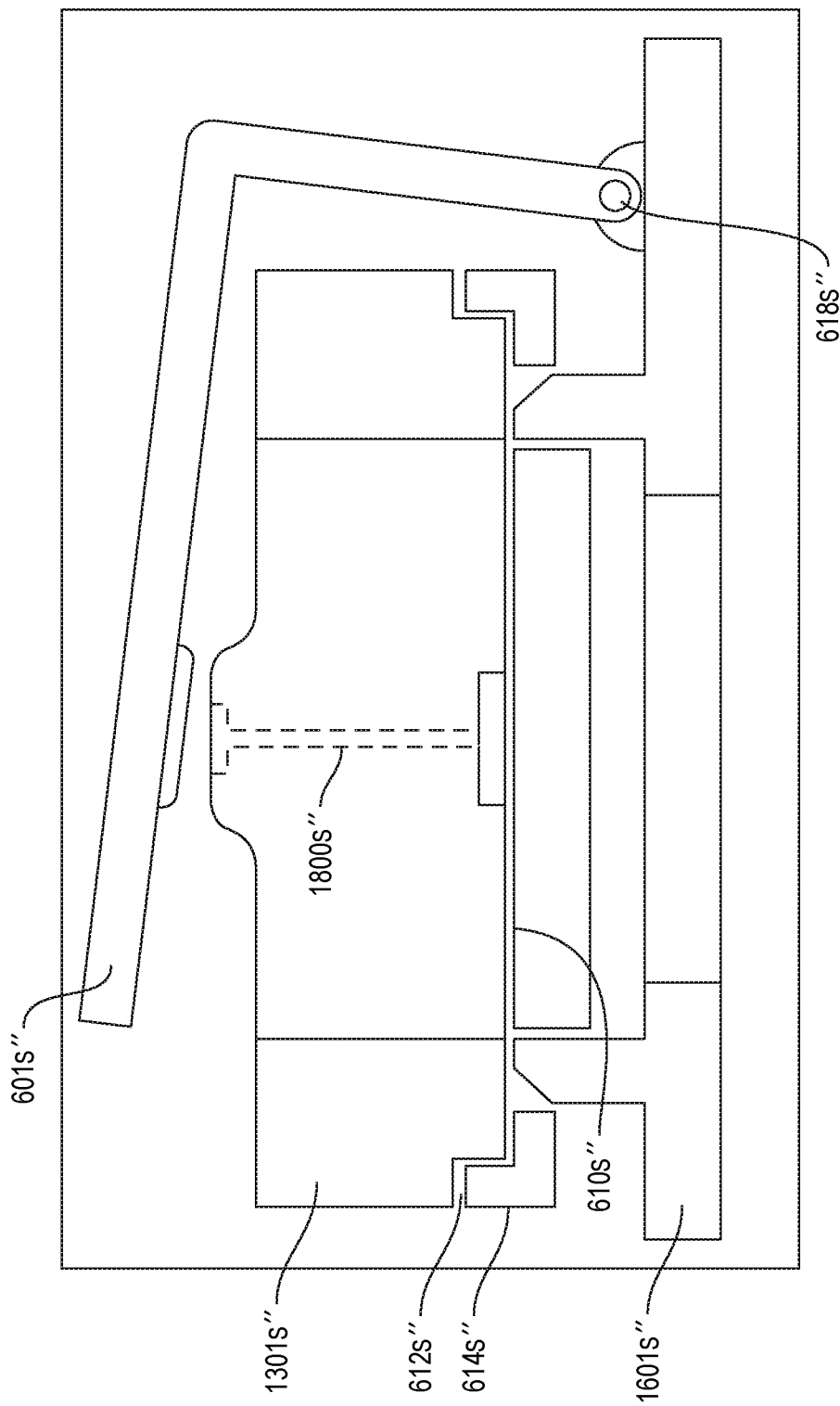
FIG. 26B is a cross-sectional schematic side view of a reservoir manifold hinged from a point below a top surface of the reservoir of FIG. 25, the cross-sectional view being based on the line I-I of FIG. 26A.

FIGS. 26A-26B are used to illustrate one alternative, non-limiting way by which a reservoir manifold can be coupled to one or more other components of a printing apparatus. Similar to FIGS. 25A-25B, FIG. 26B is a schematic illustration and does not replicate what is illustrated in FIG. 26A entirely. A person skilled in the art, in view of these illustrations and the present disclosures, however, will understand the purpose of these teachings and how they relate to the present disclosure. In the illustrated embodiments, the reservoir manifold 601s" can include a hinge 618s" from an axis that is below the top surface of the reservoir to pivot the manifold 601s" over the reservoir 609s". Because the drawing of FIG. 26B is schematic in nature, the illustrated components all include an "s"" to denote the parts as drawn are technically different than the parts of FIGS. 24A-24C. As noted elsewhere in the present application, similar numbered components have similar features, which is the case in this instance, except where the illustrated embodiment depicts otherwise. A person skilled in the art will appreciate other mechanical or electro-mechanical features that can be used to couple a reservoir manifold to the apparatus, such as to the reservoir and/or the frame.

Figure 27:
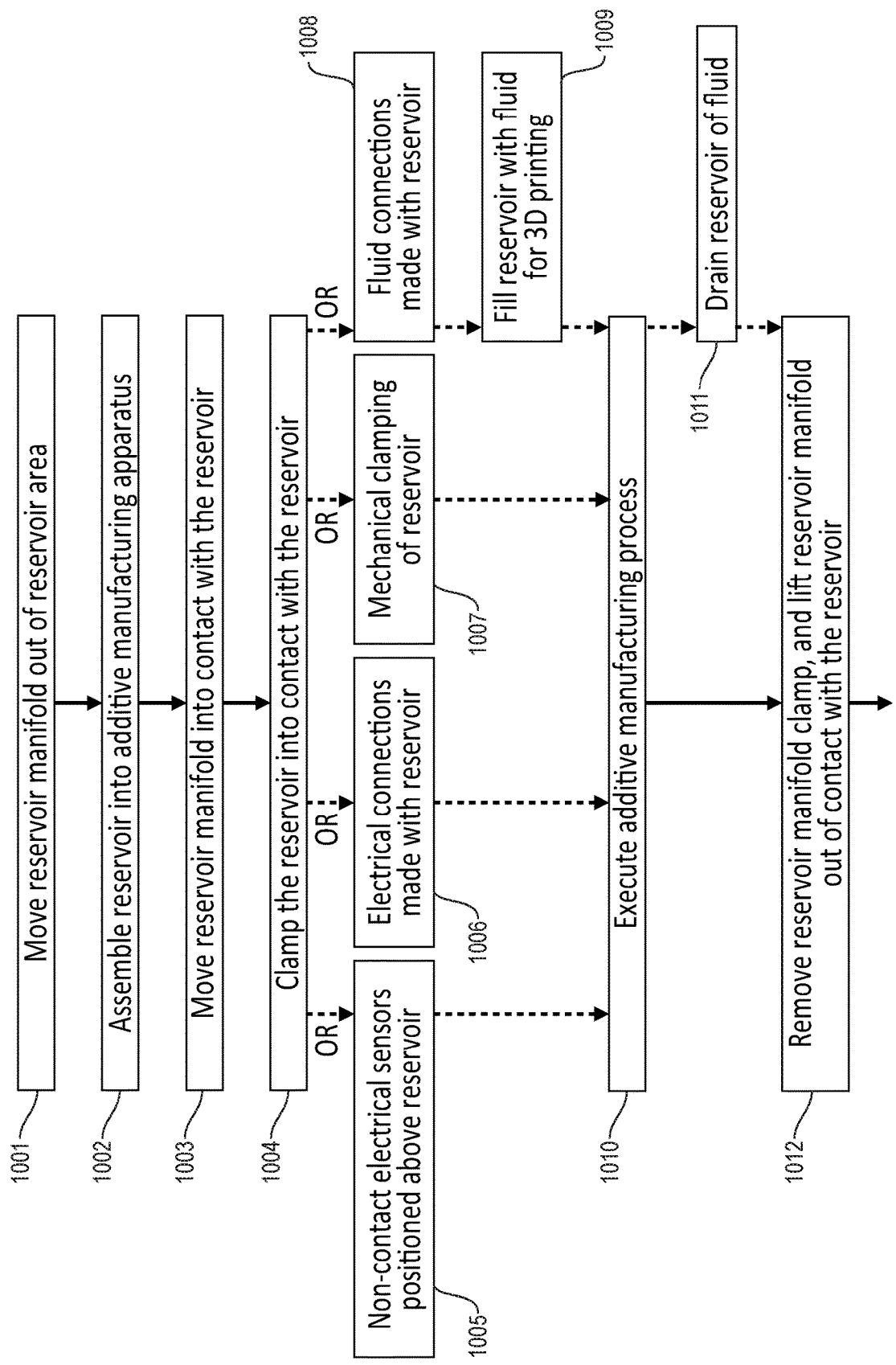
FIG. 27 is a schematic drawing describing the process of using a reservoir manifold in an additive manufacturing process.

FIG. 27 illustrates an exemplary process of using a reservoir manifold of the present embodiments in an additive manufacturing process, with the manifold allowing for connection of electrical, mechanical, and fluid components to a reservoir. In use, the reservoir manifold can be moved away from the reservoir area (step 1001), and the reservoir can be assembled into the additive manufacturing apparatus (step 1002). The reservoir manifold can then be moved into an engaged position, i.e., into contact with the reservoir (step 1003) and clamped into place, i.e., clamping the reservoir (step 1004). The action of clamping the manifold into place can engage non-contact electrical sensors (step 1005), electrical connections (step 1006), mechanical clamping features (step 1007), and fluid connections with the reservoir (step 1008). If fluid connections are made with the reservoir, fluid can flow through the connections to fill the reservoir (step 1009) to a desired height or level. Once these connections are made, the additive manufacturing process can begin (step 1010). After the additive manufacturing process is complete, fluid can be drained from the reservoir (step 1011), and the reservoir manifold can be moved into a disengaged position, i.e., moved out of the reservoir area (step 1012). When the reservoir manifold is in the disengaged position, the reservoir can be rendered removable from the frame. The reservoir can then be removed from the additive manufacturing apparatus.

Figure 28:
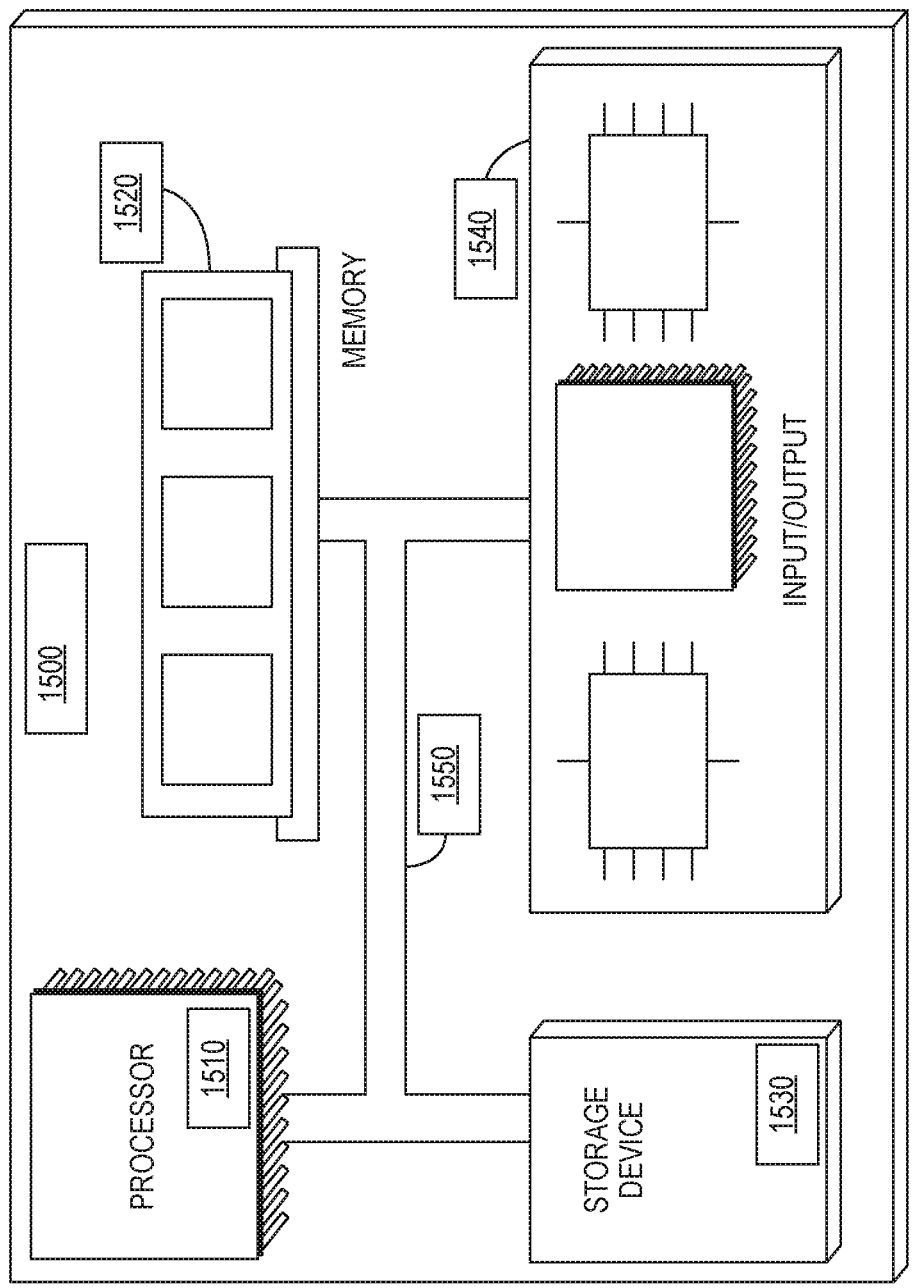
FIG. 28 is a block diagram of one exemplary embodiment of a computer system for use in conjunction with the present disclosures.

FIG. 28 is a block diagram of one exemplary embodiment of a computer system 1500 upon which the controller or control system of the present disclosures can be built, performed, trained, etc. For example, referring to FIGS. 6A to 27, any modules or systems can be examples of the system 1500 described herein. The system 1500 can include a processor 1510, a memory 1520, a storage device 1530, and an input/output device 1540. Each of the components 1510, 1520, 1530, and 1540 can be interconnected, for example, using a system bus 1550. The processor 1510 can be capable of processing instructions for execution within the system 1500. The processor 1510 can be a single-threaded processor, a multi-threaded processor, or similar device. The processor 1510 can be capable of processing instructions stored in the memory 1520 or on the storage device 1530. The processor 1510 may execute operations such as starting and stopping flow of fluid, measuring temperature and pressure of the fluid and/or the apparatus 100 (among other parameters), and adjusting the temperature and pressure of the fluid (among other parameters), among other features described in conjunction with the present disclosure.

The memory 1520 can store information within the system 1500. In some implementations, the memory 1520 can be a computer-readable medium. The memory 1520 can, for example, be a volatile memory unit or a non-volatile memory unit. In some implementations, the memory 1520 can store information related to temperatures, pressures, flow rates, and/or printing times, among other information.

The storage device 1530 can be capable of providing mass storage for the system 1500. In some implementations, the storage device 1530 can be a non-transitory computer-readable medium. The storage device 1530 can include, for example, a hard disk device, an optical disk device, a solid-date drive, a flash drive, magnetic tape, and/or some other large capacity storage device. The storage device 1530 may alternatively be a cloud storage device, e.g., a logical storage device including multiple physical storage devices distributed on a network and accessed using a network. In some implementations, the information stored on the memory 1520 can also or instead be stored on the storage device 1530.

The input/output device 1540 can provide input/output operations for the system 1500. In some implementations, the input/output device 1540 can include one or more of network interface devices (e.g., an Ethernet card or an InfiniBand interconnect), a serial communication device (e.g., an RS-232 10 port), and/or a wireless interface device (e.g., a short-range wireless communication device, an 802.7 card, a 3G wireless modem, a 4G wireless modem, a 5G wireless modem). In some implementations, the input/output device 1540 can include driver devices configured to receive input data and send output data to other input/output devices, e.g., a keyboard, a printer, and/or display devices. In some implementations, mobile computing devices, mobile communication devices, and other devices can be used.

In some implementations, the system 1500 can be a microcontroller. A microcontroller is a device that contains multiple elements of a computer system in a single electronics package. For example, the single electronics package could contain the processor 1510, the memory 1520, the storage device 1530, and/or input/output devices 1540.

Although an example processing system has been described above, implementations of the subject matter and the functional operations described above can be implemented in other types of digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible program carrier, for example a computer-readable medium, for execution by, or to control the operation of, a processing system. The computer readable medium can be a machine-readable storage device, a machine-readable storage substrate, a memory device, a composition of matter effecting a machine-readable propagated signal, or a combination of one or more of them.

Various embodiments of the present disclosure may be implemented at least in part in any conventional computer programming language. For example, some embodiments may be implemented in a procedural programming language (e.g., "C" or ForTran95), or in an object-oriented programming language (e.g., "C++"). Other embodiments may be implemented as a pre-configured, stand-along hardware element and/or as preprogrammed hardware elements (e.g., application specific integrated circuits, FPGAs, and digital signal processors), or other related components.

The term "computer system" may encompass all apparatus, devices, and machines for processing data, including, by way of non-limiting examples, a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network. In some instances, a print file can be used and/or generated in conjunction with the computer program and/or the computer system to assist in operating the apparatuses provided for herein and/or performing the methods provided for herein.

Such implementation may include a series of computer instructions fixed either on a tangible, non-transitory medium, such as a computer readable medium. The series of computer instructions can embody all or part of the functionality previously described herein with respect to the system. Computer readable media suitable for storing computer program instructions and data include all forms of non-volatile or volatile memory, media and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM and DVD-ROM disks. The processor and the memory can be supplemented by, or incorporated in, special purpose logic circuitry. The components of the system can be interconnected by any form or medium of digital data communication, e.g., a communication network. Examples of communication networks include a local area network ("LAN") and a wide area network ("WAN"), e.g., the Internet.

Those skilled in the art should appreciate that such computer instructions can be written in a number of programming languages for use with many computer architectures or operating systems. Furthermore, such instructions may be stored in any memory device, such as semiconductor, magnetic, optical, or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the present disclosure may be implemented as a combination of both software (e.g., a computer program product) and hardware. Still other embodiments of the present disclosure are implemented as entirely hardware, or entirely software.

One skilled in the art will recognize that the above-disclosed systems and methods are merely exemplary embodiments. Additional details about additive manufacturing techniques are provided for in PCT Application No. PCT/US2019/050414, and published as WO 2020/055870, the disclosure of which is incorporated by reference herein in its entirety.

One skilled in the art will appreciate further features and advantages of the disclosure based on the above-described embodiments. Accordingly, the disclosure is not to be limited by what has been particularly shown and described, except as indicated by the appended claims. All publications and references cited herein are expressly incorporated herein by reference in their entirety.

Examples of the above-described embodiments can include the following:

1. An additive manufacturing apparatus, comprising:
   a reservoir having a bottom transparent surface and one or more walls coupled to the bottom transparent surface to define a volume in which one or more fluids can be disposed, the one or more walls having an inlet and an outlet associated therewith;
   a reservoir manifold disposed above the reservoir and being moveable with respect to the reservoir, the reservoir manifold having an inlet conduit and an outlet conduit formed therein, the inlet conduit providing for fluid communication with the reservoir via the inlet and the outlet conduit providing for fluid communication with the reservoir via the outlet; and
   a build plate having a build surface disposed below the reservoir manifold, the build plate being configured to move vertically away from the reservoir in conjunction with manufacturing an object.
2. The additive manufacturing apparatus of example 1, wherein the reservoir manifold comprises two independent arms, each arm being independently moveable.
3. The additive manufacturing apparatus of example 1 or 2, further comprising:
   a frame,
   wherein the volume of the reservoir is at least partially defined by the frame, and
   wherein the reservoir manifold is moveably affixed to the frame.
4. The additive manufacturing apparatus of example 3, wherein the reservoir manifold comprises two independent arms, each arm being independently moveably affixed to the frame.
5. The additive manufacturing apparatus of example 4, wherein each arm further comprises a trigger configured to manipulate a grasping portion of the arm between an open position and a closed position to couple the reservoir manifold to the reservoir.
6. The additive manufacturing apparatus of example 5, wherein an end of the trigger comprises a latch configured to pivot relative to at least one of the arms to engage the frame therebetween.
7. The additive manufacturing apparatus of example 6, wherein the latch is coupled to the at least one of the arms to translate substantially in tandem with the at least one of the arms.
8. The additive manufacturing apparatus of any of examples 1 to 7, wherein the reservoir manifold is configured to be moved between an engaged position in which the reservoir manifold is in contact with the reservoir to form an inlet fluid connection between the inlet conduit and the reservoir and an outlet fluid connection between the reservoir and the outlet conduit, and a disengaged position in which at least one of the inlet fluid connection and the outlet fluid connection is broken.
9. The additive manufacturing apparatus of any of examples 1 to 8, further comprising a reservoir glass disposed below the bottom transparent surface.
10. The additive manufacturing apparatus of example 8, wherein the reservoir glass is configured to be tilted at an angle relative to the reservoir and the reservoir is configured to be moved relative to the reservoir glass such that excess air is removed from between the reservoir and the reservoir glass as the reservoir is moved towards the reservoir glass.
11. The additive manufacturing apparatus of any of examples 1 to 10, further comprising a heating element in closed-loop fluid communication with the reservoir.
12. The additive manufacturing apparatus of any of examples 1 to 11, wherein the reservoir manifold further comprises at least one electrical contact, the reservoir comprises at least one electrical contact, and the at least one electrical contact of the reservoir manifold is configured to connect to the at least one electrical contact of the reservoir.
13. The additive manufacturing apparatus of any of examples 1 to 12, further comprising an inlet pump in fluid communication with the inlet conduit of the reservoir manifold, the inlet pump being configured to drive one or more fluids through the inlet conduit and into the reservoir from at least one of an external mixer, a heating element, or a material container.
14. The additive manufacturing apparatus of example 13, further comprising an inlet filter disposed within the inlet conduit.
15. The additive manufacturing apparatus of any of examples 1 to 14, further comprising a return pump in fluid communication with the outlet conduit of the reservoir manifold, the outlet pump being configured to drive one or more fluids from the reservoir, through the outlet conduit, and towards at least one of an external mixer, a heating element, or a material container.
16. The additive manufacturing apparatus of example 15, further comprising an outlet filter disposed within the outlet conduit.
17. The additive manufacturing apparatus of any of examples 1 to 16, further comprising one or more of a fluid height sensor or a fluid temperature sensor configured to measure a height or temperature of one or more fluids disposed in the reservoir, respectively.
18. The additive manufacturing apparatus of any of examples 1 to 17, further comprising:
   at least one of an active mixer, a passive mixer, or a material container,
   wherein the fluid communication with the reservoir provided by each of the inlet conduit and the outlet conduit is also provided with the at least one of the active mixer, the passive mixer, or the material container.
19. The additive manufacturing apparatus of example 18, wherein the at least one of an active mixer, a passive mixer, or a material container further comprises at least one of the active mixer or the passive mixer.
20. The additive manufacturing apparatus of any of examples 1 to 19, further comprising:

a controller configured to adjust at least one of a height of one or more fluids disposed in the reservoir or a temperature of one or more fluids disposed in the reservoir based on a signal received by the controller from one or more sensors associated with at least one of the reservoir manifold or the reservoir.

21. A method of additive manufacturing, comprising:
cycling fluid into and out of a reservoir while printing a plurality of layers using a portion of the fluid to form a three-dimensional object, the fluid that cycles out of the reservoir passing through at least one mixer prior to being cycled back into the reservoir.

22. The method of example 21, further comprising:
moving a reservoir manifold into an engaged position with respect to the reservoir such that an inlet conduit and an outlet conduit of the reservoir manifold forms a fluid connection with the reservoir to allow for the fluid to be cycled therethrough.

23. The method of example 22, wherein moving the reservoir manifold further comprises rotating the reservoir manifold about a pivot point.

24. The method of any of examples 21 to 23, further comprising:
filtering the fluid proximate to a location at which the fluid enters into the reservoir.

25. The method of any of examples 21 to 24, further comprising:
filtering the fluid proximate to a location at which the fluid exits the reservoir.

26. The method of any of examples 21 to 25, further comprising:
heating the fluid in conjunction with cycling the fluid, the heating occurring outside of the reservoir.

27. An additive manufacturing apparatus, comprising:
a reservoir having a bottom transparent surface and one or more walls coupled to the bottom transparent surface to define a volume in which one or more fluids can be disposed, the one or more walls having an inlet and an outlet associated therewith;
at least one of an active mixer, a passive mixer, or a heating element;
one or more pumps;
a fluid path formed between the reservoir and the at least one of the active mixer, the passive mixer, or the heating element such that the at least one of the active mixer, the passive mixer, or the heating element is in closed loop fluid communication with the reservoir and the one or more pumps are configured to flow fluid through the fluid path between the at least one of the active mixer, the passive mixer, or the heating element and the reservoir; and
a build plate having a build surface disposed in substantially parallel alignment with the bottom transparent surface of the reservoir, the build plate being configured to move vertically away from the reservoir in conjunction with manufacturing an object.

28. The additive manufacturing apparatus of example 27, wherein the at least one of the active mixer, the passive mixer, or the heating element comprises the heating element.

29. The additive manufacturing apparatus of example 27 or example 28, further comprising:
a controller configured to adjust at least one of a height of one or more fluids disposed in the reservoir or a temperature of one or more fluids disposed in the reservoir based on a signal received by the controller from one or more sensors.

30. The additive manufacturing apparatus of any of examples 27 to 29, further comprising:
a reservoir manifold disposed above the reservoir and being moveable with respect to the reservoir, the reservoir manifold having an inlet conduit and an outlet conduit formed therein, the inlet conduit and the outlet conduit being part of the fluid path.

31. The additive manufacturing apparatus of example 30, wherein the reservoir manifold is configured to be moved between an engaged position in which the reservoir manifold is in contact with the reservoir to connect the fluid path, and a disengaged position in which the fluid path is disconnected.

32. A method of additive manufacturing, comprising:
monitoring a temperature of a fluid used for additive manufacturing; and
heating the fluid used for additive manufacturing while it is being circulated through a closed loop fluid path that includes a reservoir in which at least a portion of the fluid can be disposed prior to being used to produce a three-dimensional object and a heating element configured to heat the fluid.

33. The method of example 32, wherein the closed loop fluid path further comprises a reservoir manifold having a plurality of conduits formed therein, the plurality of conduits forming a portion of the closed loop fluid path.

34. The method of example 33, further comprising:
moving the reservoir manifold into an engaged position with respect to the reservoir to allow the plurality of conduits to connect with and form the closed loop fluid path.

35. The method of any of examples 32 to 34, further comprising:
operating a controller to heat the fluid in response to the monitored temperature.

What is claimed is:
1. A method of additive manufacturing, comprising:
cycling fluid into and out of a reservoir while printing a plurality of layers using a portion of the fluid to form a three-dimensional object, the fluid that cycles out of the reservoir passing through at least one mixer prior to being cycled back into the reservoir, and
moving a reservoir manifold into an engaged position with respect to the reservoir such that an inlet conduit and an outlet conduit of the reservoir manifold forms a fluid connection with the reservoir to allow for the fluid to be cycled therethrough.

2. The method of claim 1, wherein moving the reservoir manifold further comprises rotating the reservoir manifold about a pivot point.

3. The method of claim 1, further comprising:
filtering the fluid proximate to a location at which the fluid enters into the reservoir.

4. The method of claim 1, further comprising:
filtering the fluid proximate to a location at which the fluid exits the reservoir.

5. The method of claim 1, further comprising:
heating the fluid in conjunction with cycling the fluid, the heating occurring outside of the reservoir.

6. The method of claim 1, further comprising:
monitoring a temperature of a fluid used for additive manufacturing; and
heating the fluid used for additive manufacturing while it is being circulated through a closed loop fluid path that includes the reservoir in which at least a portion of the fluid can be disposed prior to being used to produce the three-dimensional object and a heating element configured to heat the fluid.

7. The method of claim 6, wherein the closed loop fluid path further comprises a reservoir manifold having a plurality of conduits formed therein, the plurality of conduits forming a portion of the closed loop fluid path.

8. The method of claim 7, further comprising:
moving the reservoir manifold into an engaged position with respect to the reservoir to allow the plurality of conduits to connect with and form the closed loop fluid path.

9. The method of claim 6, further comprising:
operating a controller to heat the fluid in response to the monitored temperature.

* * * * *